Jan. 30, 1962 J. E. OSTLINE ETAL 3,019,295

AUTOMATIC TOLL TICKETING TELEPHONE SYSTEM

Filed Dec. 3, 1956 31 Sheets-Sheet 1

INVENTORS
John E. Ostline
Ivan V. Coleman
Jack W. Taugner
BY C. A. Gulbrandsen Atty.

INVENTORS
John E. Ostline
Ivan V. Coleman
Jack W. Taugner
BY C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 3

INVENTORS
BY John E. Ostline
Ivan V. Coleman
Jack W. Taugner
C. A. Gulbransen
ATTY.

Jan. 30, 1962 J. E. OSTLINE ETAL 3,019,295

AUTOMATIC TOLL TICKETING TELEPHONE SYSTEM

Filed Dec. 3, 1956

31 Sheets-Sheet 4

INVENTORS
John E. Ostline
Ivan V. Coleman
Jack W. Taugner
BY C. R. Gulbrandsen
Atty.

AUTOMATIC TOLL TICKETING TELEPHONE SYSTEM

Filed Dec. 3, 1956 31 Sheets-Sheet 5

INVENTORS
John E. Ostline
Ivan V. Coleman
Jack W. Taugner
BY C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 6

INVENTORS
BY John E. Ostline
Ivan V. Coleman
Jack W. Taugner
C. A. Gulbrandsen
ATTY.

INVENTORS
John E. Ostline
Ivan V. Coleman
Jack W. Tangner
BY
C. A. Gulbrandsen
Atty.

INVENTORS
John E. Ostline
Ivan V. Coleman
BY Jack W. Taugner
C. A. Gulbrandsen
Attx.

INVENTORS
John E. Ostline
Ivan V. Coleman
Jack W. Taugner
BY C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956

31 Sheets-Sheet 10

INVENTORS
John E. Ostline
Ivan V. Coleman
Jack W. Taugner
BY
C. A. Gulbrandsen
Atty.

INVENTORS
John E. Ostline
Ivan V. Coleman
Jack W. Taugner
BY
C. A. Gulbrandsen
Atty.

INVENTORS
John E. Ostline
Gene V. Coleman
Jack W. Tauqnoe
BY
C. A. Bulbrandsen
Atty.

INVENTORS
John E. Ostline
Ivan V. Coleman
Jack W. Taugner
BY
C. A. Gulbrandsen
Atty.

AUTOMATIC TOLL TICKETING TELEPHONE SYSTEM

Filed Dec. 3, 1956 31 Sheets-Sheet 14

INVENTORS
John E. Ostline
Ivan V. Coleman
Jack W. Taugner
BY
C. A. Gullbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 15

INVENTORS
John E. Ostline
Ivan V. Coleman
Jack W. Taugner
BY
C. A. Gulbrandsen
Atty INVENTORS
John E. Ostline
Ivan V. Coleman
Jack W. Taugner
BY
C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 17

INVENTORS
John E. Ostline
Ivan V. Coleman
Jack W. Taugner
BY
C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 18

INVENTORS
John E. Ostline
Ivan V. Coleman
Jack W. Taugner
BY
C. A. Gulbransen
Atty

AUTOMATIC TOLL TICKETING TELEPHONE SYSTEM

Filed Dec. 3, 1956

INVENTORS
John E. Ostline
Ivan V. Coleman
Jack W. Taugner
BY
C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 20

INVENTORS
John E. Ostline
Ivan V. Coleman
Jack W. Taugner
BY
C. A. Gulbrandsen
Atty.

INVENTORS
John E. Ostline
Jean V. Coleman
Jack W. Taugner
BY
C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 22

INVENTORS
John E. Ostline
Ivan V. Coleman
Jack W. Taugner
BY
C. A. Gullbrandsen
ATTY.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 23

INVENTORS
John E. Ostline
Ivan V. Coleman
Jack W. Taugner
BY
C. A. Gulbrandsen
Atty INVENTORS
John E. Ostline
Ivan V. Coleman
Jack W. Taugner
BY
C. A. Gulbrandsen
Atty.

INVENTORS
John E. Ostline
Ivan V. Coleman
Jack W. Taugner
BY C. A. Gulbrandsen
Atty INVENTORS
John E. Ostline
Ivan V. Coleman
Jack W. Taugner
BY C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 27

INVENTORS
John E. Ostline
Ivan V. Coleman
Jack W. Taugner
BY
C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 28

INVENTORS
John E. Ostline
Jean V. Coleman
Jack W. Tangney

BY C. A. Gulbrandsen
Atty.

INVENTORS
John E. Ostline
Ivan V. Coleman
Jack W. Taugner
BY
C. A. Gulbrandsen
Atty.

Jan. 30, 1962 J. E. OSTLINE ETAL 3,019,295

AUTOMATIC TOLL TICKETING TELEPHONE SYSTEM

Filed Dec. 3, 1956 31 Sheets-Sheet 30

INVENTORS
John E. Ostline
Ivan V. Coleman
Jack W. Tangnot
BY
C. A. Gulbrandsen
Atty.

INVENTORS
John E. Ostline
Ivan V. Coleman
Jack W. Taugner
BY
C. A. Gulbrandsen
Atty.

3,019,295

AUTOMATIC TOLL TICKETING TELEPHONE SYSTEM

John E. Ostline, Chicago, Ivan V. Coleman, Naperville, and Jack W. Taugner, Park Ridge, Ill., assignors to Automatic Electric Laboratories, Inc., a corporation of Delaware Filed Dec. 3, 1956, Ser. No. 628,474
8 Claims. (Cl. 179—7.1)

Figure 1:
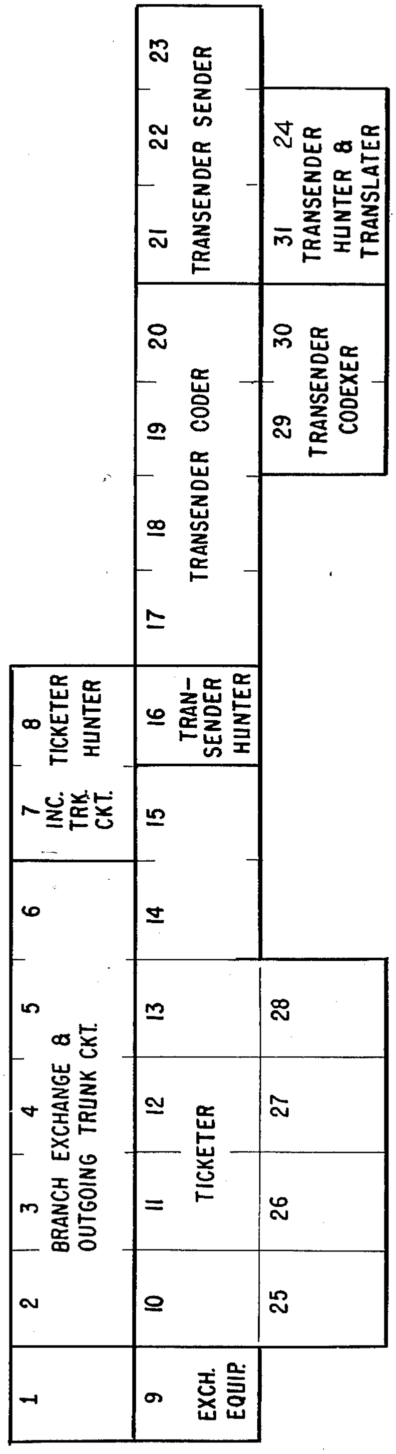

The present invention relates in general to automatic telephone systems and more particularly to improvements in automatic toll ticketing telephone systems arranged to produce an individual record of certain items of information pertaining to each toll telephone connection so that an appropriate charge may be assessed against the calling subscriber.

In prior automatic toll ticketing telephone networks of the type disclosed in the Ostline Patents 2,581,287 and 2,678,353, toll ticketing telephone connections are completed under control of a register sender provided in the originating telephone exchange. During the establishment of a connection, a detector is brought into use to automatically determine the directory number of the calling subscriber substation and it registers the detected calling number in the register sender. Also, during the setting up of the connection, the register sender transfers certain information registered therein, including the calling station directory number, the called station directory number, the rate of charge for the call, and other pertinent items of record information, to a toll ticket repeater provided in the originating exchange. The above noted items of information are temporarily stored in the toll ticket repeater. During the time that the conversational connection is maintained between the calling and called subscriber substations, the toll ticket repeater accumulates and registers the total elapsed conversational time. Following the release of the connection by the calling and called subscribers, a printer controller or a tabulator is associated with the toll ticket repeater and the items of record information temporarily stored therein are then transferred to the printer controller or tabulator. Incident to the completion of the transfer of the items of information, the toll ticket repeater is restored to normal and rendered available for use in other toll ticketing calls. Thereafter, the printer controller or tabulator is associated with appropriate recording apparatus that is controlled to produce an individual record and a common record of items of information pertaining to the completed connection.

Automatic toll ticketing apparatus of the type noted above is particularly useful in a relatively large metropolitan area having a plurality of different zones and wherein each zone includes one or more 10,000 line telephone exchanges. Due to the heavy traffic normally handled in a metropolitan area of the type noted above, the apparatus required to handle the toll ticketing telephone traffic is quite complicated to manufacture and install and can not economically be used in small telephone networks having relatively light toll ticketing traffic between the small capacity exchanges included in such a network.

More specifically, in a telephone network serving a plurality of small exchanges having relatively few interconnecting trunk or toll lines between the different exchanges, it is not economical to employ a telephone exchange switching apparatus utilizing register senders and other special toll ticketing apparatus of the type required to handle the relatively heavy traffic of metropolitan networks.

Accordingly, it is the main object of the present invention to provide an automatic toll ticketing telephone system for use in relatively small exchanges, which is economical to manufacture and install, and which provides the necessary facilities for producing a permanent record of each toll connection.

It is still another object of the invention to provide new and improved circuits and apparatus for an automatic toll ticketing system which are directly controlled from the calling device at a calling station and which do not require the use of register senders or other switch controlling apparatus to establish toll ticketing telephone connections.

It is still another object of the invention to provide in a telephone system having relatively small capacity automatic telephone exchanges, improved toll ticketing repeaters which are directly controllable by calling subscriber dials to register the items of record information pertinent to each toll ticketing connection, such as the called subscriber number, and to record this information as it is transmitted to the ticket repeaters by the calling subscribers.

It is still another object of the invention to provide an improved toll ticketing repeater of the type noted, which is arranged to record each unit of elapsed conversational time during an established connection.

It is still another object of the invention to provide in conjunction with the toll ticketing repeater of the type noted, apparatus for automatically detecting the directory number of the calling subscriber and to register it in the toll ticket repeater.

It is still another object of the present invention to provide in a toll ticketing repeater of the type noted, a rotary switch arranged to count the impulses of each digit dialled by a calling subscriber, to control a recording circuit to record each of the digits as they are received, and to control the recorder to produce a record of each unit of elapsed time during the time the conversational connection is maintained between the calling and called subscriber substations.

It is still another object of the invention to provide an improved toll ticketing repeater of the type noted, which is arranged to be accessible from both local selectors and incoming trunk lines from a branch exchange.

It is still another object of the invention to provide in conjunction with the toll ticketing repeater of the type noted, apparatus for automatically receiving the identity of a calling branch exchange subscriber from the branch exchange while he is still dialling the called stations directory number.

Further objects and features of the present invention pertain to the particular arrangement of the various circuit elements of the automatic toll ticketing telephone system, whereby the above objects and additional operating features are attained.

The invention, both as to its organization and method of operation, together with further objects and advantages thereof, will best be understood by reference to the following specification taken in connection with the accompanying drawings, in which FIGS. 2 to 6, inclusive, illustrate the details of the apparatus incorporated in the branch exchange B of a toll ticketing telephone system; FIGS. 7 to 31, inclusive, illustrate the detail of the apparatus incorporated in the main exchange A of a toll ticketing telephone system; and FIG. 1 illustrates the manner of combining FIGS. 2 to 31 inclusive, of the drawings to form a unified system and to illustrate the apparatus incorporating the features briefly outlined above.

Figure 2:
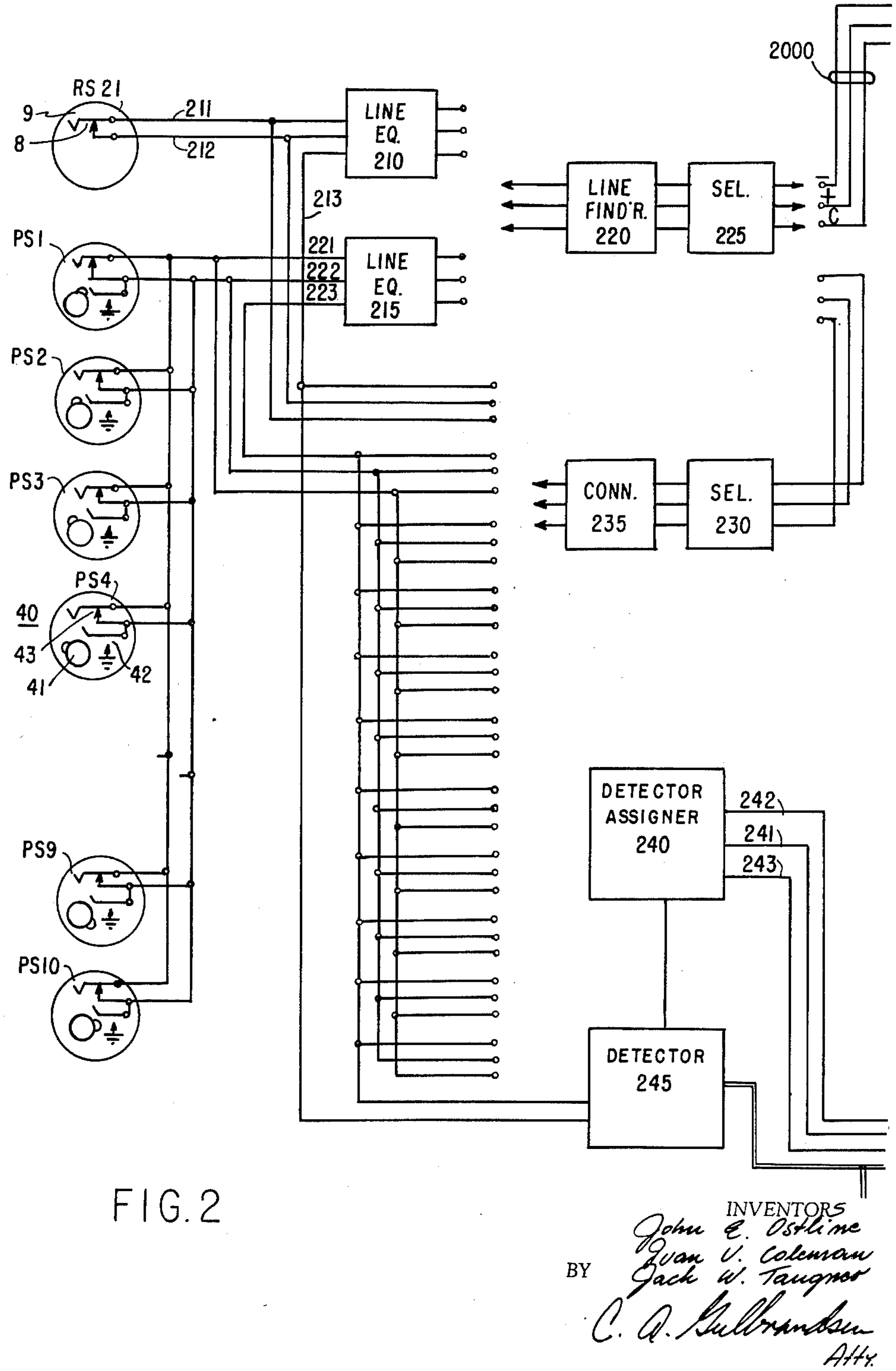
Figure 3:
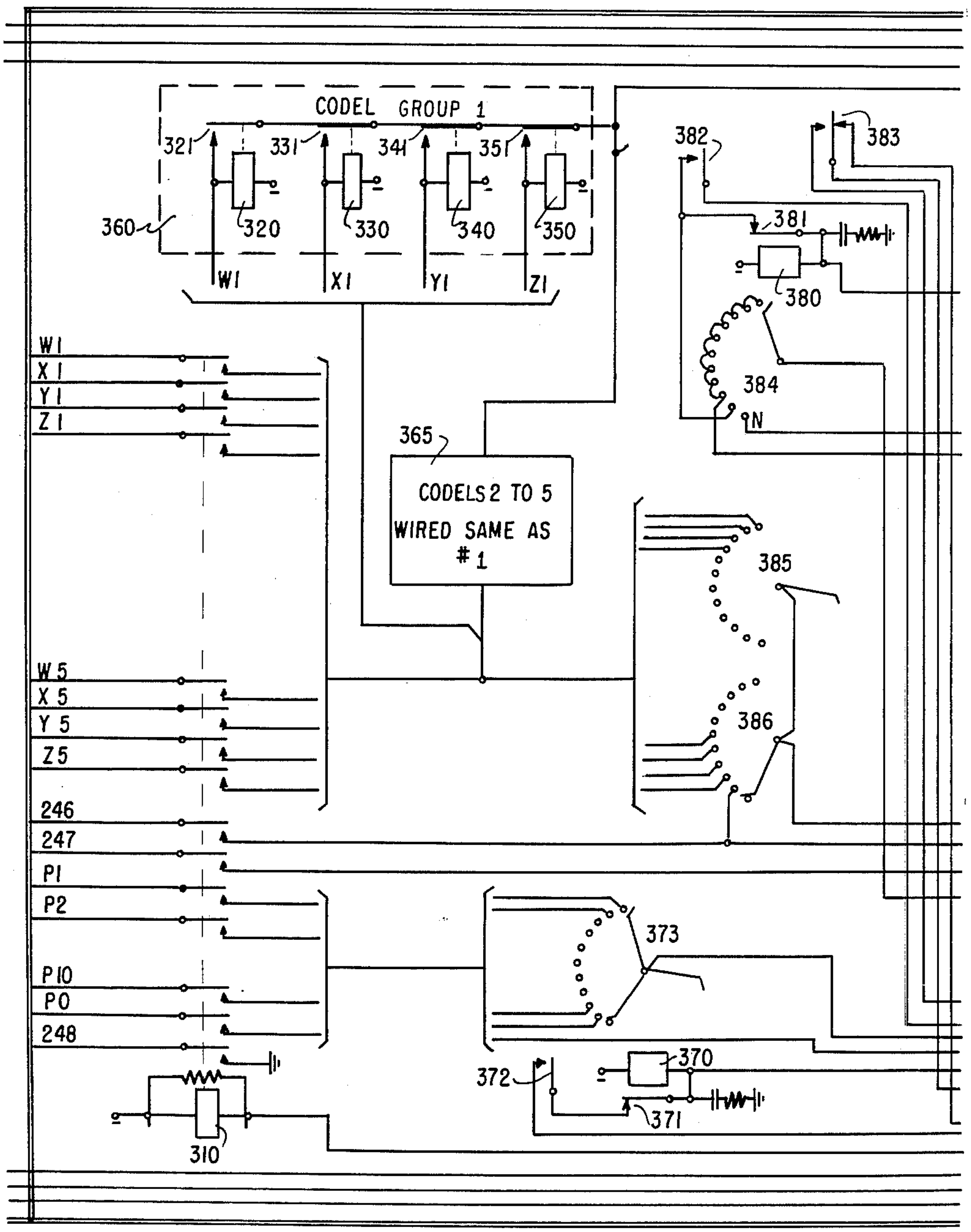
Figure 4:
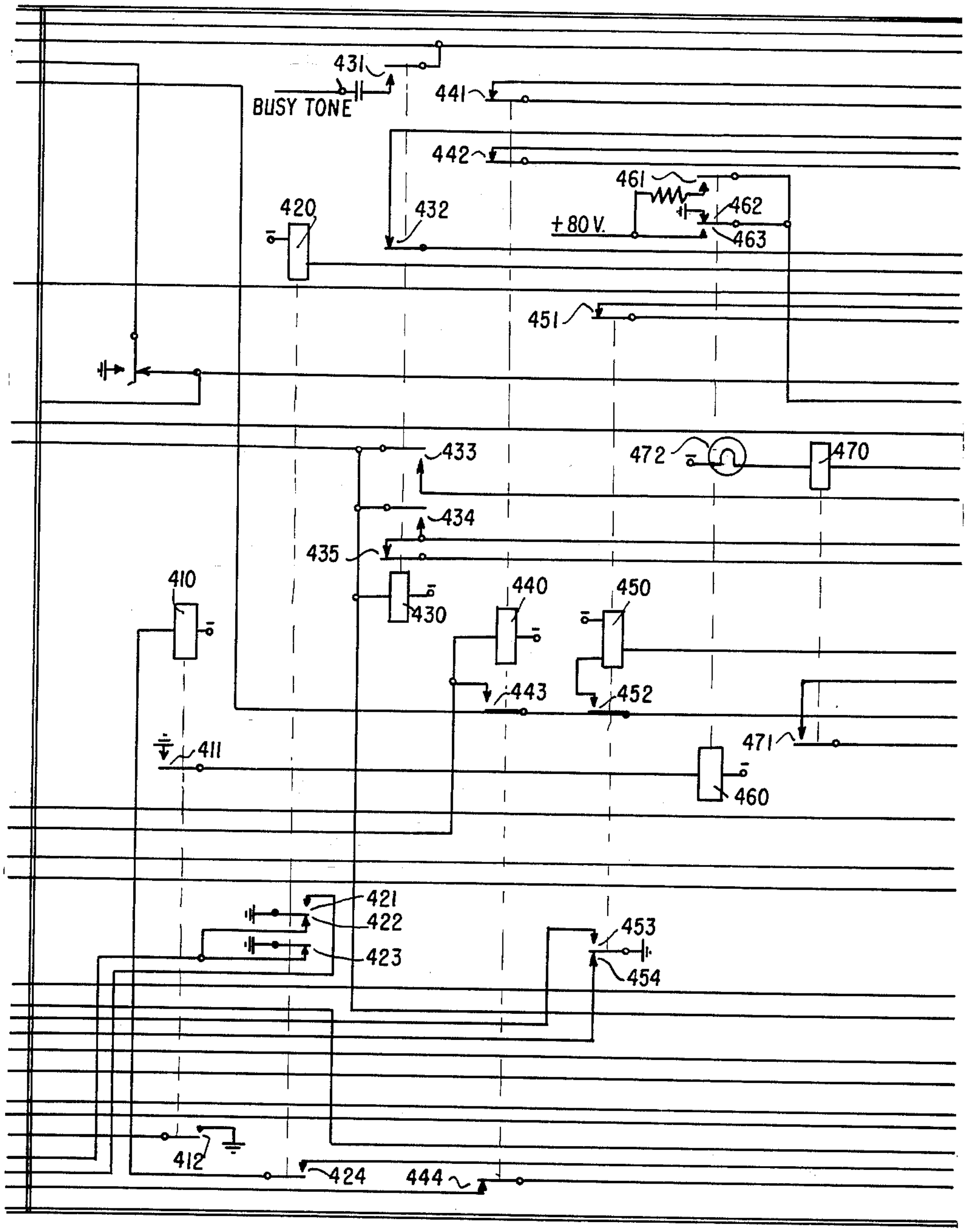
Figure 5:
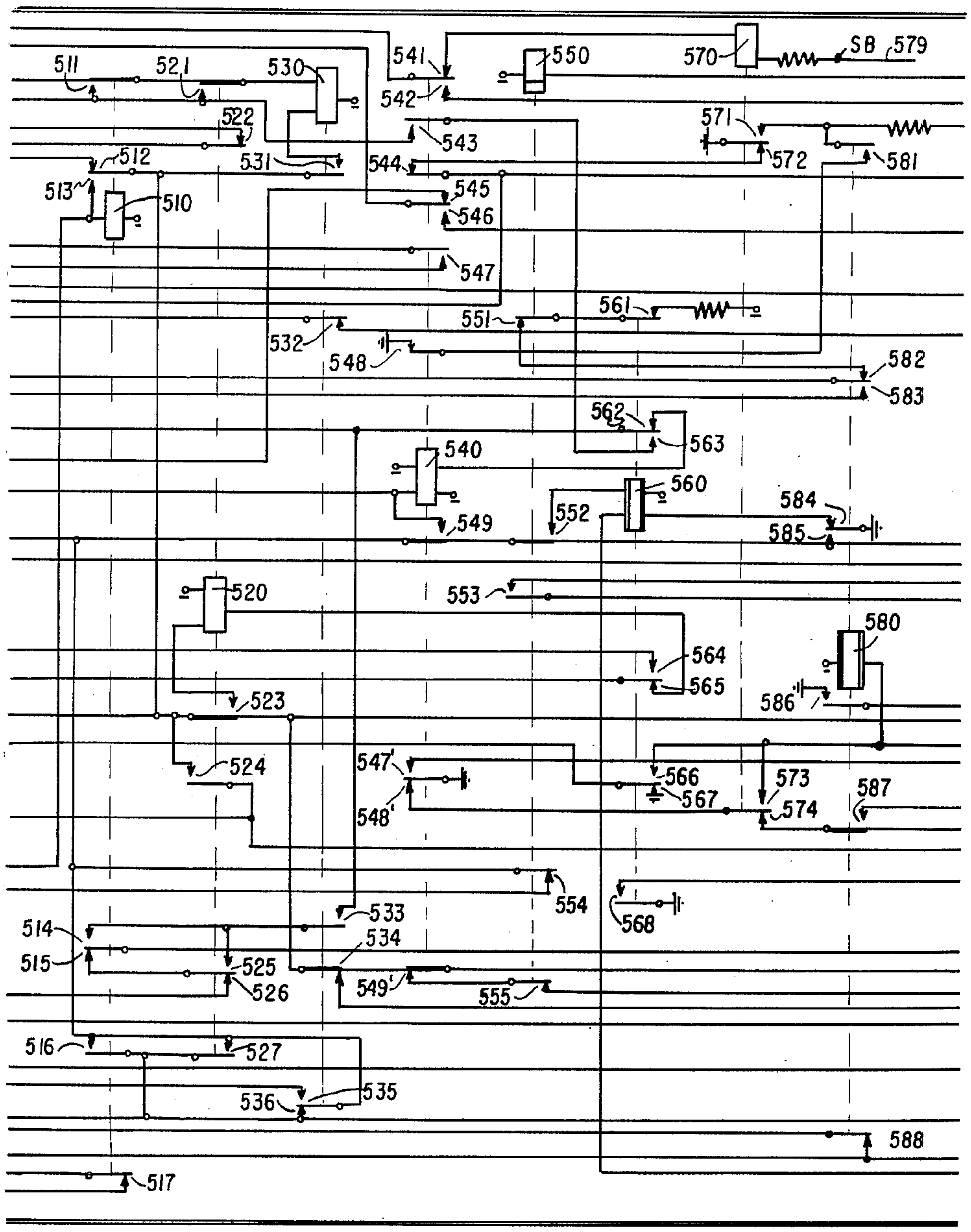
Figure 6:
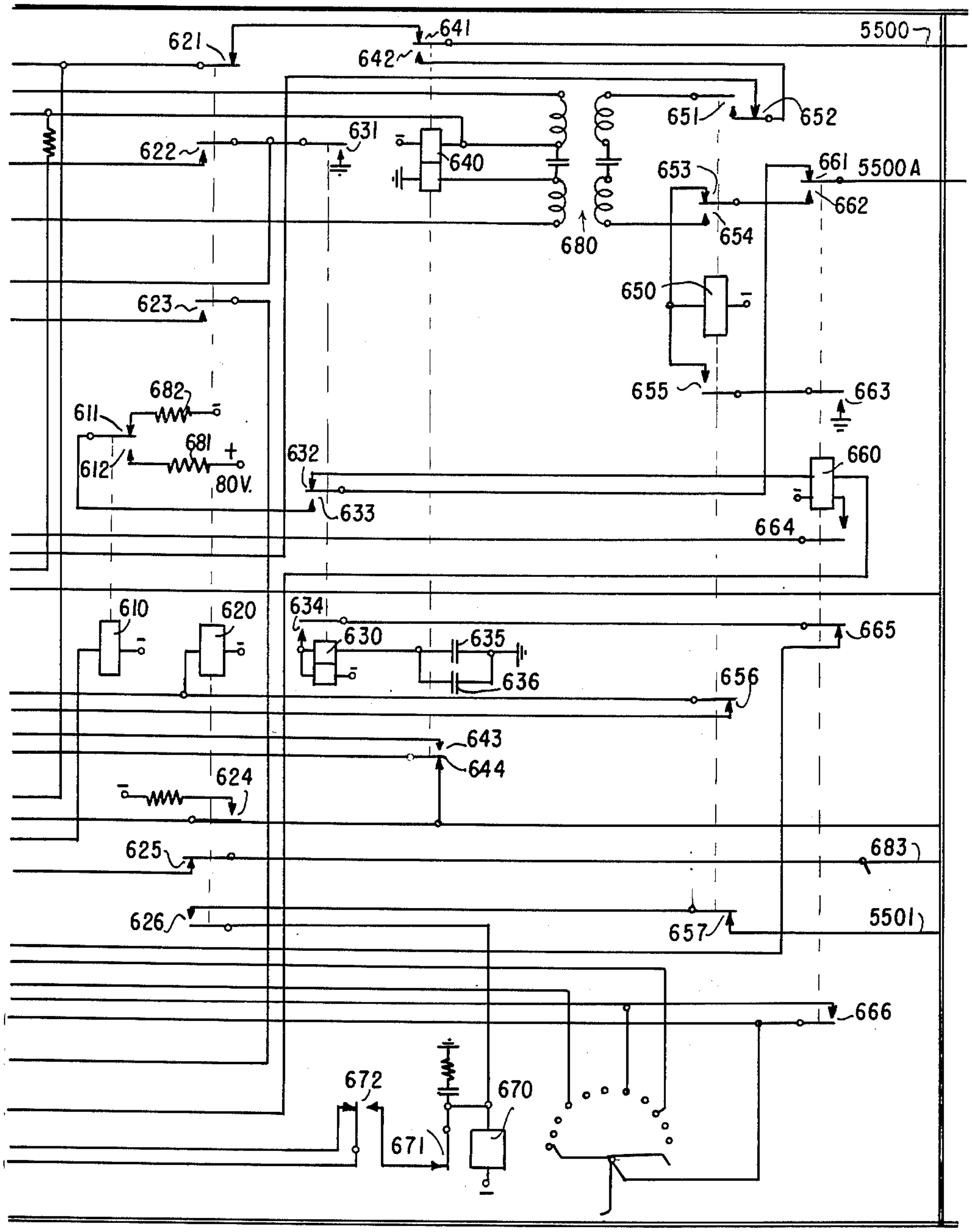

Referring now to FIG. 2 of the drawing, it will be seen that the apparatus disclosed therein is schematically illustrated in block diagram form and it represents the switching equipment of exchange B, and also includes in block form the detector and detector assigner. The detector and detector assigner are shown in detail in the copending Ostline application, Serial No. 625,833, filed December 3, 1956.

FIGS. 3 to 6, inclusive, illustrated in schematic form the details of the outgoing toll trunk circuit from exchange B to exchange A. This circuit is designed to provide outgoing service from a branch exchange having a detector to a main exchange equipped with toll ticketing equipment. This circuit's functions are to:

(1) Provide transmission battery to calling station.

(2) Repeat dial pulses over the "—" side of trunk to the distant ticketer.

(3) Registers spotter pulses while extra digit "0" is dialled and block digit "0" from being repeated by the ticketer.

(4) Initiate a terminal detection after digit "0" is dialled.

(5) Register party identity and pulse this information over the "+" side of the trunk to the distant office.

(6) Switch the talking circuit through the repeat coil transmission bridge connecting the calling station to the trunk.

Figure 7:
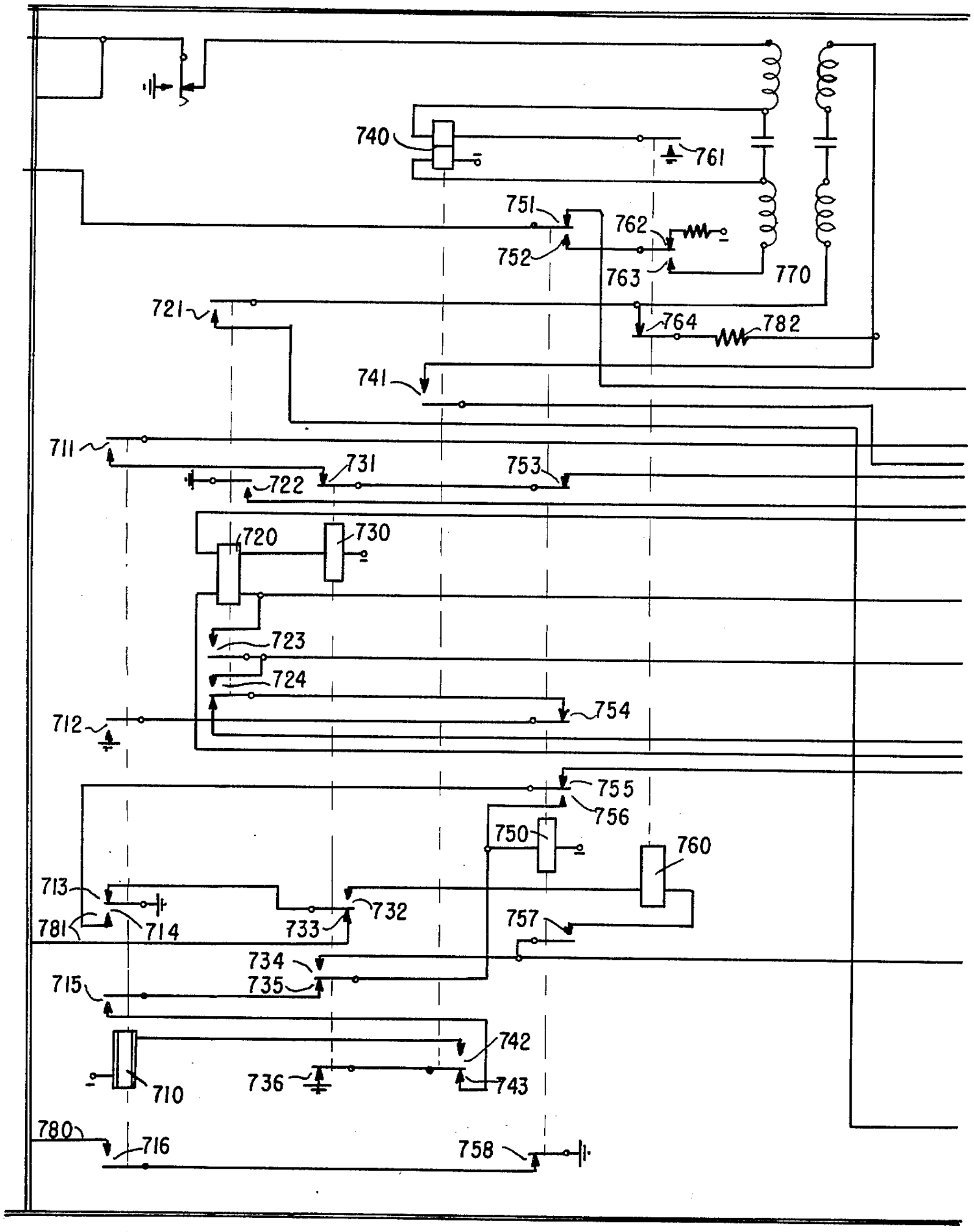
Figure 8:
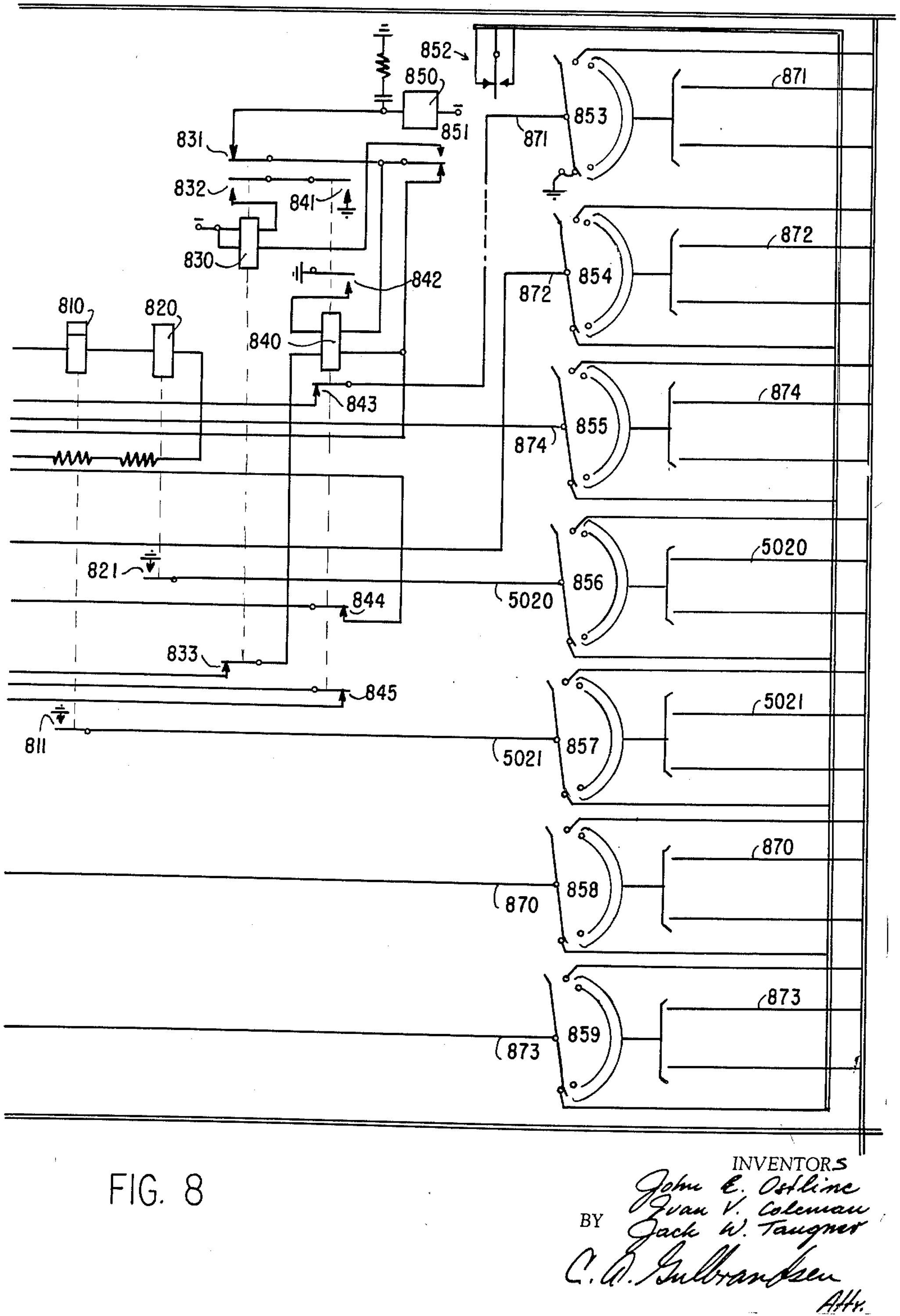

FIGS. 7 and 8 disclose in schematic form the details of the trunk circuit incoming from branch exchange to A, and an associated ticketer hunter respectively. This circuit is designed to provide incoming service from an outgoing trunk circuit in a branch exchange, to a ticketer. When seized, the incoming trunk circuit causes its associated ticketer hunter to hunt for an idle ticketer. The incoming trunk circuit receives the detected calling party's number from the branch office over the "+" side of the trunk and forwards this information over leads 5020 and 5021 to the ticketer. These circuit's functions are:

(1) To be seized over "—" side of the trunk.

(2) To stop hunting if the subscriber dials prematurely.

(3) To stop the ticketer hunter if a ticketer is simultaneously seized by more than one ticketer hunter or selector.

(4) To convert incoming dial pulses on the "—" side of the trunk to outgoing loop pulses to the ticketer.

Figure 9:
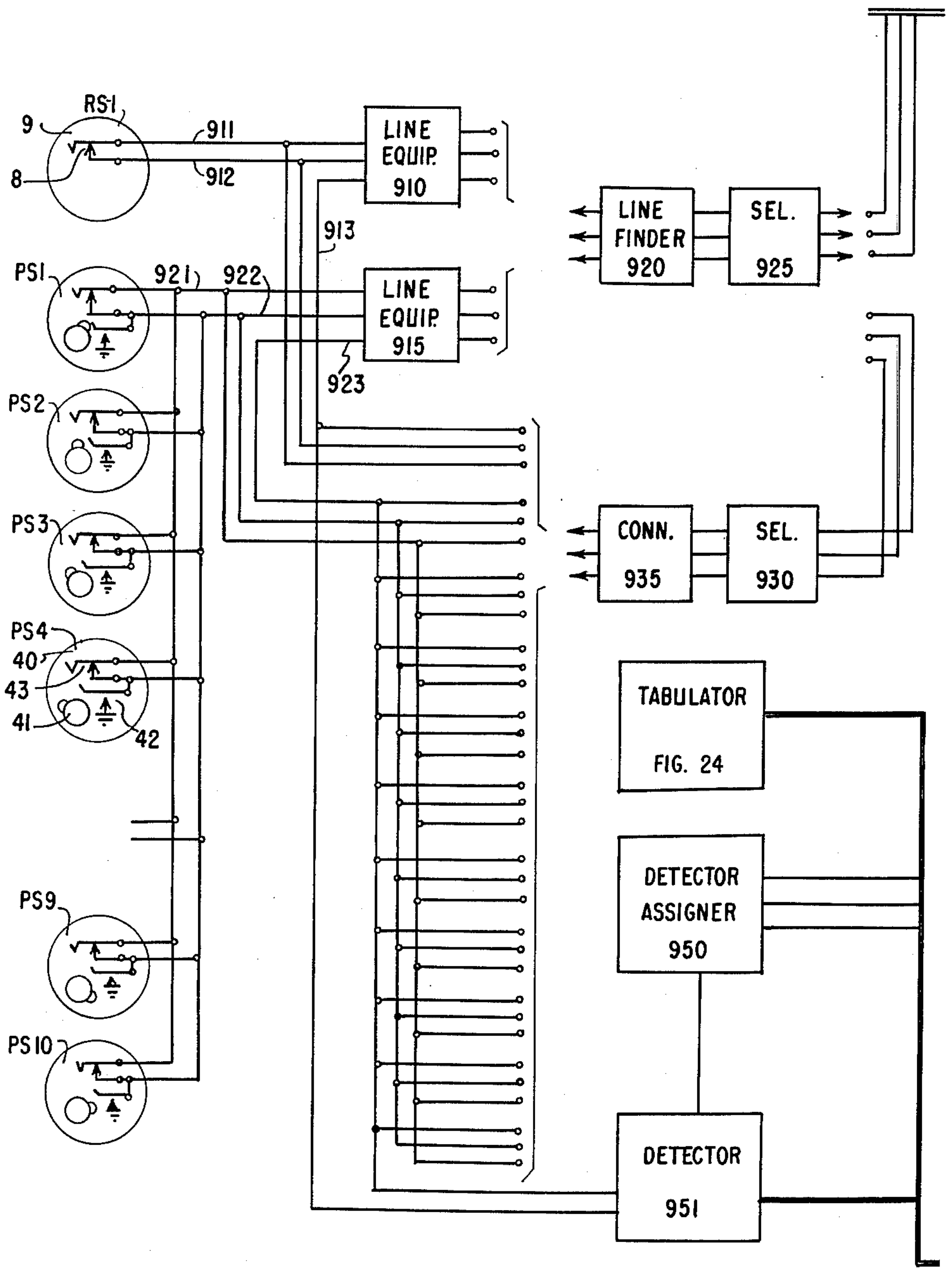
Figure 10:
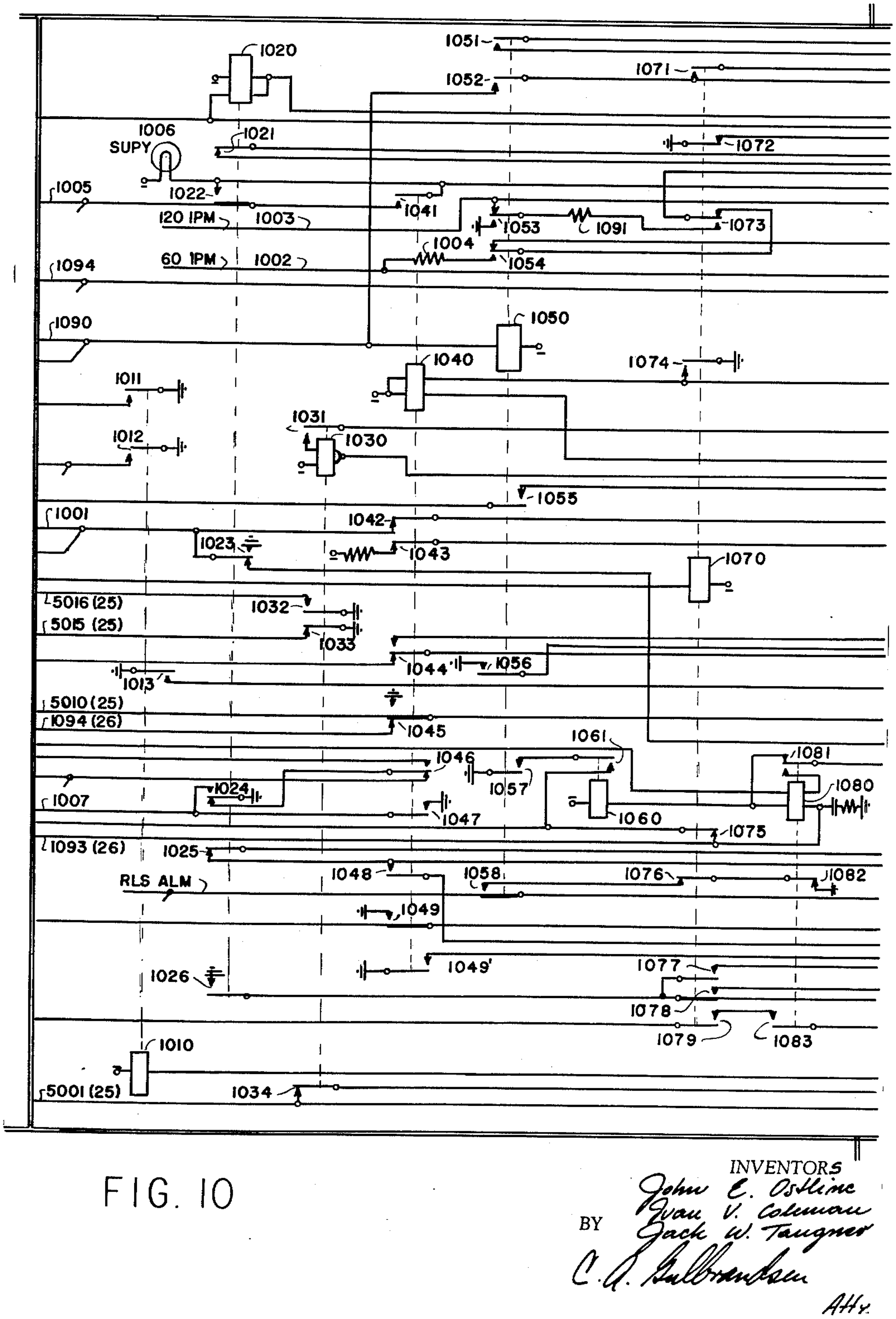
Figure 11:
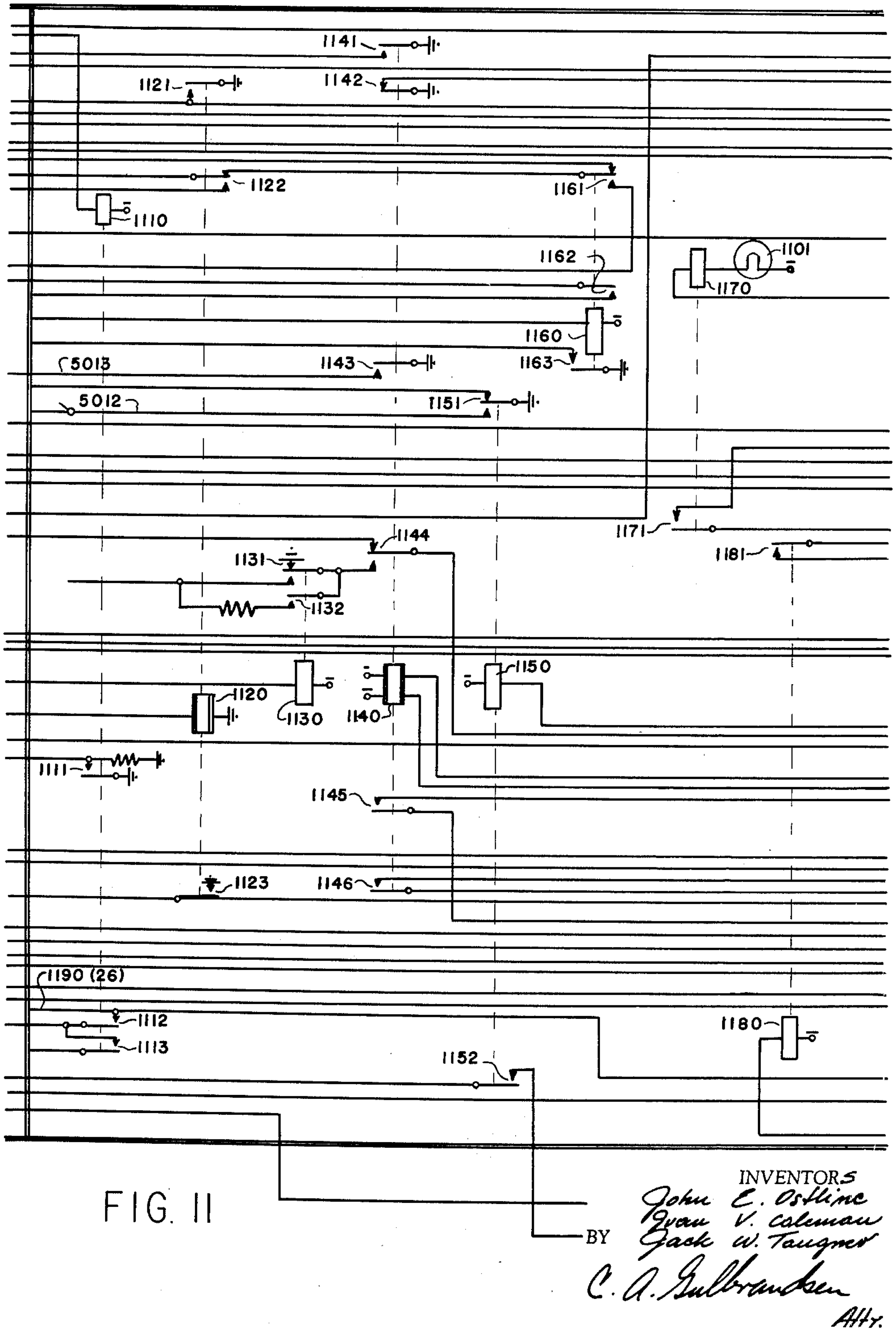
Figure 12:
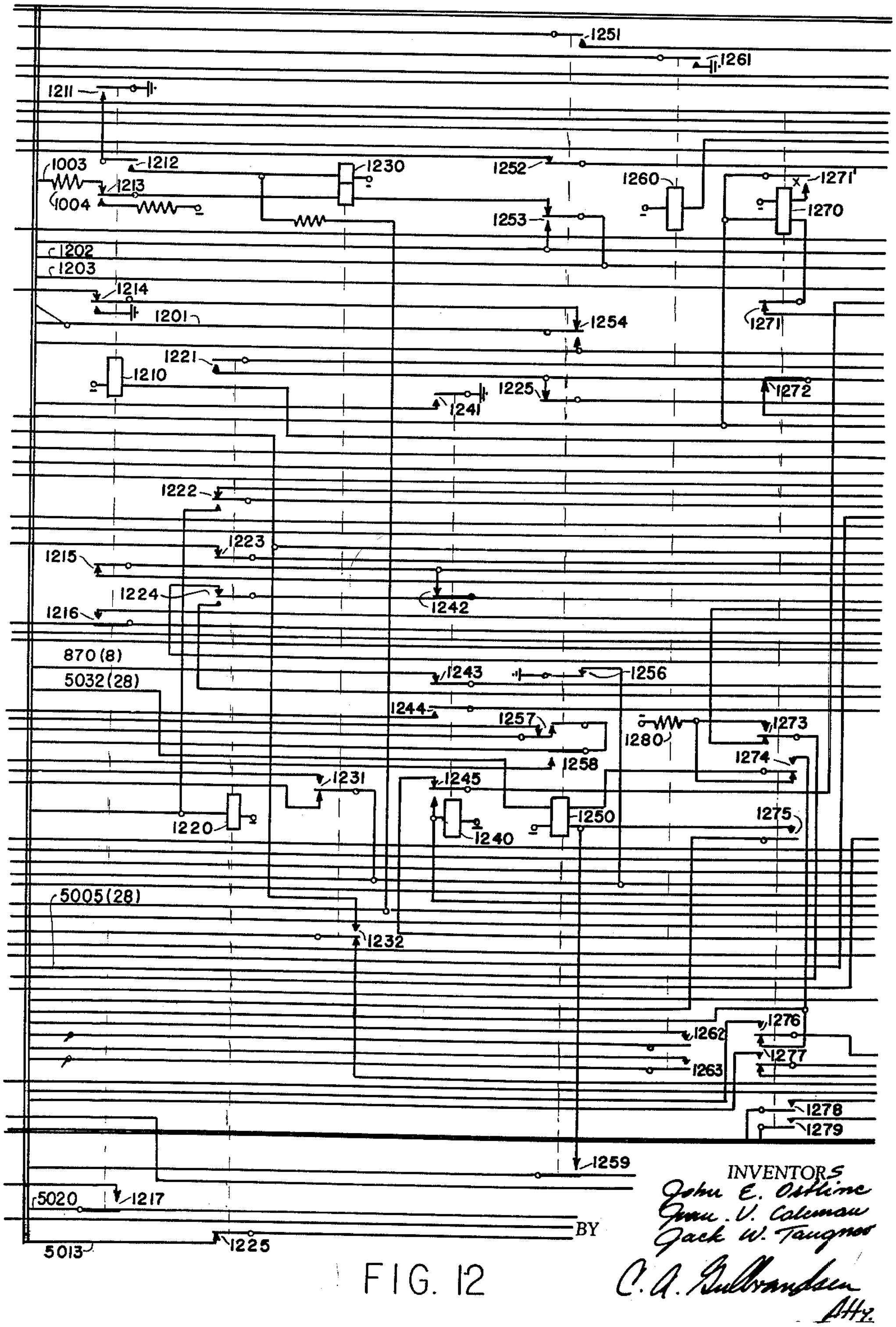
Figure 13:
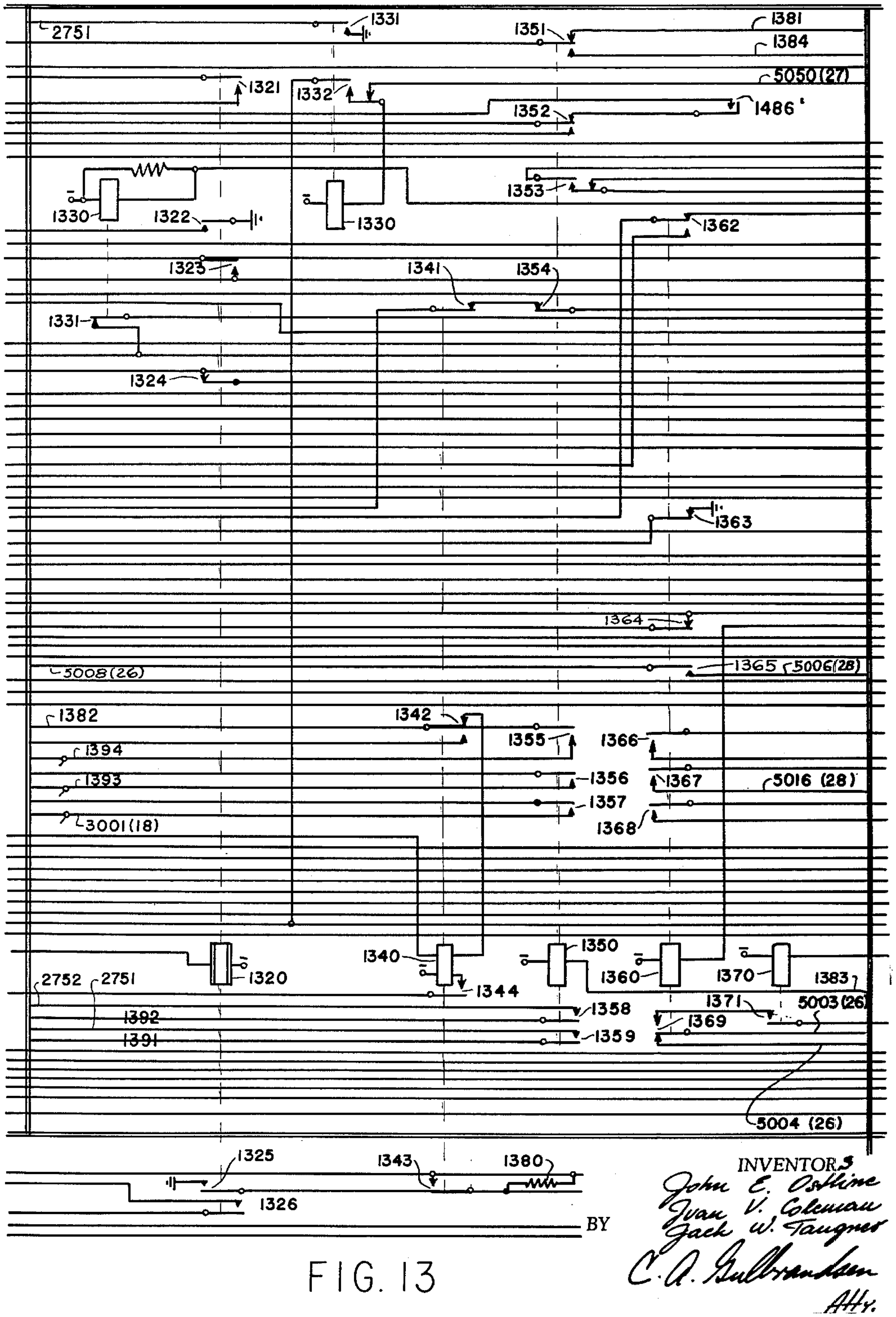
Figure 14:
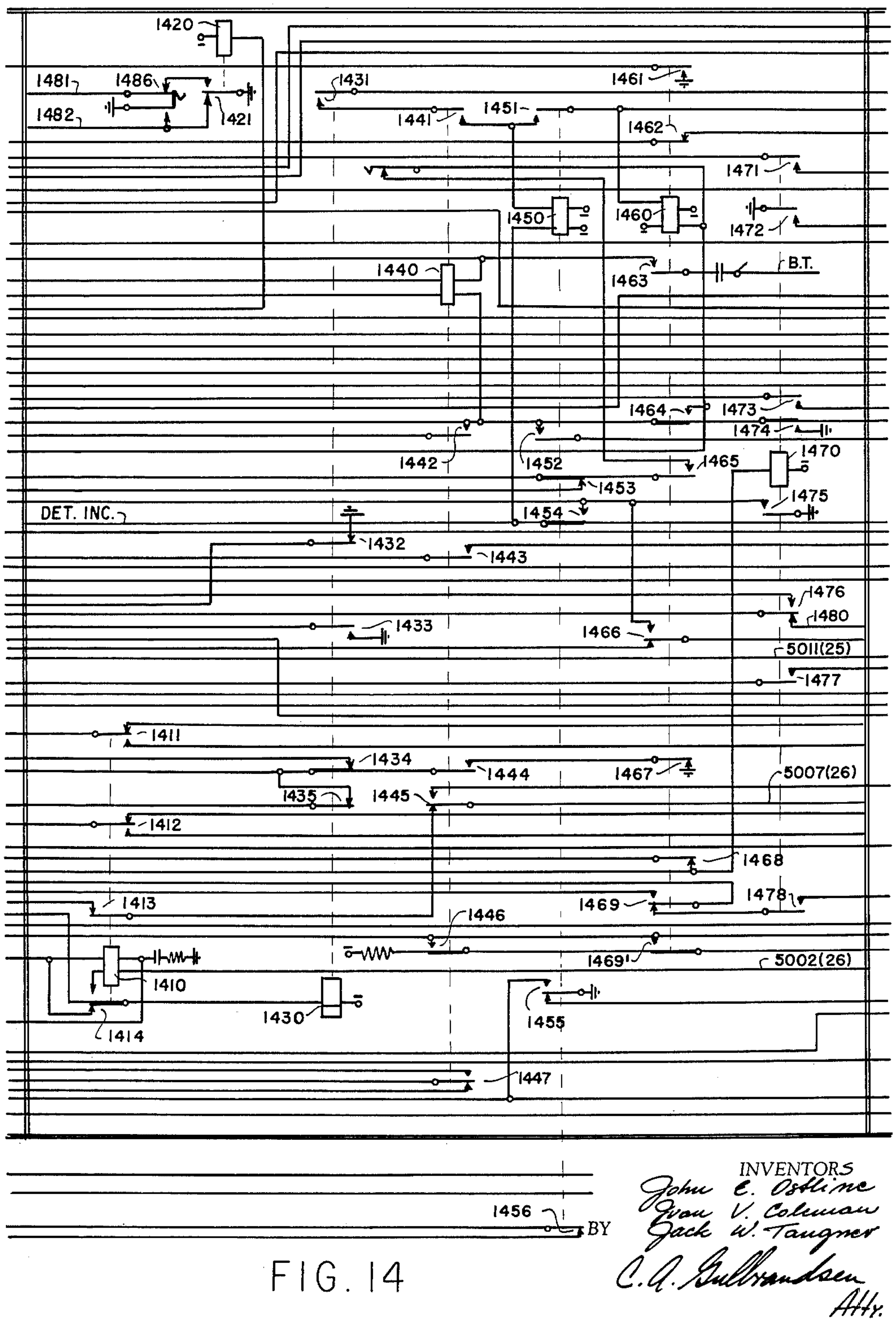
Figure 15:
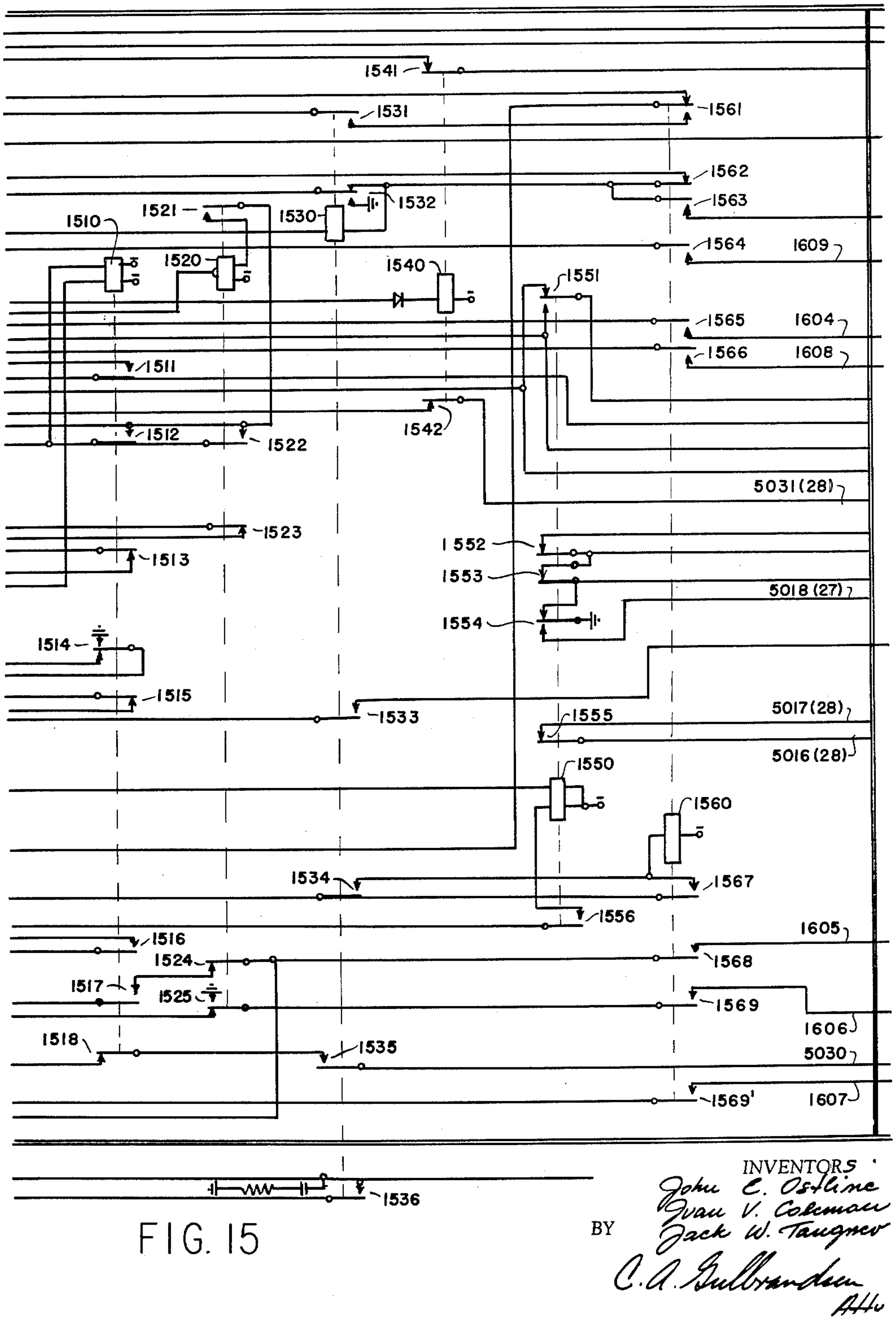

FIG. 9 of the drawing discloses in schematic block diagram form the switching equipment of exchange A, and also includes in block diagram form the detector and detector assigner. The detectors and assigner are shown in detail in the copending Ostline application, Serial No. 625,833, filed December 3, 1956.

FIGS. 10 to 15, and 25 to 28, inclusive, illustrate in schematic form the details of the ticketer. This circuit is used in toll ticketing systems without a register sender commonly known as the type B toll ticketing system installations. On locally originated calls, it is seized from a local selector. On calls originating in a branch office, it is seized from an incoming trunk circuit. It can handle both: (1) Seven digit toll calls consisting of the three digit office code and four terminal numbers and (2) Ten or eleven digit toll calls into a foreign area consisting of the three digit area code, the three digit office code, and four or five terminal numbers.

In this type system, it is necessary to dial an access code to seize this circuit. The last digit of the access code is always the party identification digit "0." On locally originated calls, the party identification digit "0" is the first digit dialled into this circuit.

The principal functions of the ticketer are as follows:

(1) It tests the insulation resistance of the calling line to ground to prevent incorrect party identification on locally originating calls.

(2) It calls for a transender when seized.

(3) On locally originating calls, it determines the party identity and calls for a detection of the calling party's number after the party identification digit "0" has been dialled.

(4) It repeats to the transender the office code digits on seven digit calls, and the area code plus the office code digits (if needed) on ten or eleven digit calls.

(5) It times the length of conversation from the time the called party answers until the calling party disconnects.

(6) It stores the following ticketing information during conversation: the calling number (5 digits only); the called number (7, 10 or 11 digits); and a change in toll rates indication, if it occurs during the call.

(7) After the calling party has disconnected, it calls for a tabulator and transfers to it the ticketing information. During this transfer operation, the ticketer is guarded against seizure from another call, but the calling line and the outgoing trunk are released. The ticketer releases after transfer is completed.

(8) If the call is not answered, the ticketer releases when the calling party disconnects and no ticketing information is recorded for the call.

(9) It provides visual supervision of the progress of a call through the ticketer by means of the supervisory lamps.

Figure 16:
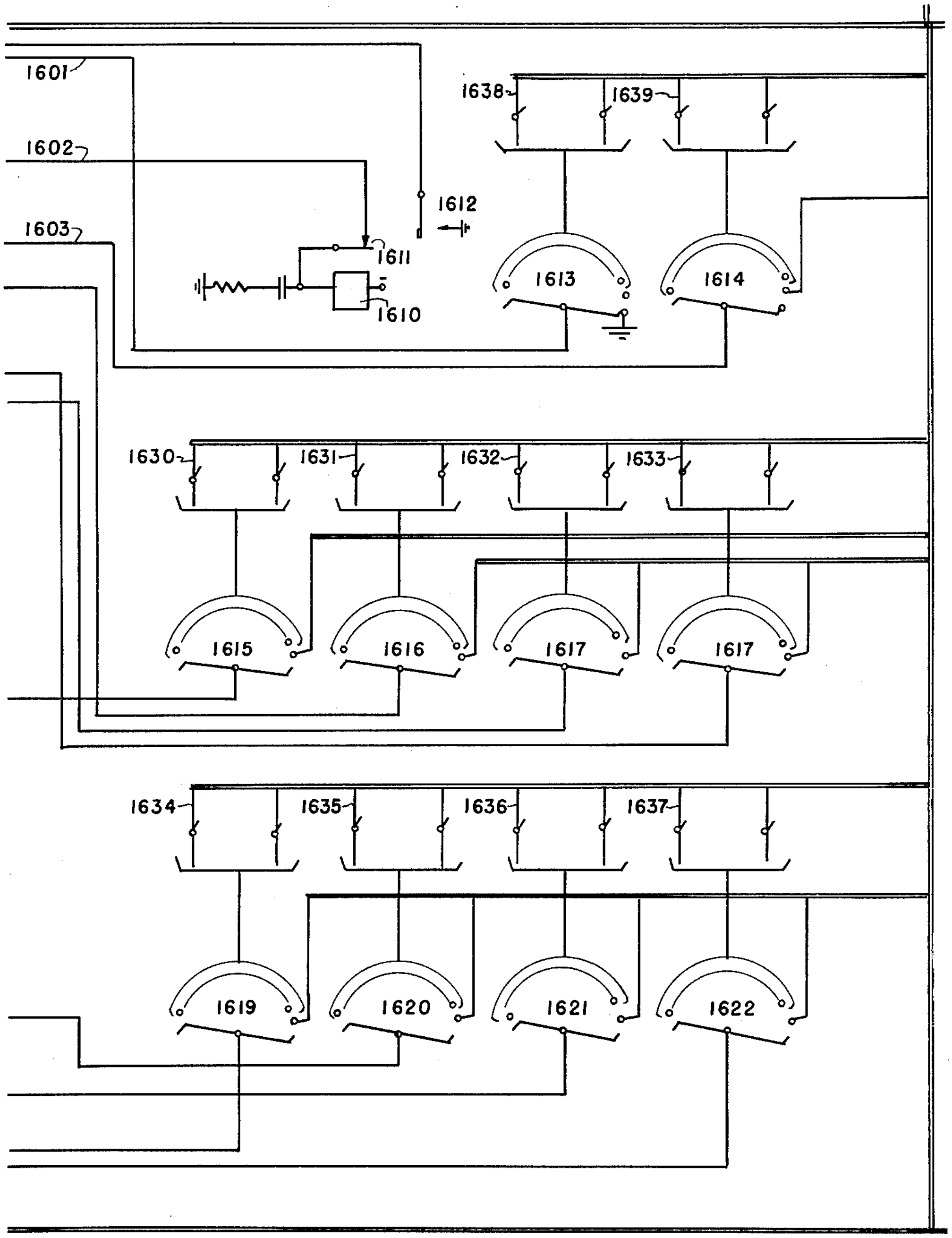

FIG. 16 of the drawing discloses in schematic form the transender hunter circuit. This circuit is associated with a ticketer and its function is to find or hunt for an idle transender.

FIGURES 17 to 20, inclusive, disclose in schematic form the details of the transender coder. This circuit is an integral part of the transender and as such operates in direct conjunction with the transender codexer and transender sender.

One transender from a common pool is associated with a ticketer while the subscriber dials the called number. It is retained under control of the ticketer until it obtains a routing directive either from the common translator or from the built-in directive in its coder and until it completes the required sending. Upon completion of sending, the ticketer switches through and frees the transender for use on other calls. The functions of the coder are:

(1) When it receives a "skip" control directive and a routing directive from the translator through a bar relay to store them on codel relays.

(2) To route calls to an operator or release the transender and provide busy tone if the translation is of a non-standard nature such as: "TX" translation for failure to dial digit "0," "TY" translation for ground fault on line, "TZ" translation for incomplete detection, "TT" translation for translator assigner failure.

When the coder is used on calls requiring routing directives from the translator, all codel leads and other leads are extended for a brief period to the translator. At the same time, a relay is operated in the translator as determined by the office code and area code dialled by the subscriber. The relay momentarily grounds some of these leads and operates the corresponding relays of the coder extended to it. The operated codel relays in turn place ground on codel leads and thereby make the routing directive available to the transender-sender. Most routing directives consist of fewer digits than the six provided in the codel storage. The sender tests locked codels during the interdigital interval following the sending of the preceding routing digit, and upon encountering the first empty codel will cause the coder out sequence switch 2010 to "skip" over the remaining codels or the routing digit storage.

Figure 21:
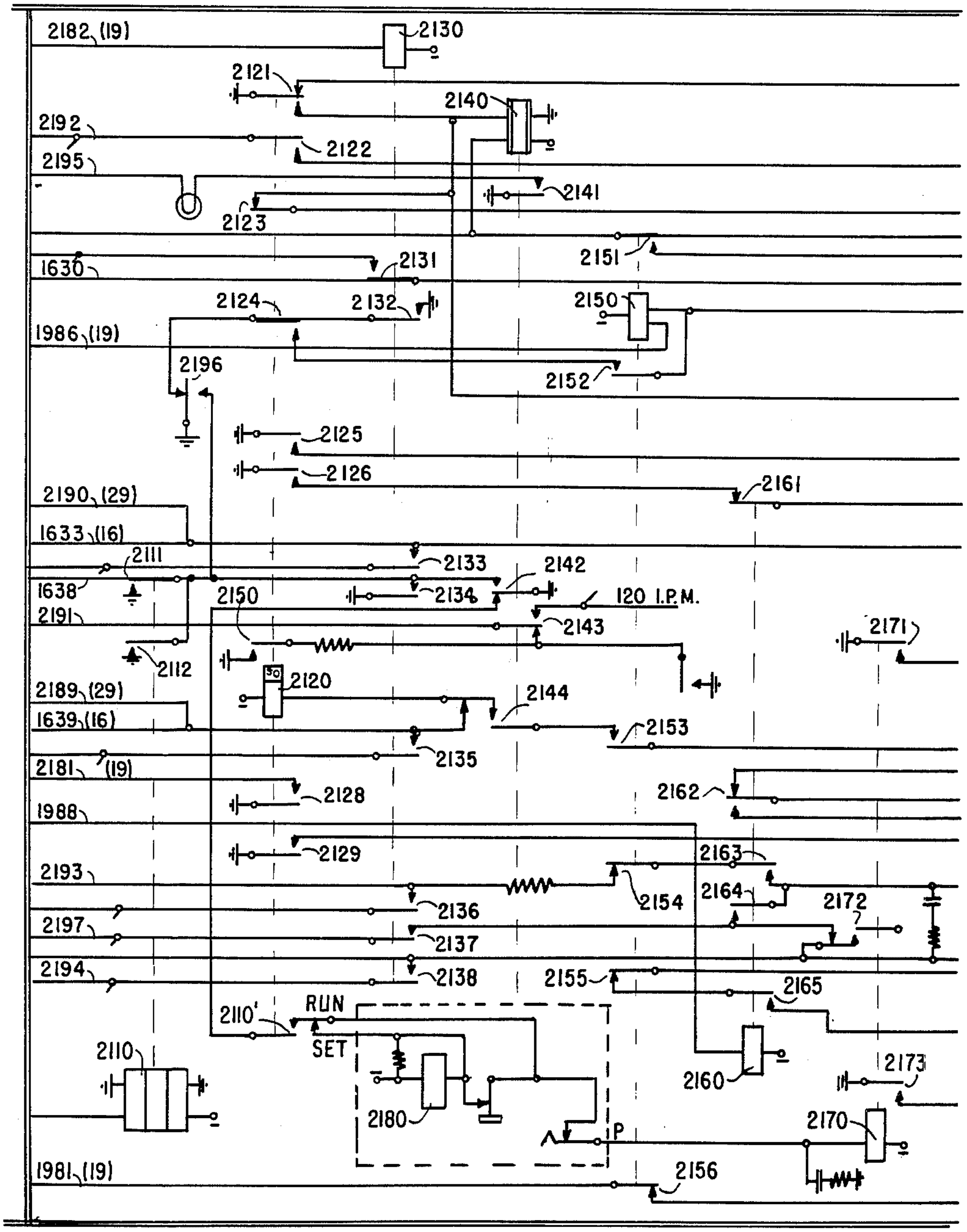
Figure 22:
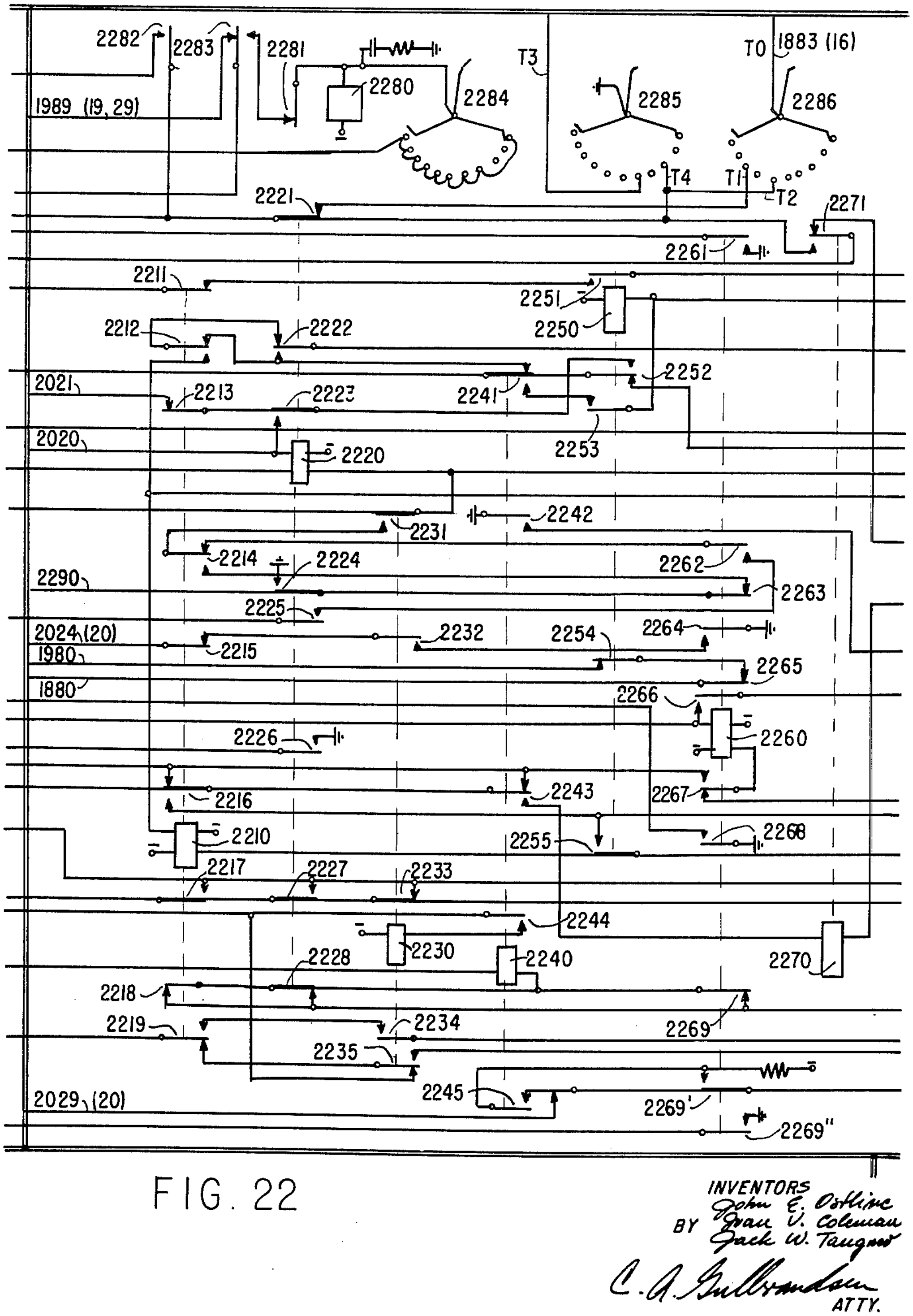
Figure 23:
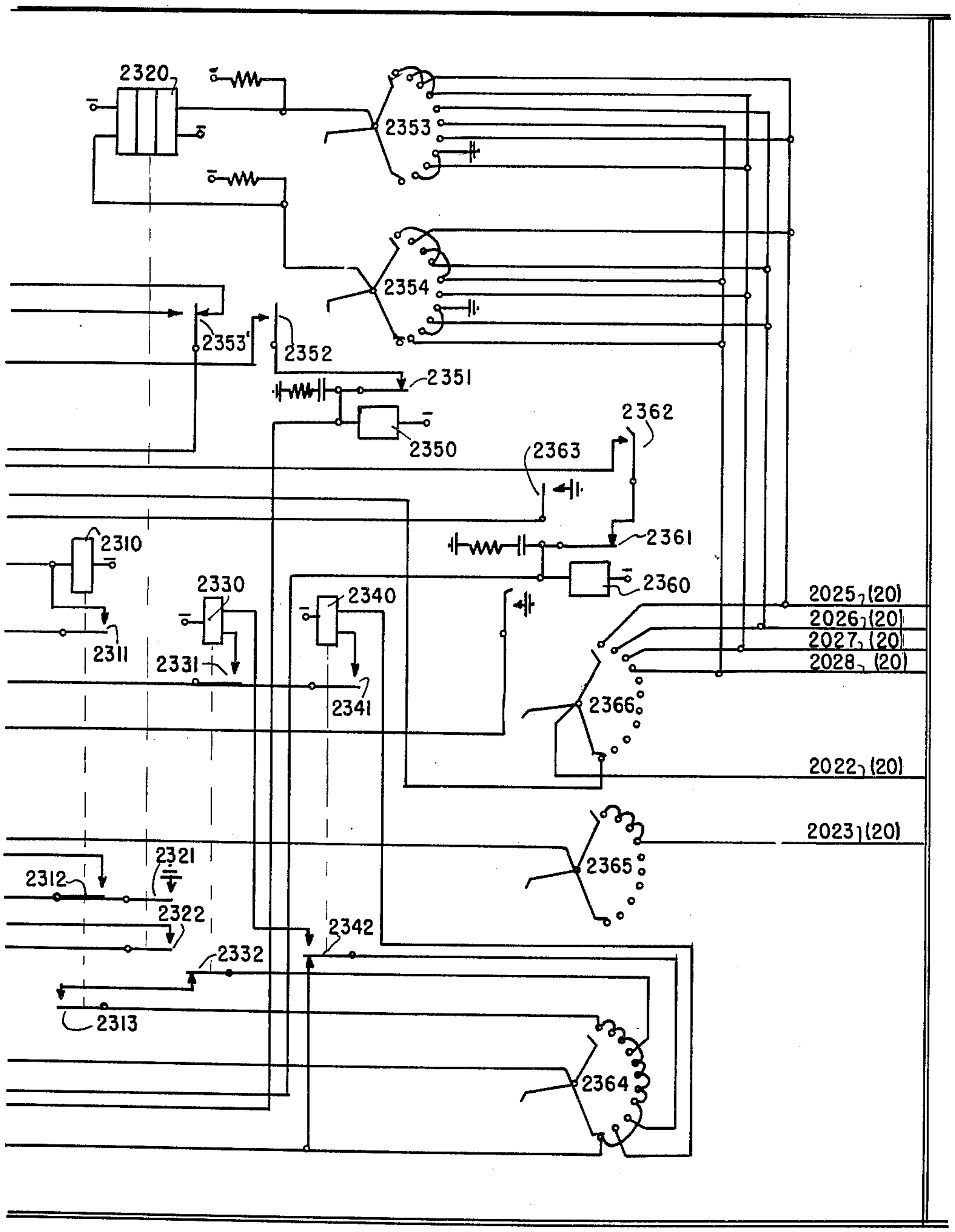

FIGS. 21, 22 and 23 disclose in schematic form the details of the transender-sender.

The major function of the sender is to control the sending of impulses from the transender. The sending operation is started as soon as the coder has received the routing directive, or the coder may await a signal from the ticketer before starting the sender.

Pulses are generated by a small constant speed motor (48 v. D.C.) to control the sender pulse relay to provide pulses at a uniform speed and pulse ratio. Pulses sent by this circuit are determined by information stored in the coder and ticketer. Pulses are sent over lead 5022 (sender control digit) and over the loop to the ticketer selector (or equivalent switches). An adjustable interdigital period is provided.

Stop dial supervision can be received during the interdigital period. Upon receipt of a stop signal, the sender extends the interdigital counting interval ly 2.2 seconds so that slow flashing busy signals (30 i.p.m.) can be differentiated from momentary stop dial signals. The outgoing trunk and the transender are automatically released when a flash busy is recognized. A stop signal can also be recognized for flash counting purpose during the out-pulsing of a digit, but pulsing will not be interrupted unless a flash is recognized before the digit is completed.

Figure 29:
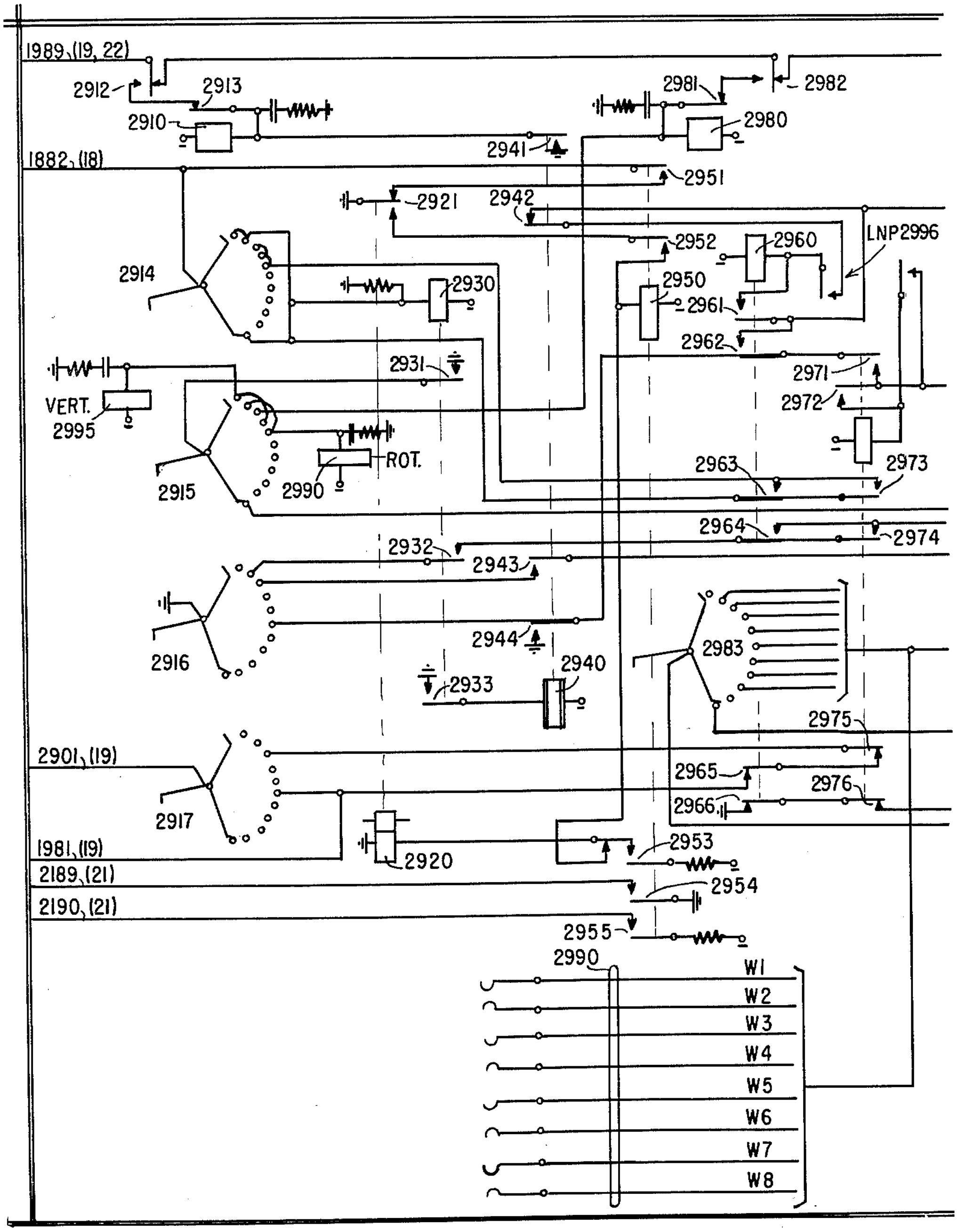
Figure 30:
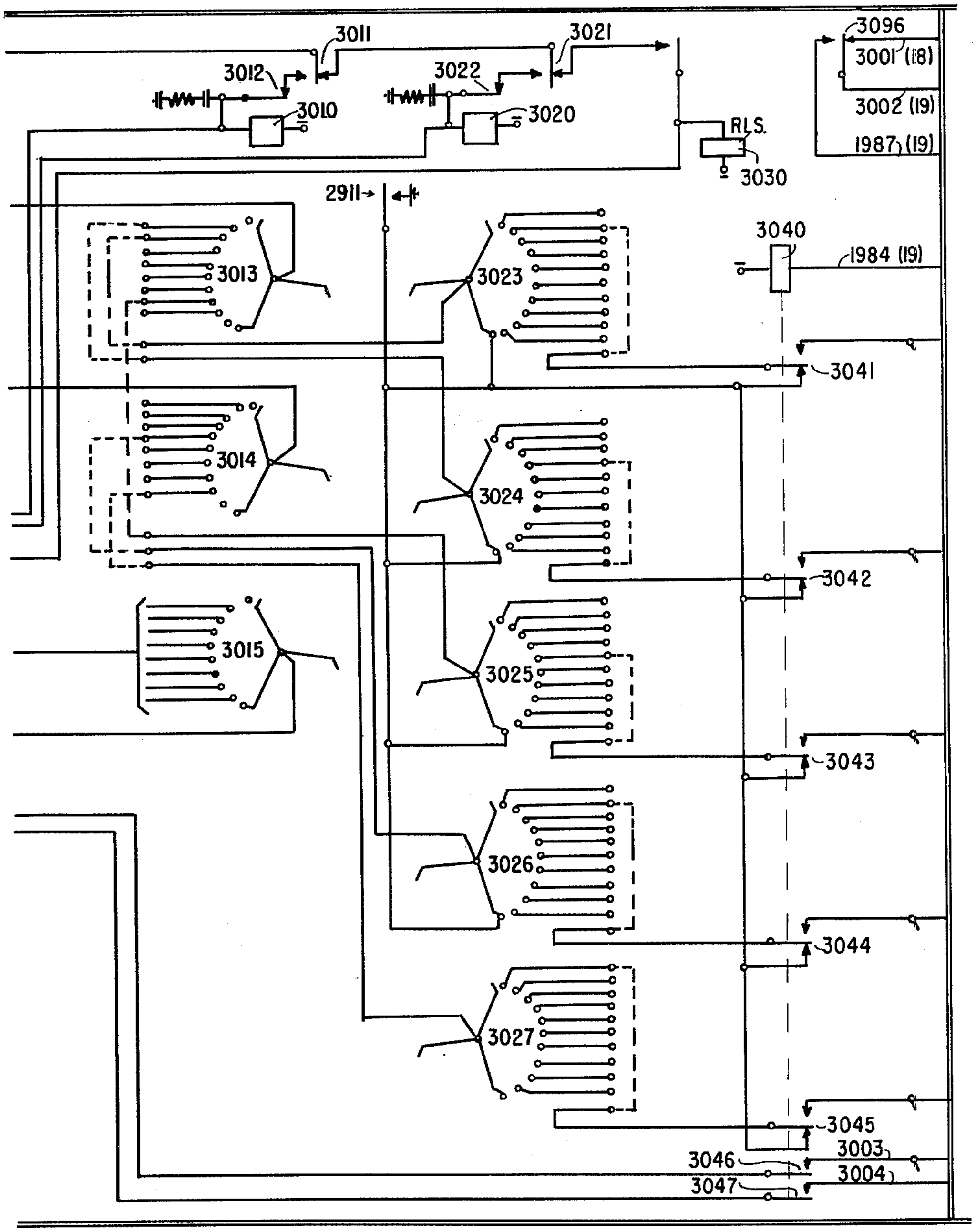

FIGS. 29 and 30 disclose in schematic form the details of the transender codexer. The main functions of this circuit are:

(1) To receive subscriber dial pulses, inverted and repeated to the transender by a ticketer.

(2) To register the three-digit office or foreign area code on an 800 point Strowger switch to select a code lead extending into the common translator. The selected code lead is marked, and the single code indication is forwarded under control of the translator assigner.

(3) To recognize specific foreign area code requiring dual translation, in which case the area code is stored on rotary switches and the Strowger switch is released and re-positioned on the three-digit office code. The original area code is forwarded via one of five leads and the selected office code lead is marked under control of the translator assigner.

(4) To provide facilities to identify up to five foreign area codes for dual translation.

(5) To provide homing circuits for rotary switches and a release magnet for the Strowger switch with release failure alarm under control of the associated sender unit of the transender.

Figure 24:
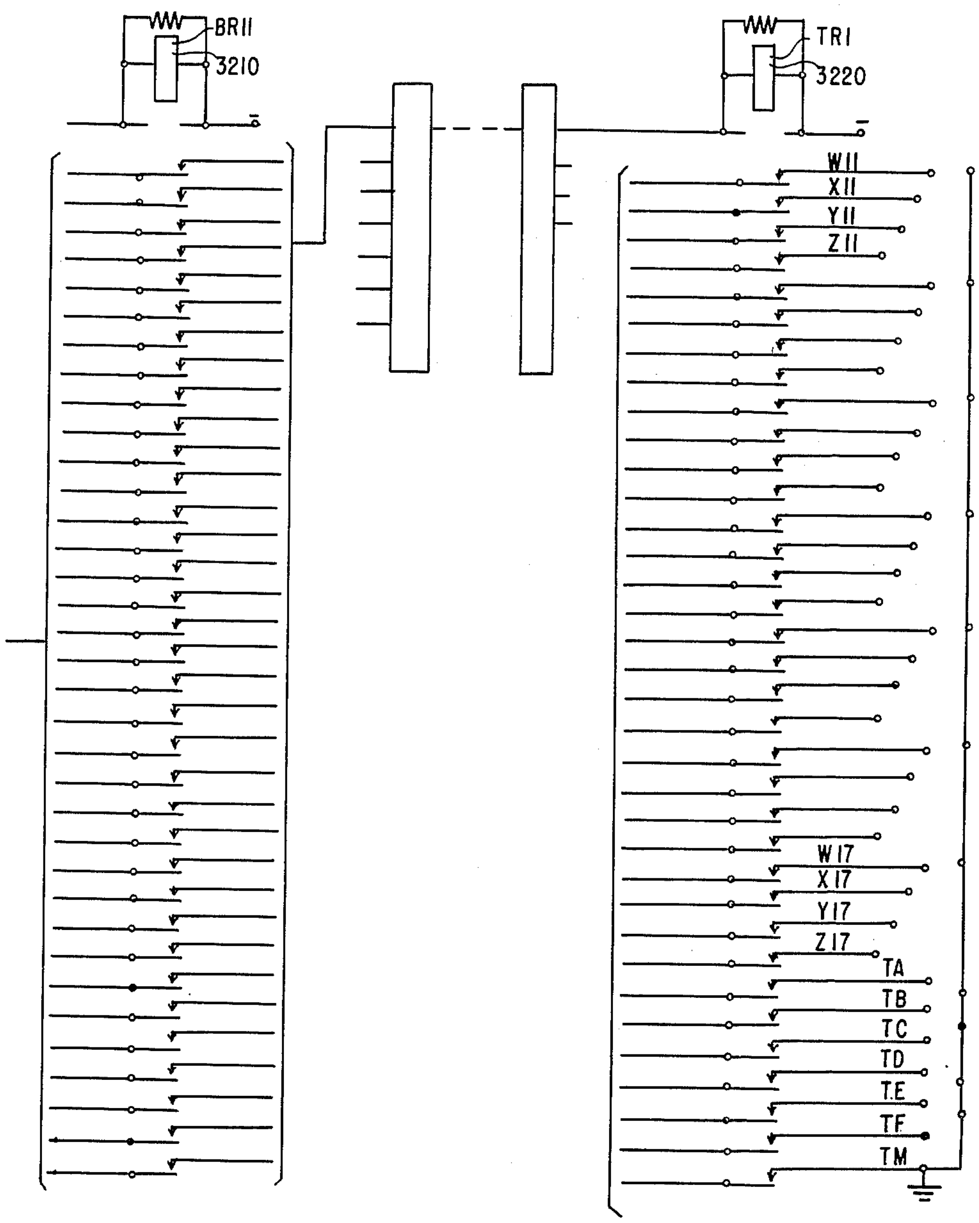
Figure 25:
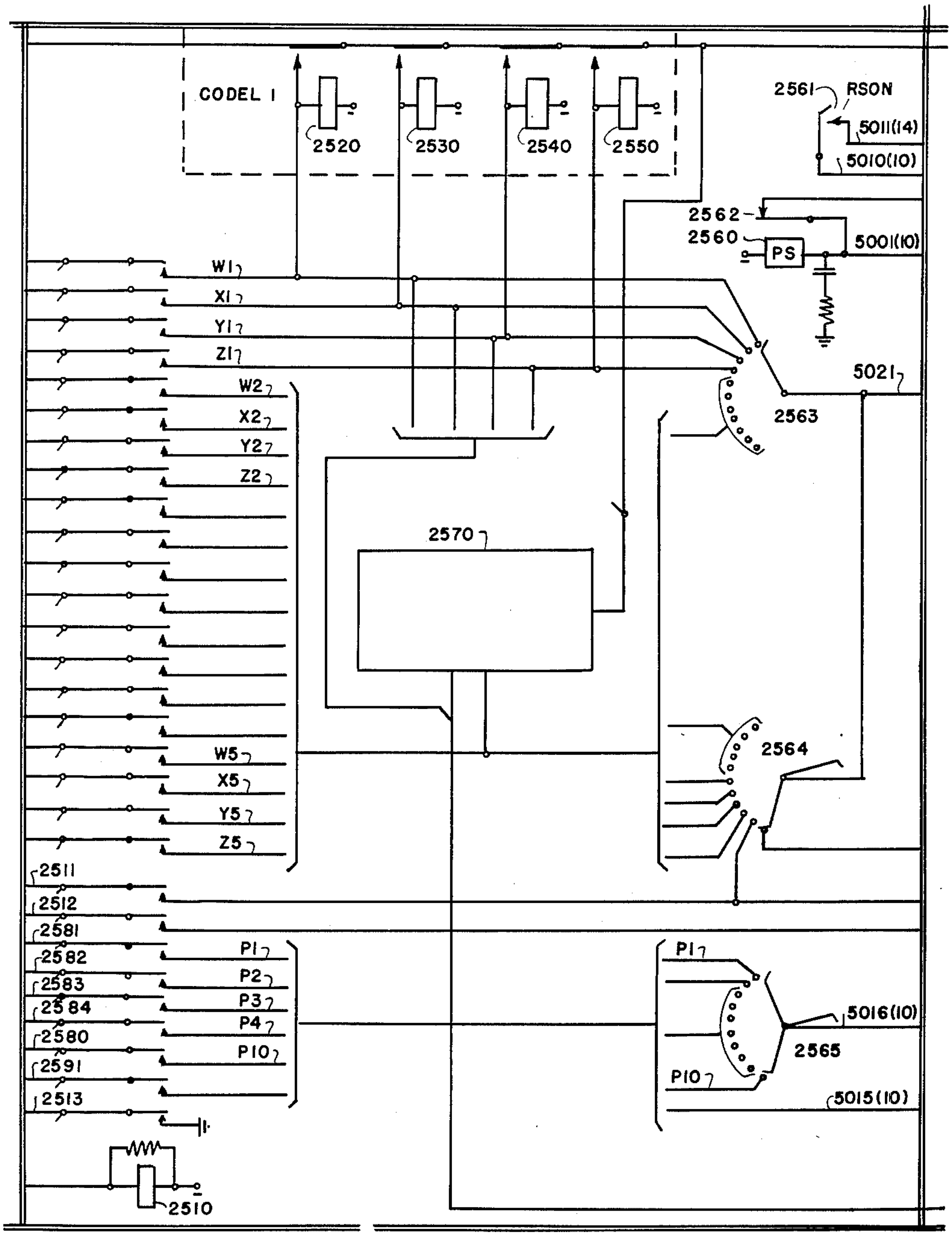
Figure 26:
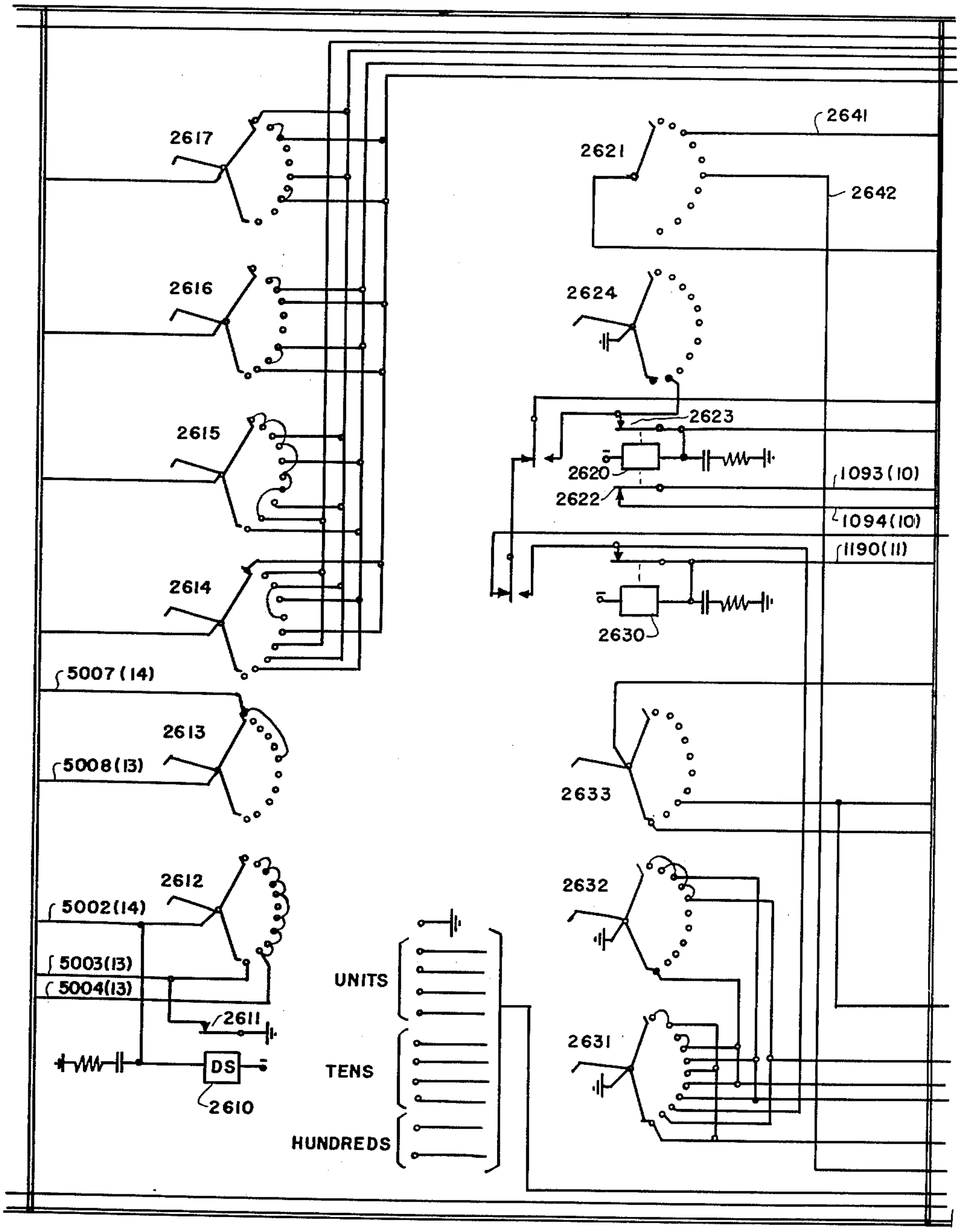
Figure 27:
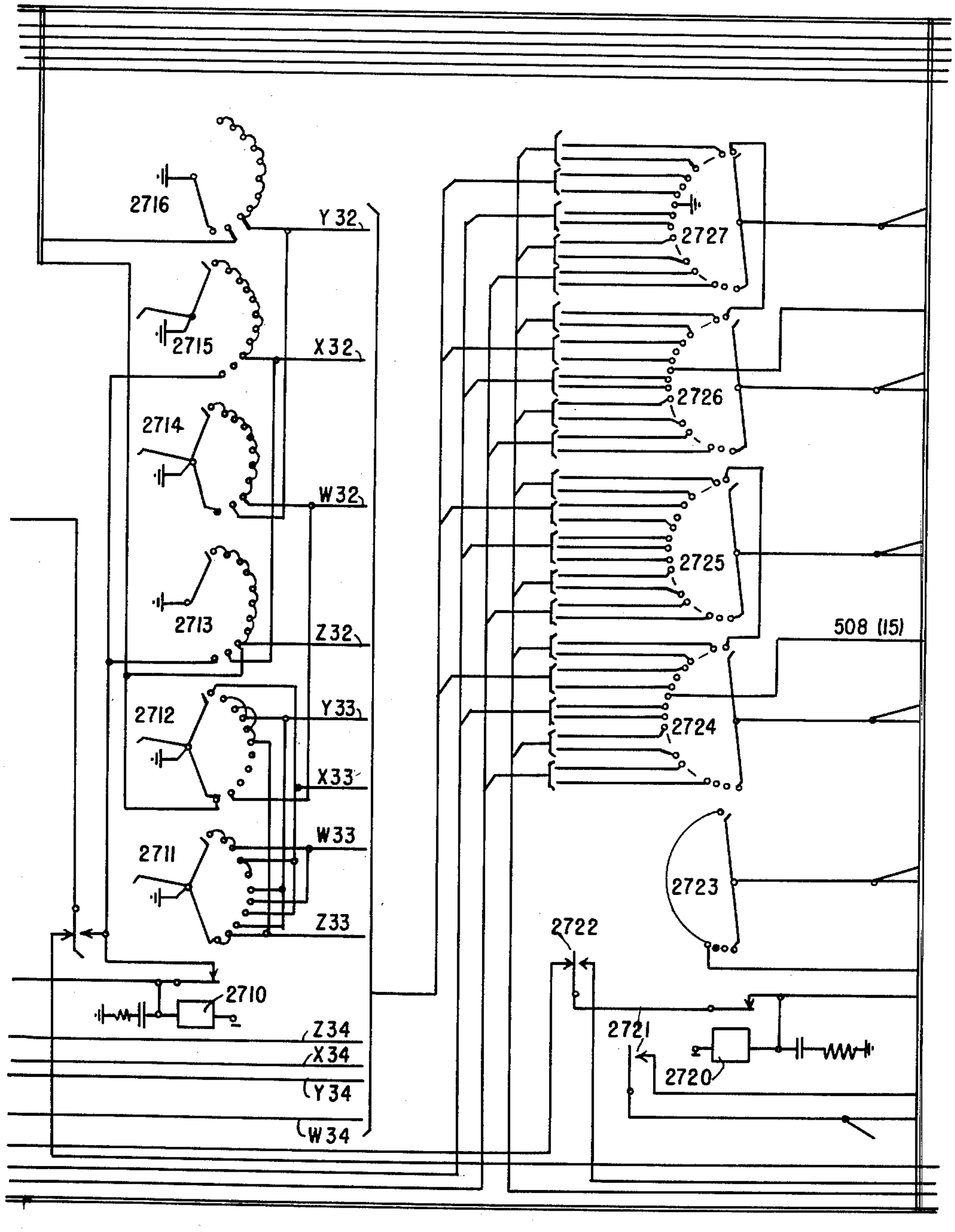
Figure 28:
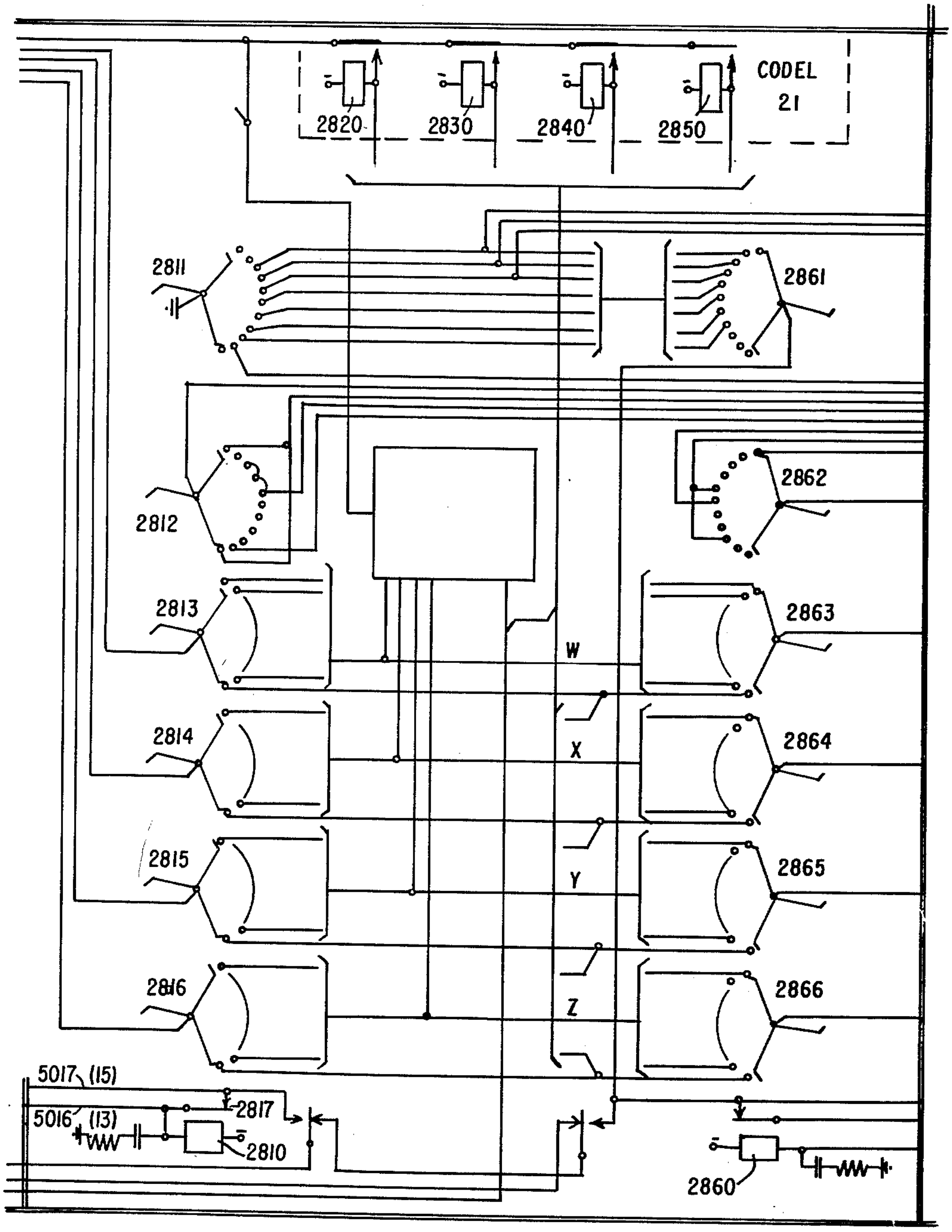
Figure 31:
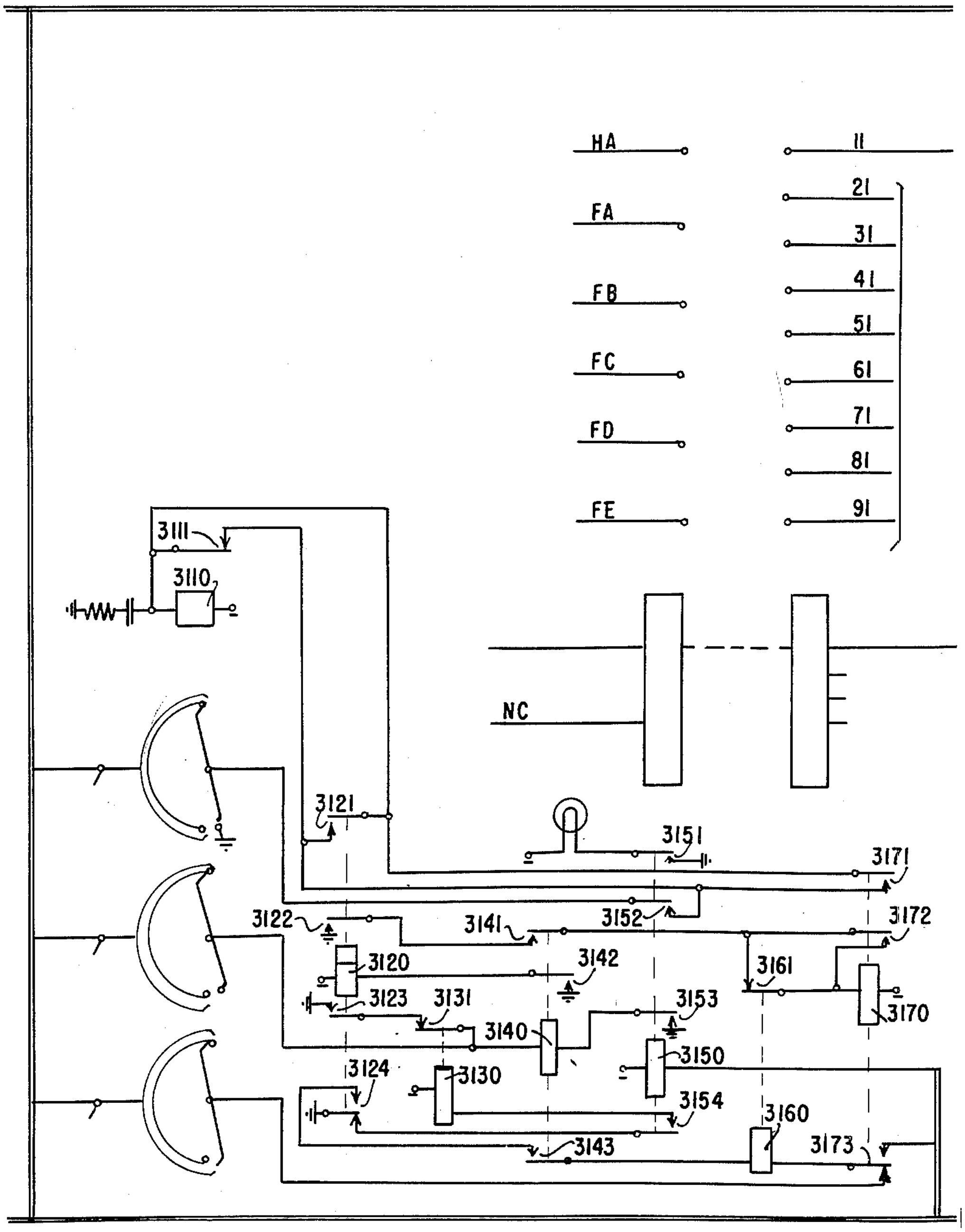

FIGS. 31 and 24 illustrate in schematic form a simplified translator. The translator is a group of relays which is used in conjunction with the transenders for the purpose of supplying the transenders with the necessary routing directive as determined by the first three or six digits registered in the transender on its codexer. The translator is common to the transenders; it is seized only momentarily when a routing directive is required. The connection of the transender to the translator is controlled by the translator assigner.

DETAILED OPERATION

*Seizure from local selector*

When the calling subscriber at station PS4 (whose directory terminal number is 0004) removes his receiver, the usual loop circuit, including the line conductors 921 and 922 is completed for operating the line circuit 915. In response to the completion of the above mentioned loop circuit, the line circuit 915 initiates operation of the distributor and marks the terminals of the calling subscriber line in the bank contacts of a group of line finders, including the line finder 920, having access to the calling subscriber line. For the purpose of this description it will be assumed that the distributor selects the line finder 920 and that the latter finder operates its wiper in a vertical and then in a rotary direction in the well-known manner to select the terminals in the associated bank terminating the calling line. When the calling line is found by the line finder 920, it extends the calling line to the individually associated first selector 925 and the latter selector transmits the usual dial tone signal to the calling subscriber to indicate that the dialling may be started. The above noted switching apparatus, including the line circuit 915, the distributor, the line finder 920 and the first selector 925 may be of conventional construction and arrangement and may be, for example, of the type illustrated in the Bakker Patent No. 2,289,896, granted July 14, 1942, and in the Saunders Patent No. 1,849,694, granted March 15, 1932.

Since the calling subscriber at station 0004 intends to extend the connection to a called subscriber in a remote exchange it is necessary to prefix the three-digit directory number of the called subscriber with the access code digits "90." Consequently, when the calling subscriber receives the dialling tone signal the dial is actuated in accordance with the digit 9 to transmit nine loop impulses to the first selector 925. This selector then raises its wipers in a vertical direction to the ninth level and then rotates its wipers over the selected level to search for an idle ticketer, such as the ticketer of 30. It will be assumed for the purpose of this description that the first selector 925 now extends the connection from the calling subscriber line by way of the cable 1000 to the ticketer 30 illustrated in FIGS. 10 to 15 and 25 to 28, inclusive. The cable 1000 includes the — conductors 1202, the + conductor 1201 and the control conductor 1001. If the thicketer is busy, the control conductor will be grounded in order to indicate the busy condition to the first selector 925. Thus, as the selector rotates its wipers over the ninth level it will pass over contacts terminating ticketers having grounded control conductors corresponding to the C conductor.

*Seizure of ticketer*

When the first selector 925 seizes the ticketer it extends the loop circuit, including the — and + conductors 1202 and 1201 of the calling line to the ticketer.

Referring now to ticketer 30, negative potential from spotter battery 1003 through resistor 1004 and break contacts 1213 is fed through the lower winding of relay 1230, break contacts 1253 the + line conductor 1202 of cable 1000, through the selector 925, the finder 920, the line circuit 915 through line 922 to the subscriber's instrument and back over line 921 the line circuit, the finder, the selector, the — line 1201 of cable 1000 through break contacts 1254, break contacts 1214, through the winding of polarized spotter relay 1170 and lamp 1101 completing a circuit to the positive terminal of spotter battery 1003 and the negative terminal of the exchange battery. This current flow from the spotter battery 1003 is in a direction which will not operate polarized relay 1170, but will operate relay 1230. Relay 1230 operates and closes the make contacts of the break combination 1231 to complete a circuit from ground potential at contacts 1256, make contacts 1231 to the number one winding of relay 1140. Relay 1140 operates and closes contacts 1146 to complete a circuit from ground at contacts 1256 to operate relay 1470, at contacts 1143 completes a circuit to relay 1040. Relay 1140 also at make contacts 1144 closes ground from break contacts 1131, make contacts 1144, break contacts 1257 and break contacts 1023, to the C lead 1001 of cable 1000 to hold the preceding equipment and mark this circuit busy.

Relay 1040 closes a circuit at contacts 1049 to operate relay 1320, at contacts 1041 closes the lead 1005 from the monitor panel to the supervisory lamp 1006, closes ground to lead 1007 to provide a busy mark to the incoming trunk circuit 20. Relay 1320 closes direct ground from contacts 1322 through break contacts 1054, 1073, 1161 and 1122 to the supervisory lamp 1006. The lamp 1006 lights brightly to indicate that the ticketer has been seized.

*Ticketer calls for transender*

When relay 1470 operates it closes relay 1530 and lead 1601 to lead 1602 of the transender hunter, and at contacts 1471 prepares an operating circuit for relay 1530. If the associated transender is busy, ground appears on lead 1601 from bank contacts associated with wiper 1613 to lead 1601, break contacts 1353, 1532 to the coil of relay 1530 the other end of which is grounded at contacts 1472. Busy transenders have ground on their respective ground leads corresponding to the 1601 lead. If the transender on which the wipers 1613 of switch 1610 are engaged is busy, the magnet operates from the ground on the guard lead corresponding to 1601 and opens its interrupter springs 1611. The magnet restores and advances the wipers one step. This self-interrupted stepping continues until an idle transender such as 40 is found or lead 1602 is opened.

When switch 1610 step to an idle transender 40, the absence of ground on the guard lead corresponding to lead 1601 permits relay 1530 in the ticketer to operate through the magnet of switch 1610, battery through coil of switch 1610, lead 1602, contacts 1462, 1021, 1252, 1471, 1562 to relay 1530 whose other terminal is grounded at 1472. Magnet of switch 1610 cannot operate on this circuit. When relay 1530 operates, it closes ground from make contacts 1532, break contacts 1353, to lead 1601 to mark the associated transender 40 busy to other transender hunters. Relay 1530 upon operating also closed a circuit at contacts 1534, to relay 1560, ground from contacts 1256, break contacts 1469, contacts 1478, 1534 to relay 1560. Relay 1560 operates its "X" contacts 1563 to transfer the holding path of relay 1530 from lead 1602 to lead 1603, and in operating fully opens lead 1602 at contacts 1562, closes leads 1604, 1605, 1606 and 1607 and closes leads 1608 and 1609 to switch through the transender to the ticketer selector.

*Dialling the toll access code digit 0*

In response to the dialling of the second digit of the toll access code, which in this case is the digit "0," the local line relay 1230 restores and operates ten times. The first time the line relay 1230 restores to normal it completes, at its break contacts 1232, a circuit from ground at contacts 1256, break contacts 1146, 1468, make contacts 1048, the break contacts 1232, the break contacts 1447, the break contacts 1034 and lead 5001 for energizing the party marking switch rotary magnet 2560. The magnet of switch 2560 is retained in its operated position until the line relay 1230 reoperates, at the end of the first pulse, at which time the magnet restores to normal and advances its wipers 2563, 2564 and 2565 one step. Thus in response to the ten impulses transmitted to the line relay 1230, the above traced circuit for the magnet of switch 2560 is completed ten times. Also during the first time the line relay 1230 restores to normal it completes at its break contacts 1231, a circuit from ground at contacts 1256 including the break contacts 1231 and the make contacts 1145 for operating relay 1430 and through break contacts 1414 for operating relay 1370. Relay 1430 completes a circuit to relay 1360 which operates and closes a holding circuit to relay 1370 through the number two winding of relay 1410, contacts 1371, make contacts 1369, lead 5003 to ground at the interrupter springs of rotary switch 2610.

At the end of the first dial pulse, as relay 1230 reoperates and opens the circuit to relay 1430 at contacts 1231, it removes the short from winding number two of relay 1410. Relay 1410 operates in series with relay 1370 and transfers the pulsing circuit through its number one winding to the magnet of rotary switch 2610. Relay 1430 being slow-to-release, remains operated during dialling of the digit.

When relay 1230 restores on the second dial pulse, it closes the circuit to the magnet of rotary switch 2610 through lead 5002 and the number one winding of relay 1410. The magnet of rotary switch 2610 in operating opens its interrupter springs 2611. The springs 2611 open the circuit to relay 1370, but relay 1410 remains operated on its number one winding for the duration of the pulse.

At the end of the second dial pulse, as relay 1230 reoperates, it opens the circuit to the magnet of rotary switch 2610. Rotary switch 2610 advances its wipers 2613 and 2612 one step. Relay 1410 restores and at break contacts 1414 transfers the pulsing circuit back to relay 1370. This same sequence of operations for relay 1370 and 1410 and switch 2610 is repeated for the remaining dial pulses, and switch 2610 will advance its wipers following the second, fourth, sixth, eighth and tenth dial pulses.

After the tenth dial pulse, the wiper 2613 and 2612 of switch 2610 are engaged on bank terminals 1 or 6, depending on the position of the switch at the start of dialling. It is to be noted that switch 2610 is a homing switch, that is when a digit is completed and relay 1360 restores, ground is closed via interrupter springs 2611, lead 5004 and break contacts 1369 to the bank terminals 2, 3, 4, 5, 7, 8, 9 and 10 of the level associated with wiper 2612. If the wipers are engaged on any of these bank terminals, switch 2610 will step to bank terminals one or six.

When digit "0" is completed, relay 1430 restores, opens the circuit to relay 1360, which is slow-to-release, and closes ground via contacts 1432, 1273, lead 5005, the wipers 2812, lead 5006, contacts 1365, lead 5008, wiper 2613, lead 5007, contacts 1445, 1413 to relay 1240. Relay 1240 operates and locks through the number two winding of 1440 and contacts 1474 to ground and closes ground to lead 5007 to indicate a locally originated call. When relay 1360 restores it closes ground via contacts 1045, lead 5010, rotary off-normal springs 2561, lead 5011, contacts 1466, 1364, 1476, 1224, 1515 and 1244 to relay 1150. Relay 1440 operates through 1240, closes a circuit at contacts 1442 to relay 1210, and transfers the pulsing circuit from switch 2650 to the transcender hunter wiper 1619. Relay 1150 operates and closes ground to lead 5012 to the detector assigner, removes ground from the guard lead 5013, and closes relay 1010 to lead 5013' to the detector assigner. Relay 1210 operates momentarily, closes the number two winding of relay 1230 while transferring the "ring" or "—" side of the line from spotter battery 1003 to exchange battery through break contacts 1213, and the "tip" or "+" side of the line from relay 1170 to ground at make contacts 1214. Relay 1230 is now held by exchange battery over the subscriber's loop.

*Identification of the calling party*

Type B SATT installations are capable of serving both single party lines and party lines with as many as ten stations. All stations on party lines must be equipped with special spotter dials, stations on a single party line are equipped with regular dials.

The spotter dial differs from the regular dial in that it provides an additional set of spotter springs which can be closed by a special cam. During the return of the dial, the spotter springs closed interval is positioned to occur only during the period when the regular pulsing springs are closed. The spotter springs when closed by the special cam close a spotter ground pulse on the tip or positive side of the line. The spotter cam can be arranged to close the spotter ground pulse on the line after any one of the individual dial pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth and tenth stations on a party line are arranged accordingly. For purposes of this explanation it is assumed that the calling station is the fourth station on the party line thus no spotter pulse will be closed via the tip or plus type side of the line until after the fourth dial pulse.

Now consider what happened to switch 2560 as the digit "0" was being dialled in the preceding section. Switch 2560 stepped to bank terminal 1 after the first dialled pulse. Then as relay 1230 follows the second, third and fourth pulses the wipers of switch 2560 are advanced to bank terminals 2, 3 and 4. Immediately after the fourth dial pulse the spotter dial of station PS4 closes a spotter pulse from springs 42 via the tip or pulse side of the line.

Relay 1170 is a high speed polarized relay which will not operate from spotter battery over the normal dialling loop but will operate from exchange battery when a spotter ground pulse appears on the positive side of the line. Relay 1170 operates during the interdigital pause between the fourth and fifth dial pulse and closes ground from contacts 1256, 1146, 1468, make contacts 1232, 1171 and make contacts 1362 to the number one winding of relay 1030. Relay 1030 operates and locks through its "X" contacts 1031, opens the pulsing circuit to switch 2650 at contacts 1034 removes ground from lead 5015 at break contacts 1033 and closes ground at the make contacts 1032 to the wipers 2565 of switch 2560 which are engaged on bank terminal four. When bar relay 2510 operates later, this ground will be closed to lead 2584 to the detector to indicate the party identity of the calling station, further dial pulses do not effect switch 2560. Wipers 2563 and 2564 of switch 2560 serve no function on locally originated calls. If the calling station is a single party line no spotter pulses are closed to the positive line lead, switch 2560 follows the ten dial pulses of digit "0" and steps to bank terminal 10 since relays 1170 and 1030 do not operate ground remains on lead 5015 to indicate a single party line. Although the spotter pulses may appear on the tip side of the line during dialling of the subsequent digits, they are ineffective to relay 1170 since the tip side of the line is transferred from relay 1170 to ground after the "0" digit is completed.

When ground is placed on the common start lead 5012 by relay 1150 of the ticketer, a relay operates in the detector assigner. Upon operating it closes the circuit to a rotary switch magnet. If direct ground appears on the guard lead, such as lead 5013, the magnet operates from the ground on these guard leads and opens its interrupter springs. The magnet restores and advances its wipers to the next ticketer. This self-interrupted stepping continues until the ticketer circuit requesting detection is found.

*Initiating detection cycle*

Ordinarily, the detection cycle is so rapid it wil occur shortly after the digit "0" is completed. Ground on lead 5012 and absence of ground on lead 5013 indicates to the detector assigner that a detection of a calling number is desired by a ticketer. When the detector assigner steps to the ticketer, relay 1010 operates over lead 5013 in series with a relay in the detector assigner. Relay 1010 closes a circuit at contacts 1012 via lead 1096 for relay 2510 and at contacts 1013 a circuit for relay 1130. Bar relay 2510 operates and closes leads W1 through Z5, 2581(P1) through 2580(P10) and 2591(P0), and 2511 to the detector and leads 2512 and 2513 to the detector assigner. Relay 1130 operates and closes positive 90 v. D.C. detection battery to the preceding equipment via the "C" conductor.

*Operation of detector*

When the detector is connected to the ticketer there is a ground potential on lead 3003, positive 90 v. D.C. battery on the "C" conductor of the calling line and a ground potential on some lead such as 2580(P0) through (P10) lead, depending on the station party marking of the calling party.

In the course of the detection cycle, the detection closes ground to the various W1 through Z5 leads. These grounds represent, in codel code, the equivalent office code and terminal number of the calling station. Codel relays in codels 1 through 5 operate from these grounds and lock to store the calling number. The decimal equavalents of the W, X, Y, Z codel relays are described in succeeding sections.

When the detection is complete, the detector closes ground to lead 2511. Relay 1220 operates and locks, closes battery through magnet 2860 to lead 1604, opens 1150 and opens 1010. Relay 1150 restores, removes ground from lead 5012 and closes ground to lead 5013. Relay 1010 restores, opens 1130 and bar relay 2510. Bar relay 2510 restores. Relay 1130 restores and replaces +90 v. D.C. detector battery with ground on the "C" lead. Resistor 1190 is used in conjunction with "X" 1132 makes on 1130 to facilitate application of detector battery to the "C" lead without dropping the switch train and without burning the relay springs when ground is connected to the +90 v. detector battery.

TICKETER REPEATS DIAL IMPULSES TO TRANSENDER FOR SEVEN DIGIT CALLED NUMBER CALLS

*Dialing digit A of the office code*

Relay 1230 follows the dial pulses of digit A and repeats them over the lead through wiper 1619, lead 1630 for example to the transender. As relay 1230 restores on the first pulse, it closes a circuit to relay 1430. Relay 1430 operates and being slow-to-release, remains operated for the duration of the digit. Relay 1430 closes a circuit to relay 1360. Relay 1360 operates and closes ground via springs 1467, 1444 and 1367 to energize magnet 2810. Switch 2810 is an indirect drive switch and advance its wipers at this time.

The cycle of operation for relay 1370(S) and 1410(T) and switch 2610 is the same as for the digit "0" in the preceding section and can be summed up as follows:

| After Dial Pulse | Relays T and S | Switch 2610 Energized On Terminal |
|---|---|---|
| 1 | Operated | 1 or 6 |
| 2 | Restored | 2 or 7 |
| 3 | Operated | 2 or 7 |
| 4 | Restored | 3 or 8 |
| 5 | Operated | 3 or 8 |
| 6 | Restored | 4 or 9 |
| 7 | Operated | 4 or 9 |
| 8 | Restored | 5 or 10 |
| 9 | Operated | 5 or 10 |
| 10 | Restored | 1 or 6 |

After dialling is completed, relay 1430 restores and opens 1360. Relay 1360 is slow-to-release and does not restore immediately. During the interval of time when 1430 is restored and 1360 remains operated, ground is closed via wipers of switch 2610 and switch 2810 to various W, X, Y, Z codel relays in codel 21.

The different combinations of codel relay which operate will depend on the digit dialled. If the digit is odd, ground is closed over the level 2615 and 2617 wipers of switch 2610. If the digit is even, ground is closed over the level 2614 and 2616 wipers of switch 2610. The codel relay combinations and their decimal equivalents are as follows:

| | |
|---|---|
| WX1 | YZ6 |
| WY2 | W7 |
| WZ3 | X8 |
| XY4 | Y9 |
| XZ5 | Z0 |

As the various W, X, Y, Z codel relays in codel 21 operate and lock, they close ground to the corresponding bank terminals of switch 2860 and 2720. When relay 1360 restores, it opens magnet 2810 and closes the "homing" circuit to switch 2610. Switch 2810 advances its wipers to bank terminal 1 and prepares a circuit to codel 22. Switch 2610 "homes" to bank terminal 1 or 6.

*Dialling digit B of the Office code*

Relay 1230 follows the dial pulses of digit B and repeats them over the lead through wiper 1619, lead 1630 for example to the transender. The cycle of operation for relays 1370, 1430, 1360 and 1410 and switches 2610 and 2810 during dialling is the same as for digit A of the office code in the preceding section.

After dialling is completed, the codel relays in codel 22 operate and lock to store digit B of the office code, switch 2810 advances to bank terminal 2, and switch 2610 "homes."

*Dialling digit C of the office code*

Relay 1230 follows the dial pulses of digit C and repeats them over the lead through wipers 1619, lead 1630 for example to the transender. The cycle of operation for relay 1370, 1430, 1360 and 1410 and switches 2610 and 2810 during dialling is the same as for digit A of the office code in the preceding section.

After dialling is completed, the codel relays in codel 23 operate and lock to store digit C of the office code, switch 2810 advances its wipers to bank terminal 3 and switch 2610 "homes." When switch 2810 steps to its third bank terminal, it closes ground via contacts 1437, 1273, lead 5005, the wiper 2812 of switch 2810 engaged on bank terminal 3, lead 5016, contact 1555, lead 5017, INT. springs 2817 of 2810 to the magnet. Magnet 2810 operates and opens its INT. springs 2817. Magnet 2810 restores and advances the wipers of switch 2810. This self-interrupted stepping continues until switch 2810 steps to bank terminal 6.

*Dialling the four terminal digits*

Relay 1230 follows the dial pulses of the four terminal digits. The cycle of operation for relays 1370, 1430, 1360, 1410 and switches 2610 and 2810 for each of the terminal digits is the same as for digit A of the office code in the preceding section. The first, second, third and fourth terminal digits are stored on codels 27, 28, 29 and 30, respectively. After the fourth terminal digit is dialled, switch 2810 steps to bank terminal 10.

*Dialling called number for ten or eleven digit calls*

On a ten or eleven digit call, the first three digits constitute the toll area code, of which the second digit is always either 1 or 0; the second three digits constitute the ABC office code; and the last four or five digits constitute the terminal digits.

*Dialling first digit or area code*

Relay 1230 follows the dial pulses of the first digit of the area code and repeats them over the lead through wipers 1619, lead 1630 for example, to the transender. The cycle of operation for relays 1370, 1430, 1360 and 1410 and switches 2610 and 2810 during the dialling of this digit is the same as the digit A of the office code in the preceding section. After dialling is completed, the codel relays in codel 21 operate and lock to store the first digit of the area code, switch 2810 steps to the first bank terminal and switch 2610 "homes."

*Dialling second digit of area code*

Relay 1230 follows the dial pulses of the second digit of the area code and repeats them over the lead through wipers 1619, lead 1630 for example, to the transender. The cycle of operation for relays 1370, 1430, 1360, 1410 and switches 2610 and 2810 during dialling of this digit is the same as for digit A of the office code. Since the second digit of the area code is 1 or 0, switch 2610 will either not stop at all or will step five times. In either case, switch 2610 engages bank terminal 1 or 6 after the last dial pulse.

At the end of dialling relay 1430 restored. Relay 1430 closes the codel relays in codel 22 and closes ground via springs 1432, 1273, lead 5005, the wipers 2812 of switch 2810 engaged on the first bank terminals, lead 5006, contacts 1365, lead 5008, the wipers 2613 of switch 2610 engaged on the first or sixth bank terminals, lead 5007 to make contacts 1445 to the number one winding of relay 1550. The codel relays in codel 22 operate and lock to store the second digit of the area code. Relay 1550 operates, locks on its #2 winding, closes ground through make contacts 1554, lead 5018 to the eighth level bank terminal of switch 2720, wiper 2724 and opens the circuit at contacts 1555 to magnet 2810, to the third, fourth and fifth wiper level 2812 bank terminal of switch 2810.

Relay 1360 restores and opens magnet 2810. Switch 2810 steps to the second bank terminal.

*Dialling third digit of area code*

Relay 1230 follows the dial pulses of the third digit of the area code and repeats them over the lead through wipers 1619, lead 1630 for example, to the transender. The cycle of operation for relays 1230, 1370, 1430, 1350 and 1410 and switches 2610 and 2810 during dialling of this digit is the same as for digit A of the office code. After dialling is completed, the codel relays in codel 23 operate and lock to store the third digit of the office code, switch 2810 steps to the third bank terminals and switch 2610 "homes."

*Dialling ABC office code and terminal digits*

Relay 1230 follows the dial pulses and repeats them over the lead through wipers 1619, lead 1630 for example, to the transender should the transender require it. The cycle of operation for relays 1370, 1430, 1360, 140 and switches 2610 and 2810 during dialling of these digits is the same as for digit A of the office code. The ABC office code and four terminal digits for ten digit calls are stored in the codels as follows:

Office code digit A—Codel 24
Office code digit B—Codel 25
Office code digit C—Codel 26
First terminal digit—Codel 27
Second terminal digit—Codel 28
Third terminal digit—Codel 29
Fourth terminal digit—Codel 30

After dialling the tenth digit (fourth terminal digit) of the called number, switch 2810 steps to bank terminal 10. Should the call be an eleven digit call, the eleventh digit (fifth terminal digit) is stored on codel 31 and switch 2810 will step to normal position after the last digit is completed.

SENDING FROM THE TRANSENDER

*Sending for seven digit calls*

After the transender has received the ABC office code digits over the lead through wipers 1619, lead 1630 for example, it starts the cycle of operation whereby the transender is supplied with translated information from the translator. This translated information, which is stored on codels in the transender, is composed of a sending control digit, a translated routing directive, and possibly a hold sending mark. The hold sending mark indicates to the transender to hold sending until the seventh or tenth digit of the called number has been registered in the ticketer. If the transender does not receive a hold sending mark from the translator, the sending cycle is as follows.

When the translated information has been received, the transender closes leads 1631 and 1632 to seize the ticketer selector or trunk circuit and begins transmitting the sending control digit as a series of ground pulses, occurring at a frequency of ten pulses per second, over lead 1633 to relay 1540 and magnet 2860. The sending control digit is composed of from one to ten pulses, and its function is to absorb those digits of the called number which are not required for sending. On the first sending control pulse, a circuit is closed to relay 1540. Relay 1540, being slow-to-release, operates and remains operated for the duration of the sending control pulses. Magnet 2860 follows the pulses and steps its wipers each time it restores.

For purposes of this explanation, assume that the first two digits were not required for sending. Under these conditions, the transender closes three pulses over lead 1633 to magnet 2860. Switch 2860 follows the pulses and steps its wipers to bank terminal 3. After the last pulse, relay 1540 restores and closes a circuit to the second winding of relay 1270 via magnet 2860 which does not operate at this time, to battery. Relay 1270 operates its "X" contacts, locks on its #1 winding, and operates fully. Relay 1270, in operating fully, opens its #2 winding, opens the circuit to relay 1540, transfers lead 5030 from the pulsing contacts of 1230 to the level C wiper of switch 2860 and closes leads 1605(XT), 1606(YT), and 1607(ZT) to the levels 2864, 2865 and 2866, wipers of switch 2860 respectively.

When the transender has completed the sending of the sender control digit, it begins sending the translated routing directive which may contain a maximum of six digits. The transender sends the routing directive, and all subsequent digits, in the form of loop pulses via leads SR and ST, and provides an interdigital pause between each digit. After the transender has finished sending the translated routing directive, it beings sending the decimal equivalents of the codel grounds appearing on leads 5030, 1605, 1606 and 1607.

If, as assumed earlier, the sending control digit has been 3, the wipers of switch 2860 would be engaged on bank terminal 3 and codel 23 would be closed to leads 5030, 1605, 1606 and 1607. Thus, the first two (AB) digits of the office code have been absorbed and the third (C) digit of the office code will be the first digit of the called number to be sent by the transender.

During the interdigital pause after the digit stored on codel 23 has been sent, the transender closes a ground pulse over lead 1633 to magnet 2860. Switch 2860 steps to bank terminal 4, and in so doing, closes ground on level 2861, bank terminal 4 to relay 1310. Relay 1310 operates and opens lead 1633 at contacts 1311. The transender must find resistance battery on lead 1633 as a condition for sending. As long as lead 1633 is open, the transender will not send any additional digits.

Ground on level 2861, bank terminals 4, 5 and 6 causes switch 2860 to step, self-interrupted, to bank terminal 7, thus skipping codels 24, 25 and 26 on which no information has been registered. As switch 2860 steps, relay 1310 remains operated from the ground on these bank terminals. After switch 2860 steps to bank terminal 7, relay 1310 restores and closes resistance battery to lead 1633.

Relay 1310 is now under control of the subscriber's dialling. As long as the subscriber's dialling remains ahead of the sending, relay 1310 will remain unoperated. Should the subscriber hesitate in dialling and switch 2860 catch up to switch 2810, relay 1310 will operate and prevent any further sending until the subscriber is again one digit ahead of sending.

When resistance battery is closed to lead 1633, the transender begins sending the digit stored in codel 27. During the interdigital pause after the digit has been sent, the transender again closes a ground pulse over lead 1633 to magnet 2860. Switch 2860 steps to bank terminal 8 and closes codel 28 to leads 5030, 1605, 1606 and 1607. The digits stored on codels 28, 29 and 30 are sent in the same manner.

After the digit stored on codel 30 has been sent, the transender closes a ground pulse over lead 1633 to switch 2860 and relay 1250. During the pulse, relay 1250 operates its "X" contacts 1259 from the ground pulse on lead 1633 via springs 1565, 1311, 1221, 1255, 1473, 1542, lead 5031, the level 2862, wipers of switch 2860 engaged on bank terminal 10, lead 5032, the #1 winding of 1250, 1274, the level 2812 of switch 2810 engaged on bank terminal 10, 1273, the 100 ohm resistor 1280 to exchange battery. Relay 1250, in operating its "X" contacts 1259, locks through its #2 winding and operates fully to start the switch-through cycle of operation. After the ground pulse, switch 2860 steps to normal position.

If the transender received a hold sending mark from the translator, the transender will not begin sending until the subscriber had dialled the last terminal digit of the called number. At that time switch 2810 steps to bank terminal 10 and closes ground via springs 1432, 1273, the 2812 wipers of switches 2810, 1277, and 1526, to lead 1606. Ground appearing on lead 1606 at this time indicates to the transender that the fourth terminal digit has been dialled and sending may begin. The cycle of operations during sending is the same as previously mentioned.

*Sending for ten or eleven digit calls*

After the transender has received the three area code digits over the lead through wipers 1619, lead 1630 for example, it decides whether or not the ABC office code is also required for a translation. In either case, when it has received the required digits, it starts the cycle of operation whereby the transender is supplied with translated information from the translator. When this information is received, the sending cycle is the same as previously described with the following exceptions:

When switch 2860 steps to bank terminal 4, it does not step self-interrupted to bank terminal 7 since relay 1550 has operated and removed the ground from bank terminals 4, 5 and 6.

After the tenth digit (fourth terminal digit) has been sent, the transender closes a ground pulse on lead 1633. If an eleventh digit (fifth terminal digit) has been dialled by this time, switch 2810 is in normal position. Thus, the pulse on lead 1633 steps switch 2860 to normal position, but does not close relay 1250 at this time, as in a seven or ten digit call. The transender then sends the eleventh digit (fifth terminal digit) stored on codel 31. After this digit has been sent, the transender again closes a ground pulse over lead 1633 to switch 2860 and the #2 winding of 1250. Relay 1250 operates its "X" contacts 1254 from the ground pulse on lead 1633, via springs 1565, 1311, 1221, 1255, 1473, 1542, the wiper 2862 of switch 2860 in normal position, the break of the make before break 1257, and the #2 winding of 1250 to exchange battery.

Relay 1250 is operating its "X" contacts 1959, locks through its #2 winding and operates fully to start the switch-through cycle of operation as described in the preceding section.

*Stop-dial and flashing signal supervision*

If stop-dial supervision is encountered during the sending interval, ground is closed to lead 1090. Relay 1050 operates and closes ground over lead 1630 to the transender to hold further sending until the stop-dial supervision is removed.

If a flashing signal is closed to lead 1090 during the sending interval, relay 1050 follows the first two pulses and repeats them over lead 1630 to the transender. During the second pulse the transender opens lead 1639. Relay 1530 restores, removes the short from resistor 1380, and closes the #1 winding of 1460. Relay 1460 operates its "X" contacts 1464, locks through its #2 winding, closes busy tone on lead 1480 to the calling subscriber via "—" line leads, opens 1560, opens the circuit to the first winding of 1460, closes ground on lead (RLS) 1091, closes a holding circuit to 1050, closes holding circuit to #2 winding of 1040, and removes the operating ground for magnet 2810 and codels 21 through 31. Relay 1560 restores. Relay 1050 which is held operated by 1460, closes lead 1002 (60 i.p.m.) through resistor 1004 to the supervisory lamp and lead 1005. The supervisory lamp flashes dimly at 60 i.p.m. The ticketer thus remains operated until the calling party disconnects.

*Switch through*

Prior to sending, the seized ticketer selector or trunk circuit closed ground to lead C. When relay 1250 operates fully after sending is completed, it opens #1 winding of 1230, closes #2 winding of 1140 to ground on lead C, transfers lead 1091 to ground on lead C, and switches through the preceding selector to the ticketer selector or trunk circuit. Relay 1230 restores and opens #1 winding of 1140, 1560 and 1470. Relay 1140 remains operated on its #2 winding. Relay 1560 restores and opens lead 1603, 1609, 1604, 1605, 1606 and 1607 to the transender hunter. When lead 1603 is opened, the associated transender is released and relay 1530 is opened. Relay 1530 restores and removes the short from resistor 1380.

Relay 1470 restores, closes ground over lead 1480 to the ticketer selector or trunk circuit to indicate cut-through, and opens 1210, #1 winding of 1270, #1 and #2 winding of 1030, 1220, 1240 and #2 winding of 1440. Relays 1210, 1270, 1440, 1220, 1240 and 1030 (if operated) restore.

CALLED PARTY ANSWERS

When the called party answers, "answer" supervision is relayed through the trunk circuits and through the ticketer selector or trunk circuit to this circuit by ground over the 1090 lead. Relay 1050 operates, extends relay 1110 to a source of 1 second time pulses on lead 1381, and transfers the supervisory lamp and lead 1005 from direct ground to lead 60 through resistor 1004. This causes the supervisory lamp to flash dimly at 60 i.p.m. to indicate that the call has been answered. Relay 1110 follows the pulses on lead 1381 and pulses at the rate of one pulse per second.

CONVERSATION TIMING

This ticketer times the length of conversation and provides a maximum 309 minute timing interval. The conversation time is accumulated on rotary switches 2620, 2630 and 2710. Although the conversation timing cycle begins when answer supervision is received, a "grace period" of 6.5 seconds is provided before any conversation time is actually registered. Immediately after the "grace period" the first minute of conversation is registered. At the end of the first minute of conversation, the second minute is registered, etc. until the end of the call or the 309 minute timing interval elapses. The 6.5 second "grace period" is designed to prevent ticketing of calls to wrong numbers, and it can be varied by relocating leads 2641 and 2642 on the level 2621 bank terminals of switch 2620.

Relay 1110 operates from the first pulse on lead 1381 following the operation of 1050 and closes 1060. Relay 1060 operates and closes its holding circuit through the #2 winding of 1080 which is shunted for the duration of the pulse. At the end of this pulse, 1060 restores and removes the shunt from 1080. Relay 1080 operates in series with 1060 and transfers the 1110 pulsing circuit through the #1 winding of 1080 to switch 2620.

Relay 1110 operates on the second pulse on lead 1381 and closes magnet 2630 through #1 of winding 1080. Magnet 2620 operates. At the end of this second pulse, magnet 2620 restores and the wipers of switch 2620 are advanced one step. Relays 1080 and 1060 remain operated and the wipers of switch 2620 are now stepped once each second until they reach bank terminal 6 at the end of the seventh pulse. At this time, switch 2720 steps, self-interrupted, to bank terminal 1 and closes 1070. The wipers of switch 2720 remain engaged on bank terminal 1 until the end of conversation, at which time switch 2720 begins transferring the ticketing information to the tabulator. Relay 1070 operates, removes the shunt from INT. springs 2623, closes a holding path to 1050, and closes ground through resistor 1091 to lead 1005 and the supervisory lamp 1006. The supervisory lamp 1006 lights dimly to indicate that conversation timing has started.

On the eighth pulse relay 1110 operates and closes magnet 2630 through #1 winding of 1080. Magnet 2620 operates and opens its INT. springs 2622. The INT. springs 2622 open the hold circuit of 1060. Relay 1060 restores but 1080 remains operated on its #1 winding for the duration of this pulse. Relays 1110 and 1080 and magnet 2620 restore at the end of the pulse. The wipers of switch 2620 are advanced to bank terminal 7.

On the ninth pulse relay 1110 operates and closes 1060. Relay 1060 operates and closes its holding circuit through #2 winding of 1080. When relay 1110 restores at the end of this pulse, relay 1080 operates in series with 1060 and transfers the 1110 pulsing circuit to switch 2620.

On the tenth pulse relay 1110 and magnet 2620 operates. Relay 1060 restores but 1080 remains operated on its #1 winding for the duration of the pulse. At the end of the pulse, relays 1110 and 1080 and magnet 2620 again restore. The wipers of switch 2620 are advanced to bank terminal 8.

In this manner, alternate pulses from 1110 now step switch 2620 at the rate of one step every two seconds.

Switch 2620 is used for counting groups of 30 pulses but is a 33 step switch mechanism. Each time the wipers of 2624 step to bank terminal 10, ground is closed through these wipers and INT. springs 2623 to magnet 2620. Thus, every time the 2624 wipers step to bank terminal 10, switch 2620 steps self-interrupted and advances its wipers one step without changing the count.

The level scanned by wipers 2624 of switch 2620 is thus scanned at twenty second intervals. The wiper 2621 has two of its three wipers removed and is therefore scanned only one each minute.

At the end of each minute the wiper 2621 is engaged on bank terminal 3 and relays 1060 and 1080 are operated. On the first pulse following each minute, relay 1110 closes magnet 2620, and closes ground on the wiper 2621 via springs 1079, 1083, 1112, lead 1190 to magnet 2630. Magnet 2620 operates and opens 1060 at its contacts 2622. Magnet 2630 operates. At the end of these pulses switch 2620 advances its wipers to bank terminal 4 and switch 2630 advances its wipers one step. In this manner switch 2630 registers the unit minute digits in codel code on leads W34, X34, Y34 and Z34.

After nine minutes the wiper 2624 of switch 2620 is again engaged on bank terminal 3 and the wipers of switch 2630 are engaged on bank terminal 8. On the first pulse following the nine minute interval, relay 1110 closes magnets 2620, 2630 and 2710. At the end of this pulse, switches 2620, 2630 and 2710 advance their wipers one step. Switch 2630 steps self-interrupted from ground on wiper 2631, bank terminal 9 and advances its wipers to bank terminal 10. A ten minute interval will elapse before the wipers of switch 2630 again engage bank terminal 8. After each subsequent ten minute interval when switch 2630 engages bank terminal 8, switch 2710 advances its wipers one step. Wipers 2711 and 2712 of switch 2710 scan their respective levels at hundred minute intervals and thus marked in codel the ten minute digits on leads W33, X33, Y33 and Z33. The wipers 2713, 2715 and 2716 have two of their three wipers removed and are spaced one hundred minutes apart. (Switch 2710 also is a 33 step mechanism but when the 2713 and 2715 wipers engage bank terminal 10, it steps self-interrupted and advances its wipers one step.) Level of wiper 2713 is scanned during the first hundred minute interval, level of wiper 2715 during the second hundred minute interval and level of wiper 2716 during the third hundred minute interval. One wiper 2714 is removed to have this level scanned only during the second and third hundred minute intervals. Thus, the hundred minute digits are registered in codel form on leads W32, X32, Y32 and Z32.

Should the conversation timing reach 300 minutes, relay 1160 operates from ground on the wipers 2716, switch 2710 engaged on bank terminal 10. Relay 1160 closes ground to lead Z32, prepares a circuit via lead 1094 to give a 300 minute alarm, and closes lead 1002 to the supervisory lamp and lead 1005. The supervisory lamp flashes brightly at 60 i.p.m. to indicate that 300 minutes of conversation time has elapsed. At this time leads W32, Z32, Z33 and Z34 are grounded and register digits "300" as the conversation time.

The ticketer is capable of registering the conversation time up to a maximum of 309 minutes. At the start of the 310th minute, the wipers of switch 2630 are advanced to bank terminal 10, to close ground wiper to lead 1094 to give the 300 minute alarm, the wipers of switch 2710 are advanced to normal, relay 1160 restores, and the cycle of conversation timing continues as before. Consequently the 310th minute of conversation is registered as "000," the 311th as "001," etc.

END OF CONVERSATION

When the called party disconnects, ground is removed from lead 1090 to open the operating path to 1050. Relay 1050 remains operated on its holding path until the calling party disconnects.

When the calling party disconnects, the ticketer selector or trunk circuit releases and removes ground from lead 1001. The preceding equipment releases, but this switch will not release until the stored call information has been transferred to a tabulator. Relay 1140 restores, closes #1 winding of 1020 and opens 1050. Relay 1020 operates, closes 1420, closes ground through #1 winding of 1340 to lead 1382, and grounds lead CL1001 to guard this switch against seizure. Relay 1050 restores, opens the timing circuits, and transfers the supervisory lamp and lead 1005 from resistance 1091 ground to lead 1003 through resistor 1091.

The supervisory lamp flashes dimly at 120 i.p.m. until the stored call information has been transferred to a tabulator. Relay 1420 operates, removes ground from lead 1481, and closes ground over lead 1482 to the tabulator allotter.

TRANSFERRING TICKETING INFORMATION TO A TABULATOR

Absence of ground on lead 1481 permits a tabulator to stop on this switch. When a tabulator is connected to the switch, a circuit is closed over lead 1382 to #1 winding of 1340 operates its "X" contacts 1344, locks on its #2 winding and operates fully. Relay 1340 in operating fully, opens its #1 winding from lead 1382, closes lead 1382 to magnet 2720, closes a short across resistor 1380, and opens 1420. Relay 1420 restores, opens lead 1482 and closes ground to lead 1481.

The ticketing and record data stored in this switch are now rapidly transferred to the tabulator. The 2720 switch is stepped by pulses from the tabulator, which also simultaneously step a similar switch in unison in the tabulator. As the wipers of the 2720 switch are advanced one step at a time, they close the grounds on the various bank terminals over leads W, X, Y and Z to operate codels in the tabulator.

The order in which the data is transferred to the tabulator is as follows:

FOR SEVEN DIGIT TOLL CALLS

Bank terminals 2: Called number, office code C digit (codel 23)
Bank terminals 3: Called number, office code B digit (codel 22)
Bank terminals 4: Called number, office code A digit (codel 21)
Bank terminals 5: Conversation time units digit (minutes)
Bank terminals 6: Conversation time tens digit (minutes)
Bank terminals 7: Conversation time hundreds digit (minutes)
Bank terminals 8:
  Level B—absence of ground indicates a seven digit call
  Level C—ticketer identity hundreds digit
  Level D—ground indicates a change of toll rates during call Bank terminals 9: Ticketer identity, tens digit
Bank terminals 10: Ticketer identy, units digit
Bank terminals 11: No information on seven digit calls
Bank terminals 12: Called number, 4th terminal digit (codel 30)
Bank terminals 13: Called number, 3rd terminal digit (codel 29)
Bank terminals 14: Called number, 2nd terminal digit (codel 28)
Bank terminals 15: Called number, 1st terminal digit (codel 27)
Bank terminals 16: No information on seven digit calls
Bank terminals 17: No information on seven digit calls
Bank terminals 18: No information on seven digit calls
Bank terminals 19: Calling number, 4th terminal digit (codel 5)
Bank terminals 20: Calling number, 3rd terminal digit (codel 4)
Bank terminals 21: Calling number, 2nd terminal digit (codel 3)
Bank terminals 22: Calling number, 1st terminal digit (codel 2)
Bank terminals 23: Calling number, equivalent office code digit (codel 1)

FOR THE TEN OR ELEVEN DIGIT TOLL CALLS

Bank terminals 2: Called number, 3rd area code digit (codel 23)
Bank terminals 3: Called number, 2nd area code digit (codel 22)
Bank terminals 4: Called number, 1st area code digit (codel 21)
Bank terminals 5: Conversation time units digit (minutes)
Bank terminals 6: Conversation time tens digit (minutes)
Bank terminals 7: Conversation time hundreds digit (minutes)
Bank terminals 8:
  Level B—Ground indicates a ten or eleven digit call
  Level C—Ticketer identity hundreds digit
  Level D—Ground indicates a change of toll rates during call
Bank terminals 9: Ticketer identity, tens digit
Bank terminals 10: Ticketer identity, units digit
Bank terminals 11: Called number, 5th terminal digit (eleven digit calls only) (codel 31)
Bank terminals 12: Called number, 4th terminal digit (codel 30)
Bank terminals 13: Called number, 3rd terminal digit (codel 29)
Bank terminals 14: Called number, 2nd terminal digit (codel 28)
Bank terminals 15: Called number, 1st terminal digit (codel 27)
Bank terminals 16: Called number, office code C digit (codel 26)
Bank terminals 17: Called number, office code B digit (codel 25)
Bank terminals 18: Called number, office code A digit (codel 24)
Bank terminals 19: Calling number, 4th terminal digit (codel 5)
Bank terminals 20: Calling number, 3rd terminal digit (codel 4)
Bank terminals 21: Calling number, 2nd terminal digit (codel 3)
Bank terminals 22: Calling number, 1st terminal digit (codel 2)
Bank terminals 23: Calling number, equivalent office code digit (codel 1)

When all this information has been transferred, switch 2720 steps to bank terminal 24 and opens relay 1070.

RELEASE FROM COMPLETED AND TIMED CALL

Relay 1070 restores, closes ground to lead 1005 and the supervisory lamp, and opens #1 winding of 1040.

The supervisory lamp lights brightly to indicate all the information has been transferred to the tabulator. Relay 1046 restores, opens relays 1550 and 1330 (if operated), removes ground from lead 5050, opens relay 1320, and closes low resistance ground through relay 1120 to magnets 2560 and 2620. Relay 1120 operates, closes ground over lead 5051 to a delayed release alarm, closes ground to #1 winding of 1020 to hold 1020 operated, and replaces ground with 120 i.p.m. ground pulses on the supervisory lamp and lead 1005. The supervisory lamp flashes brightly at 120 i.p.m. to indicate that the ticketer should be restoring to normal condition. Relay 1320 restores and opens the holding ground from all the codels and relay 1250. These relays restore.

Switch 2560 steps, self-interrupted, to normal position where its RSON 2561 springs operate and open the circuit to its magnet. Switch 2620 steps, self-interrupted, to normal position. The RSON 2625 springs operate, open the 2620 magnet, and close the relay 1120 ground to switch 2630. Switch 2630 steps, self-interrupted, to normal position and closes the relay 1120 ground to switch 2710. In the same manner switches 2710, 2810, 2860 and 2720 step to normal position after each preceding switch has returned to normal position.

During the above "homing," relay 1120 remains operated from battery through the various magnets. When all switches are in normal position, relay 1120 restores, removes the 120 i.p.m. ground pulses from the supervisory lamp and lead 1005, and opens #1 winding of 1020. Relay 1020 restores, opens #2 winding of 1340, opens lead 1005 from the supervisory lamp, removes ground from lead 1007, and replaces ground with resistance battery on lead 1001.

The ticketer is now idle, and free to ticket another call.

RELEASE FROM INCOMPLETED CALL

If the call is not answered, relay 1050 never operates, hence 1070 does not operate. When the calling party disconnects, the ticketer selector or trunk circuit releases and removes ground from lead C. The preceding equipment releases. Relay 1140 restores, closes #1 winding of 1020 and opens #1 winding of 1040. Relay 1020 operates and grounds lead 1001 to guard this switch against seizure. Relay 1040 restores, opens 1320, opens 1550 (if operated), and closes low resistance ground through relay 1120 to magnets 2560 and 2810. Relay 1120 operates, closes ground to lead 5051, closes ground to #1 winding of 1020 to hold 1020 operated and transfers the supervisory lamp and lead 1005 from ground to lead 120. The supervisory lamp flashes brightly at 120 i.p.m. to indicate that the ticketer is restoring to normal condition. Relay 1320 restores and opens the holding circuit for all the codels and relay 1250. These relays restore.

Switches 2560 and 2810 step, self-interrupted, to normal position. In the same manner, switch 2860 and then switch 2720 step to normal position. Relay 1120 restores, removes the 120 i.p.m. ground pulses from the supervisory lamp and lead 1005, removes ground from lead 5051, and opens #1 winding of 1020. Relay 1020 restores, opens lead 1005, removes ground from lead 1007 and replaces ground with resistance 1004 (R4) battery on lead 1001.

The ticketer is now idle, and free to ticket another call.

RELEASE FROM A FLASHING SIGNAL CONDITION

When the calling party disconnects after receiving busy tone due to the flashing signal on lead 1090, the loop circuit is opened to #1 winding of 1230. Relay 1230 restores and opens #1 winding of 1140. Relay 1140 restores, closes #1 winding of 1020, removes ground from lead 1001 to release the preceding equipment, opens #1 winding of 1040, and opens 1470. Relay 1020 operates and closes ground to lead 1001. Relay 1470 restores and removes the holding ground from #2 winding of 1040, #2 winding of 1460, #1 winding of 1270, #1 and #2 windings of 1030 (if operated), 1240, #2 winding of 1440, 1230 and 1210. These relays restore. Relay 1460, in restoring, opens the holding circuit to 1050. Relay 1040, in restoring, closes low resistance ground through relay 1120 to switches 2560 and 2810, opens #2 winding of 1550 (if operated), and opens 1320. Relay 1120 operates, closes ground to lead 5051, closes an additional ground to #1 winding of 1020 to hold 1020 operated, and transfers the supervisory lamp and lead 1005 from lead 1002 to lead 1003. The supervisory lamp flashes brightly at 120 i.p.m. to indicate that the ticketer is restoring to normal condition. Relay 1050 restores. Relay 1550 (if operated) restores. Relay 1320 restores and opens the holding circuit for all the codels. The codels restore.

Switches 2560 and 2810 step, self-interrupted, to normal position. In the same manner, switch 2860 and then switch 2720 step to normal position. Relay 1120 restores, removes the 120 i.p.m. ground pulses from the supervisory lamp and lead 1005, removes ground from lead 5051, and opens #1 winding of 1020. Relay 1020 restores, opens lead 1005, removes ground from lead 1007, and replaces ground with resistance 1004 battery on lead 1001.

The ticketer is now idle and free to ticket another call.

INCOMPLETE DETECTION

If an incomplete or double detection occurs in the detector, ground is closed to lead DET. INC. Relay 1450 operates and locks on its #2 winding, closes #1 winding of 1510, closes ground over lead 1607 to the transender, and opens 1010 from lead 5013. Relay 1510 operates and locks on its #1 winding, closes resistance battery to lead 1604, opens lead 5030 and opens 1150. Relay 1150 restores, opens lead 5012 and closes ground to lead 5013.

Relay 1010 restores, opens bar magnet 2510 and opens 1130. Bar magnet 2510 restores. Relay 1130 restores and replaces the +90 v. D.C. detector battery with ground on lead 1001. When ground is closed to lead 1607, either of two alternative procedures is provided by the transender as described in the section on the transender.

GROUND FAULT ON LINE

If there is a low resistance ground leak on either the "+" or "−" side of the calling line, relay 1170 will operate either as the ticketer is seized or as the first dial pulse is received. Relay 1170 closes ground on springs 1363 of 1360 to #1 winding of 1520. Relay 1520 operates, locks through its "X" contacts 1521, closes #1 winding of 1510, and closes ground over lead 1606 to the transender. Relay 1510 operates and locks on its #1 winding, closes resistance battery to lead 1604, opens lead 5030, closes #2 winding of 1440 and prevents relay 1150 from operating as it normally would. Relay 1140 operates and locks on its #2 winding, closes 1210, opens the pulsing circuit to magnet 2560, and prevents 1240 from operating as it normally would. Switch 2560 will advance its wipers one step if relay 1170 operated as the first dial pulse was received.

Relay 1210 operates, momentarily closes #2 winding of 1230 and transfers the "+" side of the line from relay 1170 to ground and the "−" side of the line from spotter battery to exchange battery. Relay 1170 restores and opens the operating path to 1520. When ground is closed to lead 1606, either of two alternative procedures is provided by the transender as described in that section.

FAILURE TO DIAL PARTY IDENTIFICATION DIGIT "0"

In order for relay 1240 to operate upon the completion of the first digit, it is necessary that relay 1410 be restored and switch 2610 be engaged on bank terminal 1 or 6. Should the subscriber fail to dial the party identification digit "0," either one or both of these conditions will not be met and relay 1240 will not operate.

As relay 1430 restores after the last dial pulse of the first digit, it opens 1360. Relay 1360 restores and closes ground on springs 1045 of 1040 to 1510. Relay 1510 operates and locks on its #1 winding, closes ground over lead 1605 to the transender, closes #2 winding of 1440 through resistor 1483, closes resistance battery to lead 1604, and opens lead 5030. Relay 1440 operates and locks on its #2 winding, closes 1210, opens the pulsing circuit to switch 2550 and prevents 1240 from later operating should the digit "0" be dialled in the succeeding digits. Relay 1210 operates, momentarily closes #2 winding of 1230 while transferring the "+" side of the line from relay 1170 to ground and the "—" side of the line from spotter battery to exchange battery and opens #2 winding of 1510.

Relays 1170 and 1030 may have operated during this digit but since the digit "0" was not dialled, an incorrect party identification is registered on leads P12581 through P02591.

When ground is closed to lead 1605, either of two alternative procedures is provided by the transender.

SPECIAL ROUTING DIRECTIVES OR BUSY TONE

Should ground be closed over leads 1605, 1606 or 1607 to the transender before a translation has been provided, the transender will follow either of two alternatives. Depending on its strap wiring, the transender will either send a special routing directive to route the call to an operator, or it will release itself and cause the ticketer to send busy tone to the calling party.

*Transender strapped for sending special routing directive*

When the transender receives ground on leads 1605, 1606 or 1607, it begins transmitting the sending control digit "0" over lead 1604 to relay 1540 and magnet 2860. Relay 1540, being slow-to-release, operates on the first pulse and remains operated for the duration of the sending control pulses. Magnet 2860 follows the pulses and steps to bank terminal 10. After the last pulse relay 1540 restores. After the transender has completed the sender control digit, it begins sending a special routing directive, usually consisting of one or two digits. The transender sends this special routing directive in the form of loop pulses on leads 1609 and 1608.

After the special routing directive has been sent, the transender closes a ground pulse over lead 1604 to magnet 2860 and #1 winding of 1250. During the pulse, relay 1250 operates its "X" contacts 1259, locks on its #2 winding, and operates fully. After the pulse, switch 2860 steps to normal position.

When relay 1250 operates fully, it starts a cycle of operation similar to that described in "Switch Through" except that relay 1510 and relays 1520 and 1450 (if operated) also restore when 1470 restores. The calling party is now switched through to an operator for special handling of the call.

*Transender strapped for providing busy tone to calling party*

When the transender receives ground on either lead 1605, 1606 or 1607, it starts the cycle of operation whereby lead 1481 is opened. Also, if after an interval timed in the transender there is no complete or incomplete detection, the transender will open lead 1481. When lead 1481 is opened, relay 1530 restores and closes #1 winding of 1460. Relay 1460 operates its "X" contacts 1464, locks on its #2 winding, closes busy tone on lead 1485 through capacitor 1484 to leads 1202, and 1203, opens 1560, opens its #1 winding, closes ground to lead 5051 and closes a holding circuit to #2 winding of 1040. Relay 1560 restores. The ticketer remains thus operated until the calling party disconnects.

When the calling party disconnects after an incomplete detection, release is similar to that described in section on "Release From A Flashing Signal Condition," except that relay 1050 is not operated and relays 1450, 1460 and 1510 restore when 1470 restores.

If no detection has occurred, or if the calling party has failed to dial the digit "0," or if there is a low resistance ground leak on his line, neither relay 1450 nor 1220 will have operated and relay 1460 is locked on its #2 winding through the RLS key 1486 to ground at contacts of 1040. When the calling party restores, 1020 operates and all the other relays restore, except relays 1460, 1040, 1030 (if operated), 1020, 1510, 1320 and all the operated codels. The ticketer will thus remain operated until the RLS key 1486 is operated. Operation of the release key 1486 causes the ticketer to release completely.

If the transender sends a digit consisting of more than ten pulses while sending the called number, it stops all further sending. After a delay interval designed to allow the subscriber time to finish dialling, the transender opens lead 1481. Relay 1030 restores and closes #1 winding of 1460. Relay 1460 operates and locks on its #2 winding from ground on the wiper 2811 of switch 2810 engaged on bank terminal 10. All relays restore with the exception of relays 1460, 1040, 1220, 1030 (if operated), 1020, 1320, 1550 (if operated) and all the operated codels. The ticketer will thus remain operated until the RLS key 1486 is operated at which time it will release completely.

SEIZURE OF TRANSENDER

Absence of ground on lead 1638 marks this circuit idle to the transender hunter associated with the ticketer.

When seized, the circuit is closed to relay 1910 via the coil of 1530 in the ticketer. Relay 1910 operates, closes ground to magnet 2010, prepares the circuit to 1950, prepares the holding circuit to 1860 and 1840, opens 1930, prepares the holding circuit to the codel relays, and transfers ground from lead ATB to UM to traffic meters when provided. Relay 1930 restores and grounds lead 1638. Magnet 2010 operates and advances its wipers one step self-interruptedly. The RSON springs 2011 operate, close magnet 2010 to lead 1980, and connect a multiple ground to lead 1638.

TRANSLATION

After the transender-codexer has received the area and/or "ABC" office code over lead 1634 of the ticketer, ground from the sender on lead 1981 via wiper 2917 level of switch 2910 of the codexer and lead 2901 closes the circuit to 1950. Relay 1950 operates, transfers ground from hold lead 1982 to start lead 1983 to indicate to the translator assigner that a translation is required. The translator assigner operates and closes resistance battery to hold lead 1982 which closes the circuit to 1960. Relay 1960 operates, closes ground to lead 1984 to operate relay 3040 in the codexer, connects assign lead 1985 to lead 1986 to operate relay 3140 in the translator assigner as shown on FIG. 31 (relay 2150 in the sender does not operate), and closes the circuit to the bar relay 1710. The operation of 3140 in the assigner results in the extension of ground to the ASR lead to cause the operation of the translator bar relay in the common translator.

The bar relay 1710 operates, closes lead MW11–MZ17 to W11–Z17 and leads 1780, 1781 and 1782 to relays 1850, 1860 and 1930 respectively. (When the operations are of standard procedure.)

The directive received in the form of ground on various leads from the translator closes the circuit to the codel relays associated with them. The codel relays operate, lock at 1911 and store the received translation. Ground on leads 1780 and 1782 close the circuits to 1850 and 1930. (Ground on 1781 indicates that none of the digits of the called number are to be sent, it closes the circuit to 1860.)

Relay 1850 operates, opens 1950 and closes a locking ground to hold 1830 if reoperated by the translator. Relay 1950 restores, opens 1960, restores the translator assigner, and prepares the circuit for relay 2160 of the transender-sender circuit. Relay 1960 restores, opens ground from lead 1984 to restore relay 3040 in the codexer circuit, disconnects lead 1985 from lead 1986, and opens 1710. Bar relay 1710 restores.

If ground is closed to lead 1781, relay 1860 operates, connects bank terminal 9, level of wiper 2013 of switch 2010 to lead 1880, and locks at 1910.

SENDING

If the directive from the translator includes a ground on lead 1782, relay 1930 was reoperated during the translation cycle. In this case the sending operations await receipt of a start signal from the ticketer forwarded to the coder by its associated codexer and appearing as a ground on 1987 lead to operate relay 1940. However, if sending is required to start immediately, relay 1930 will not have been reoperated and the operating circuit to relay 1940 will be completed upon the release of 1950. Relay 1940 operates, locks at 1910 and closes ground to lead 1988 to operate relay 2160 of the sender. Various relays in the sender operate to start the sending of the sending control digit stored on codel 11 and appearing on bank position 1 of 2010. They also close the circuit to magnet 2010. Any one or two relays (W11, X11, Y11 or Z11) operated, close ground through leads W11, X11, Y11 or Z11, levels associated with wipers 2015, 2016, 2017 or 2018 of which 2010, leads W, X, Y, or Z to levels associated with wipers 2353 and 2354 of switch 2350 of the sender to mark the sending control digit.

Switch 2350 scans and, when both wipers are simultaneously connected to ground, relay 2320 of the sender operates, closes 2210 which stops sending and opens magnet 2010. Magnet 2010 restores and advances its wipers one step, connecting the first digit of the routing directive through levels associated with wipers 2015, 2016, 2017 and 2018 of 2010 to the sender through leads W, X, Y and Z. Ground from the sender again closes magnet 2010. Switch 2350 starts scanning again and, when both wipers are simultaneously connected to ground, relay 2320 operates, closes 2210 which stops sending and opens 2010. Magnet 2010 restores and advances its wipers one step. Subsequent digits stored are sent in the same manner as explained above.

At the end of the last digit (a maximum of six digits can be stored), the circuit is closed again to switch 2010 from ground at 1910, through wiper 2013 of switch 2010, lead 1880 through the sender, lead 1980 and 2011 and springs 2019 to magnet 2010. Magnet 2010 operates and steps its wipers self-interrupted to bank terminal 9. The wipers 2015, 2016, 2017 and 2018 of 2010 are now connected to leads 1634, 1635, 1636 and 1637 for sending the called number stored on codels in the ticketer. The digits to be sent are repeated without translation.

If all digits of the called number are to be "skipped" (as is required when a non-existent code is dialled) switch 2010 steps self-interrupted (after the appropriate routing has been sent) to bank terminal 10, advancing one step further than on regular calls because of the 1860 relay having been operated on translation. The reading leads (W, X, Y, Z) are, therefore, not extended to the sender in this case, but rather encounter the permanently marked digit "one" on the 2010 bank. Lead 2020 is also grounded on this step of 2010 to cause relay 2220 in the associated sender to operate and shunt springs 2172 of the pulsing relay 2170 to prevent further impulses from reaching the outgoing loop.

At this point the sender goes through the motion of sending digit one and sends a sequencing pulse to the ticketer which in turn switches through and frees the transender.

"TX" TRANSLATION

When the subscriber fails to dial digit "0" which the ticketer requires, ground is closed to lead 1635 which closes the circuit to 1810 in series with #1 winding of relay 1860. Relay 1810 operates, closes ground to various terminals of the terminal bank. Terminal A8 and/or A1 is strapped to terms A4 to A7 respectively for first digit of special routing directive; or term A8 is strapped to A11 to release transender and provide busy tone. Terms B8 and/or B1 are strapped to terms B4—B7 for second digit (when required). Terms C1 to C4 are strapped for start sending (for special routing only). Relay 1860 operates in series with 1810, connects bank terminal 9 of level associated with wiper 2013 of switch 2010 to lead 1880, and locks at 1910 through its #2 winding.

*To provide special routing directive*

Figure 17:
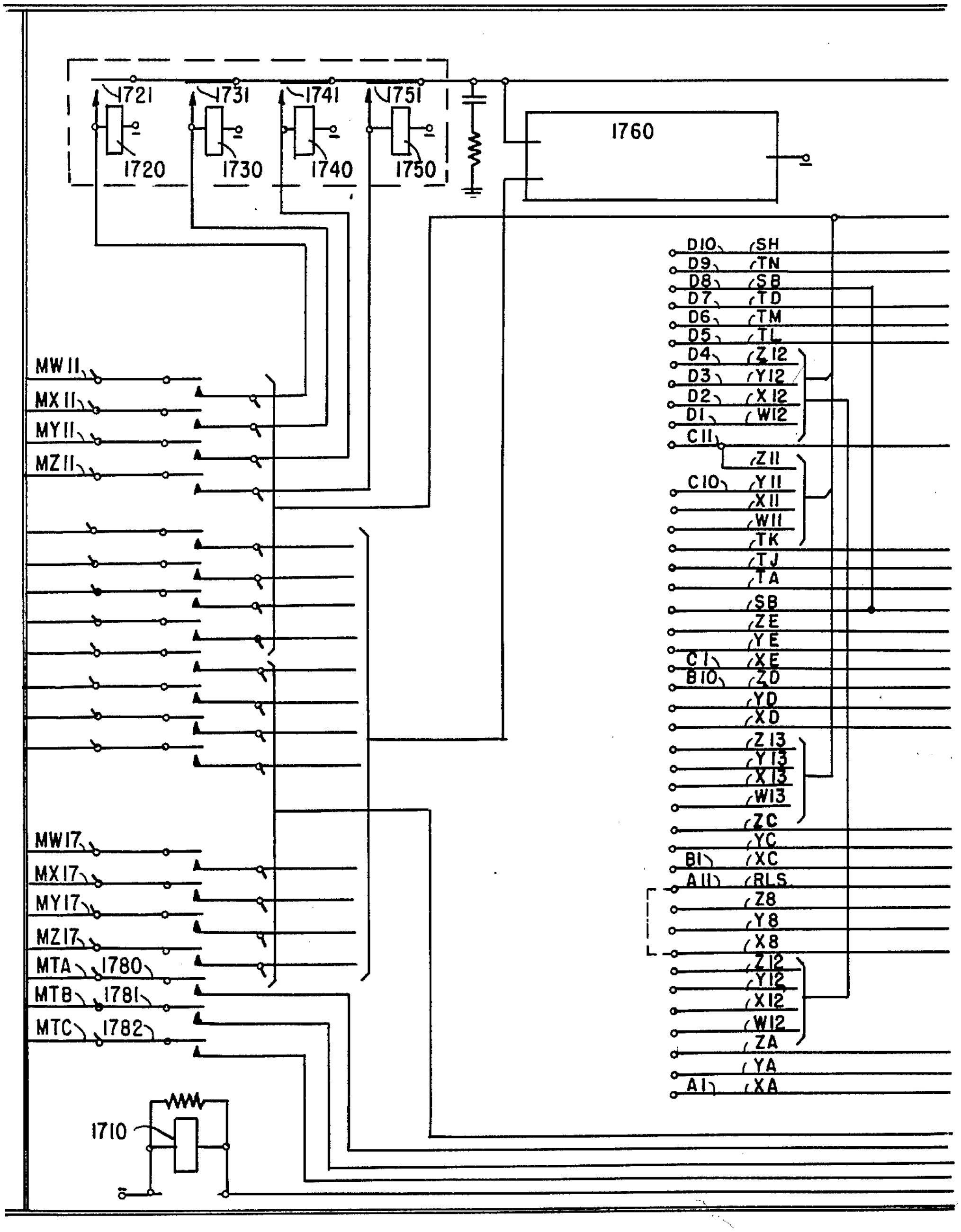
Figure 18:
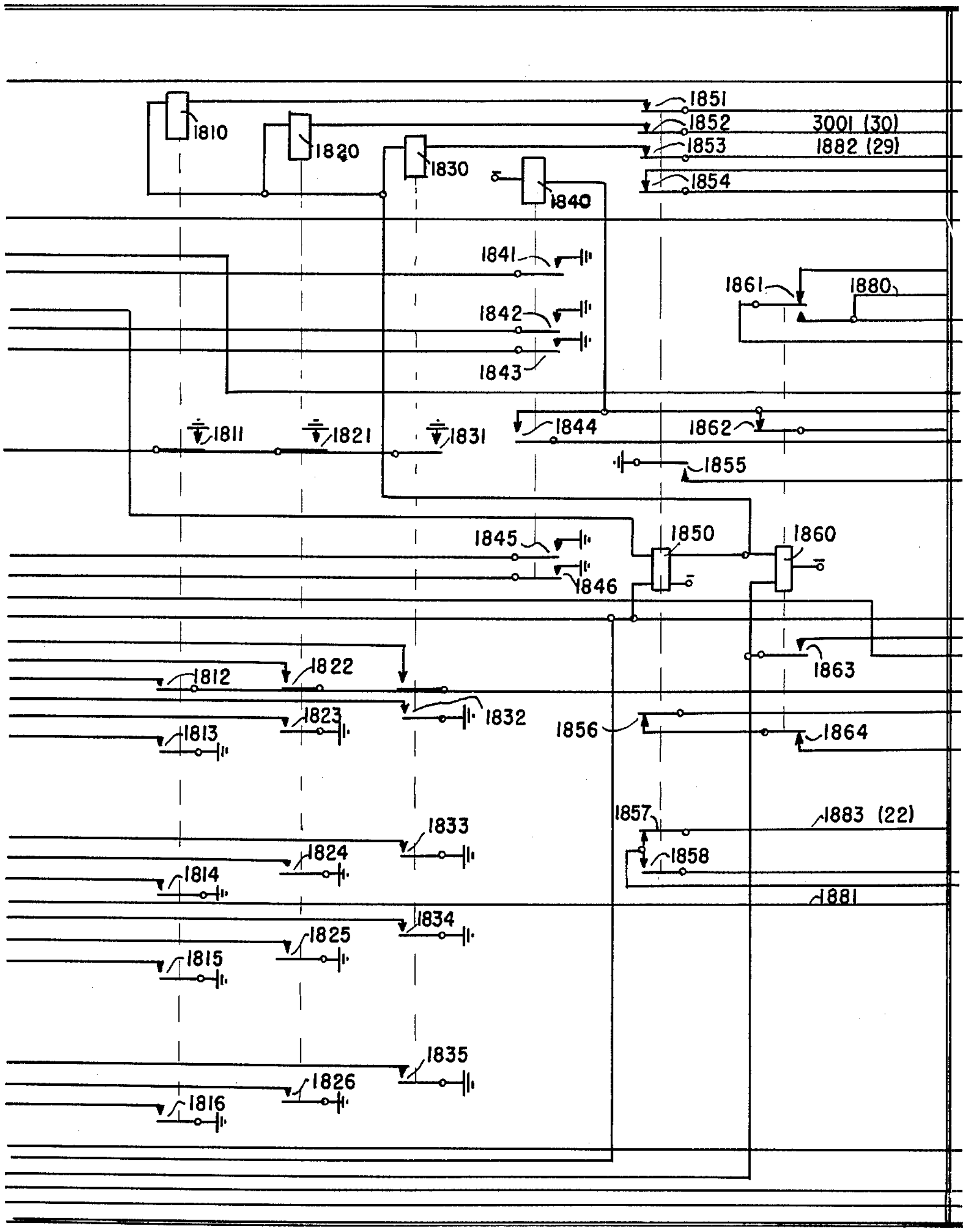
Figure 19:
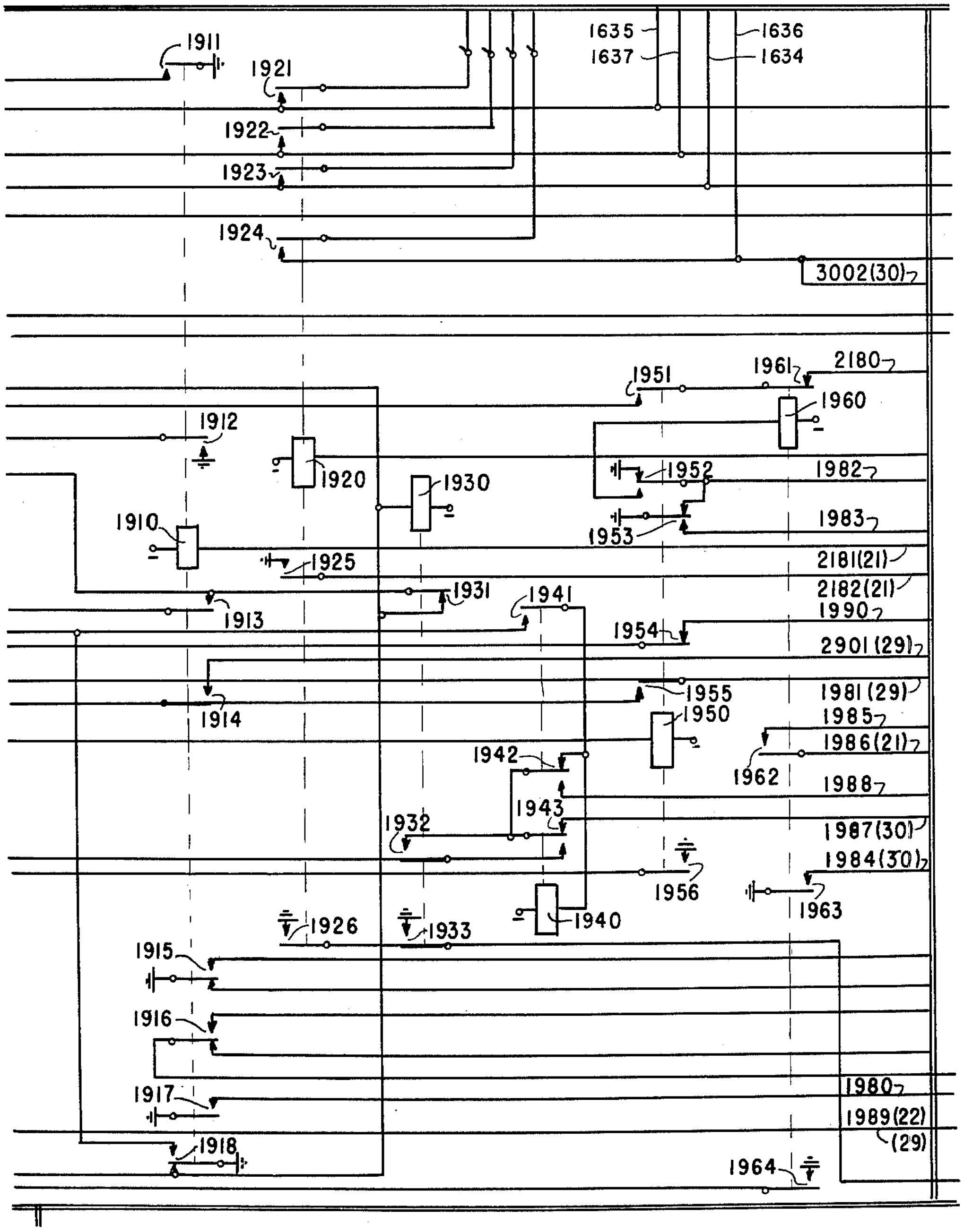
Figure 20:
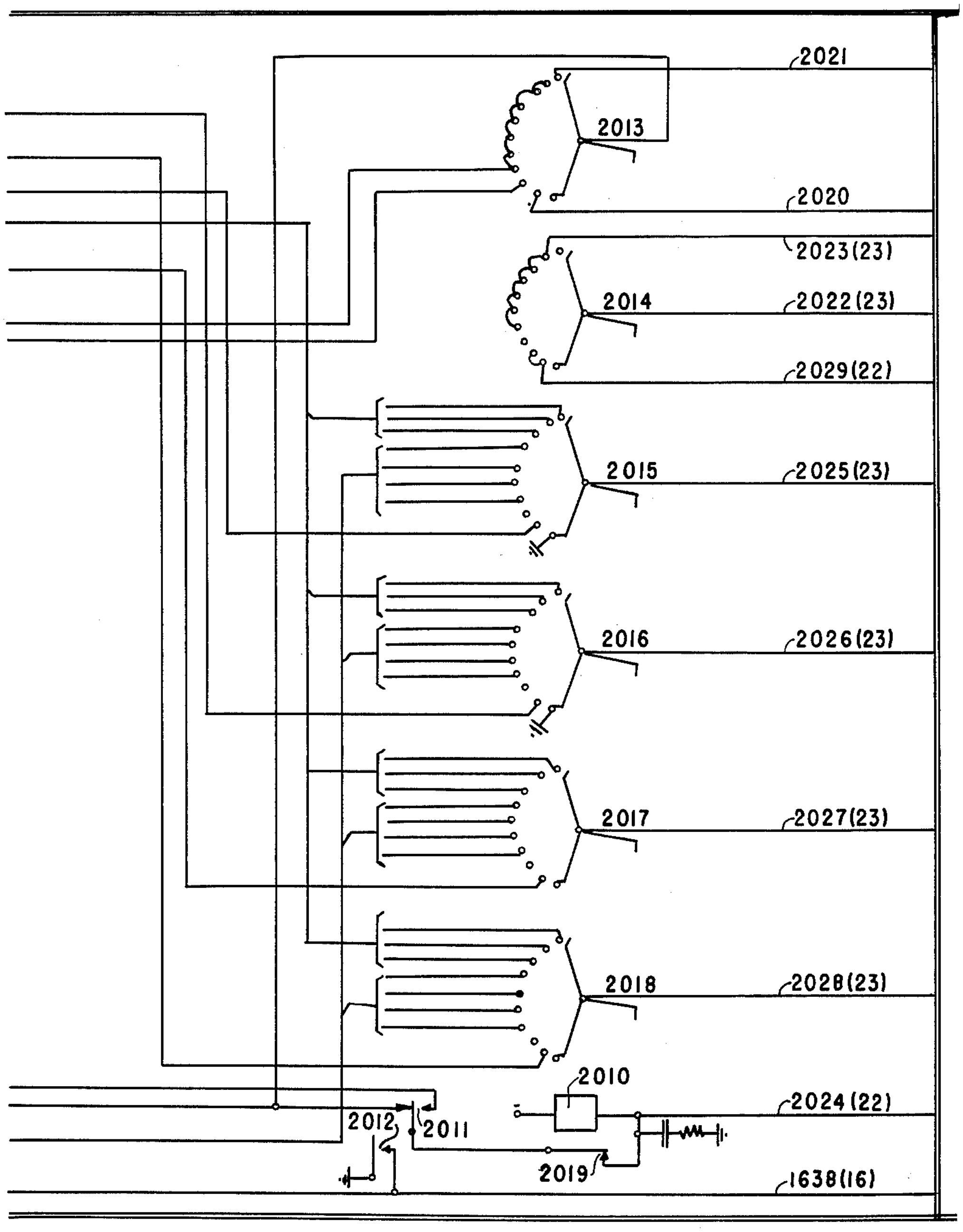

Upon operation of relay 1810, ground on lead 1981 from the sender circuit closes the circuit through terminals C1–C4 of FIG. 17 to 1850, closes the circuits where strapped to the codel relays Z11 (1750), W12, Y12, Z13 and to W13, X13, Y13 and Z13 shown as box 1760. The appropriate codels operate and lock at 1910. Relay 1850 operates, closes 1940, opens lead 1881, and opens 1810. Relay 1940 operates, locks at 1910 and grounds lead 1988 to operate relay 2160 in the sender circuit which starts the sending operations. Relay 1810 restores, and opens ground from various terminals of the terminal block.

Ground appears on lead M2024 to close the circuit to magnet 2010.

Relay Z11 of codel 11 is at the present connected through level associated with wiper 2018 and lead Z (2028) to switch 2350 of the sender circuit. The operation of the control digit (always provided) are the same as explained previously.

When the sending cycle is completed, ground is removed from lead 2024. Magnet 2010 restores and advances its wipers one step (bank terminal 2) to connect codel 12 shown as contained in box 1760 which stores the markings for the first digit of the special routing directive. Ground on lead 2024 again operates 2010. After the sending cycle is completed, ground is disconnected from lead 2024. Magnet 2010 restores and advances its wipers one step (bank terminal 3) to connect codel 13 (when required). The second digit (when provided) is sent in the same manner as explained above. At the end of the first or second digit (when provided), the circuit is closed to 2010 from ground at 1910 through level associated with wiper 2013 of switch 2010, lead 1880, through the sender circuit, lead 1980 and RSON 2011 of 2010 to magnet 2010. Magnet 2010 operates and steps its wipers self-interrupted to bank terminal 10 to close the circuit to relay 2220 of the sender circuit. Also ground is closed to leads W (2025) and X (2026) through bank terminal 10. Switch 2351 of the sender circuit starts operating again and when wipers 2353 and 2354 of 2350 are connected simultaneously to ground 2620 operates and sends a ground pulse over lead 1633 to magnet 2860 and #1 winding of 1250 of the ticketer to cause the ticketer to switch through and free the transender.

*To provide busy tone to the calling party*

If in this condition it is desired to close busy tone to the calling party instead of a special routing, the following actions will take place. Upon operation of relay 1810, ground is closed to lead 1881, through terminals A8—A11. This ground closes the circuit to relay 2140 of the transender-sender. Relay 2140 operates and opens relay 2120 from the 1639 lead. This action of the transender in initiating its own release causes the ticketer to extend busy tone to the calling party.

Relay 2120 restores and removes ground from lead 2181. Relay 1910 of this circuit restores, opens 1860, closes 1930, and closes lead 1989 to magnet 2010 through its RSON 2011 and INT. springs 2019. Relay 1860 restores. Relay 1930 operates. After the transender-sender circuit has released, ground is closed to lead 1989 to step switch 2010 to normal. The RSON 2012 springs restore, open ground from lead 1638, and prepare the circuit for magnet 2010.

"TY" TRANSLATION

If there is a low resistance ground leak on either "+" or "—" side of the calling line, ground is closed on lead 3001 which closes the circuit to 1820 in series with winding #1 of relay 1860. Relay 1820 operates and closes ground to the terminals of the terminal block strapped. Terminals A9 and/or A2 are strapped to terms A4—A7 respectively for first digit of special routing directive; or term A9 is strapped to A11 to release transender and provide busy tone. Terminals B9 and/or B2 are strapped to terms B4—B7 for second digit (when required), terms C2 to C4 are strapped for start sending (for special routing only). Relay 1860 operates, connects bank terminal 9 of level associated with wiper 2013, switch 2010 to lead 1880, and locks at 1910 through its #2 winding.

*To provide special routing directive*

Upon operation of relay 1820, ground encountered on lead 1981 from the sender circuit closes the circuit through terminals C2—C4 of terminal block FIG. 17 to 1850, and also closes the circuit where strapped to codel relays Z11, and (W12, X12, Y12 and Z12), shown in box 1760 and possibly to (W13, X13, Y13 and Z13) also in box 1760. Subsequent operations are as explained in section for "TX" special routing.

*To provide busy tone to the calling party*

If in this condition it is desired to close busy tone to the calling party instead of a special routing, the following actions will take place. Upon operation of 1820, ground is closed to lead 1881 through terminals A9—A11. Subsequent operations are as explained in section for "TX" translations for busy tone.

"TZ" TRANSLATION

If an incomplete or double detection occurs, ground is closed to lead 1637 which closes the circuit to 1830 coil in series with the #1 winding of 1860. Relay 1830 operates and closes ground to the terminals of the terminal block strapped according to the following paragraph. Relay 1860 operates, connects bank terminal 9 of level associated with wiper 2013, switch 2010 to lead 1880, and locks at 1910 through its #2 winding.

Terminals A10 and/or A3 are strapped to terms A4—A7 respectively for first digit of special routing directive; or term A10 is strapped to A11 to release transender and provide busy tone. Terminals B10 and/or B3 are strapped to terms B4—B7 for second digit (when required). Term C3 to C4 are strapped for start sending (for special routing only).

*To provide special routing directive*

Upon operation of 1830, ground encountered on lead 1981 from the sender circuit closes the circuit through terminals C3—C4 to 1850, and also closes the circuit, where strapped, to codel relays Z11, W12, X12, Y12 and Z12, and possibly W13, X13, Y13 and Z13. Subsequent operations are as explained in section for "TX" special routing.

*To provide busy tone to the calling party*

If in this condition it is desired to close busy tone to the calling party instead of a special routing, the following actions will take place. Upon operation of 1830, ground is closed to lead 1881 through terminals A10—A11. Subsequent operations are as explained in section for "TX" busy tone.

"TT" TRANSLATION

*Translator assigner failure*

If a call requiring translation has not been extended to the transender within a specified period, presumably due to failure of the transender assigner, ground from the timer switch in the sender is extended on lead 2180 to the coil of 1840. Relay 1840 operates, locks at 1910, closes the circuit through terminals D7—D9 to relays 1850 and 1860 in series, prepares a failure alarm circuit via lead 1990, and closes the circuit where strapped to the codel relays Z11, W12, X12, Y12 and Z12. Terminals C5, C7 and D7 are strapped to C6, C11 and D9 respectively and terminals D5 and/or D6 are strapped to terminals D1—D4 for special routing digit as required. The appropriate codel relays operate and lock at 1910.

Relay 1850 operates, locks, opens lead 1881, prepares the circuit to 1940 and opens 1950. Relay 1860 operates, locks at 1910, and connects bank terminal 9 of level associated with wiper 2013 of switch 2010 to lead 1880.

Relay 1950 restores, disconnects relay 1960 from lead 1982 (relay 1960 did not operate because of a faulty condition in the translator assigner), closes a circuit to relay 1940, opens lead 2180 and closes the circuit for the failure alarm through lead 1990. Relay 1940 operates, locks at 1910, and grounds lead 1988 to operate relay 2160 of the sender circuit which starts the sending operations.

Ground appears on lead 2024 to close the circuit to magnet 2010. Subsequent operations are as explained in section for "TX" special routing.

*Translator not provided*

If no translator is provided, the routing directive and control directive are strapped, and the operations are as follows:

Terminals C6 and/or C7 are strapped to terms C8—C11 respectively for control digit to ticketer. Terminals D5 and/or D6 are strapped to terms D1—D4 for single digit routing as required. Terminal D9 is strapped to D8 for start sending when translation is registered. Term D9 is strapped to D10 for start sending when last dialled digit is registered.

After the codexer has received the area or ABC office code, ground encountered on lead 2901 closes the circuit to 1840. Relay 1840 operates, locks at 1910, closes the circuit through terminals D8 and D9 to relay 1850, (or through terminal 10 to 1930) and closes the circuit where strapped to the codel relays W11, X11, Y11, Z11, W12, X12, Y12 and X12 (single digit routing required). The appropriate codels operate and lock to 1910.

Relay 1850 operates, locks, and opens 2330. Relay 1940 operates, locks at 1910, and grounds lead 1988 to operate relay 2160 of the sender which starts the sending operations. If it is necessary to delay start of sending, strapping is provided to cause the operation of relay 1930 when 1840 operates. Relay 1930 in turn causes the operation of 1850. This sequence prevents the operation of 1940 until ground is connected from the ticketer in lead 1987.

Ground on lead 2024 closes the circuit to magnet 2010. Subsequent operations are as explained in section for "TX" special routing.

RELEASE

When the transender-sender releases, ground is removed from lead 2181. Relay 1910 restores, opens 1860, 1840 (when operated), 1850, 1940, the operated codel relays, closes 1930 and closes lead 1989 to magnet 2010 through its RSON 2011 and INT. 2019 springs. Relays 1860, 1840 (when operated), 1850, 1940 and the codel relays restore. Relay 1930 operates.

After the sender circuit has released completely, ground is closed to lead 1989 to step switch 2010 to normal. The RSON 2012 springs restore and disconnect ground from lead 1638.

SEIZURE OF CODEXER

When the transender is seized, a pulsing circuit is established to relay 2930 via lead 1881 and level associated with wiper 2914 of switch 2910 through the coder and transender hunter to the ticketer which repeats these pulses as the subscriber dials them.

OFFICE CODE OR SINGLE TRANSLATION FOREIGN AREA CODE

*Dialling digit A of the code*

Relay 2930 follows the dial pulses received from the ticketer and, when operated on the first pulse, closes 2940 and magnet 3010. Relay 2940 operates and closes the circuit to magnet 2910. As relay 2930 restores at the end of the first pulse, the circuit is opened to magnet 3010 and 2940. Magnet 3010 restores and advances its wipers one step. Relay 2940, being slow-to-release, remains operated for the duration of the digit. Subsequent pulses cause the switch to step as explained above.

At the end of the last pulse of digit "A," relay 2930 restores, opens magnets 3010 and 2940. Magnet 3010 restores and advances its wipers one final step. Relay 2940 restores and opens 2910.

Magnet 2910 restores, advances its wipers one step, and prepares the circuit to the vertical magnet 2995.

*Dialling digit B of the code*

Relay 2930 follows the dial pulses received from the ticketer and, when operated on the first pulse, closes 2940 and the vertical magnet 2995. Relay 2940 operates and closes magnet 2910. The vertical magnet 2995 follows the pulses received from relay 2930 and steps the wipers to the dialled level. On the first vertical step, the VON springs 3096 operate and transfer lead 3002 from 3001 to 1987.

If ground is closed to lead 3002 before the vertical magnet 2995 operates, this is an indication to the coder that a low resistance ground lead exists on either "+" or "—" side of the calling line. If ground is closed to lead 3002 after the vertical magnet 2995 operates, this is an indication that the transender may begin sending.

Relay 2940 remains operated during pulsing due to its slow-to-release characteristics. After the last pulse of digit "B," relay 2930 restores and opens 2940. Relay 2940 restores and opens magnet 2910. Magnet 2910 restores, advances its wipers one step and prepares the circuit to the ROT magnet 2990.

*Dialling digit C of the code*

Relay 2930 follows the dial pulses received from the ticketer and, when operated on the first pulse, closes 2940 and closes the ROT magnet 2990. Relay 2940 operates and closes magnet 2910. The ROT magnet 2990 follows the pulses received from 2930 and steps the wipers to the dialled bank terminal. Relay 2940 remains operated during pulsing due to its slow-to-release characteristics. After the last pulse of digit "C," relay 2930 restores and opens 2940. Relay 2940 restores and opens 2910. Magnet 2910 restores, advances its wipers one step and closes lead 2901 to 1981 via wiper 2917 of switch 2910 to close the circuit to relay 1950 in the coder circuit. Ground from the translator assigner circuit closes relay 1960 in the coder which in turn grounds lead 1984 to close 3040 of this circuit. Relay 3040 operates, opens ground to lead 3003 to operate bar relay 3210 in the translator, and closes lead 3004 to the wipers 2990 of the Strowger switch via switches 2980 and 3010. (Relay 3160 of the translator assigner operates in series with the translator relay over this path.)

After the coder has received the translation from the translator, ground is removed from lead 1984. Relay 3040 restores, opens lead 3003 and lead 3004.

FOREIGN AREA CODE WITH DUAL TRANSLATION

*Dialling first digit of the area code*

The operations of the "first" digit dialled are as explained in section preceding.

*Dialling second digit of the area code*

The "second" digit of the area code is either "1" or "0." (For the purpose of this explanation it is assumed that digit "1" is dialled.)

Relay 2930 follows the dial pulses received from the ticketer and, when operated on the first pulse, closes 2940 and the vertical magnet 2995. Relay 2940 operates and closes magnet 2910. The vertical magnet 2995 follows the dial pulses from relay 2930 and steps its wipers to the dialled level. On the first vertical step, the VON 3096 and left normal position 2996 springs operate, connect 3002 to 1987, and close ground through the O.N. springs 2911 of switch 2910 to level associated with wipers 3023, 3024, 3025, 3026 or 3027 of switch 3020, strap wiring on level associated with wiper 3023 of switch 3020, left normal position springs 2996 to X1 2960.

After the last pulse of the "second" digit, relay 2930 restores and opens 2940. Relay 2940 restores and opens 2910. Magnet 2910 restores, advances its wipers one step to prepare the circuit to magnet 3020 and ROT 2990. Relay 2960 operates, locks at 2940, and prepares the operating circuit to switch 3020.

*Dialling third digit of the area code*

Relay 2930 follows the dial pulses received from the ticketer and, when operated on the first pulse, closes 2940, closes the ROT magnet 2990 through level associated with wiper 2915 of switch 2910 and magnet 3020 from ground through level associated with wiper 2916 of switch 2910. Relay 2940 operates, closes a holding circuit to 2960 and closes magnet 2910. The ROT magnet 2990 follows the pulses received from relay 2930 and steps its wipers to the dialled terminal. Magnet 3020 also follows the pulses and advances its wipers one step at the end of each pulse.

After the last pulse of the "third" digit, relay 2930 restores and opens 2940. Relay 2940 restores and opens 2910. Magnet 2910 restores and advances its wipers one step to prepare the circuits to the 3030 and 2980 magnet. (Relay 2960 is now held through ground on the O.N. springs 2911 of switch 2910, and the strap wiring at switch 3020 and 3010.)

*Dialling digit A of the office code*

Relay 2930 follows the dial pulses from the ticketer and, when operated on the first pulse, closes 2940, closes the release magnet 3030 through level associated with wiper 2917 of switch 2910, and closes magnet 2980. Relay 2940 operates, closes magnet 2910, and closes a multiple locking circuit to 2960. The release magnet 3030 operates and restores the Strowger switch. The left normal position spring 2996 and VON 3096 spring restore. Magnet 2980 operates. As 2930 restores at the end of the first pulse, the circuit is opened to 2980 and 2940. Magnet 2980 restores and advances its wipers one step. Relay 2940, being slow-to-release, remains operated for the duration of the digit. Subsequent pulses cause switch 2980 to step as explained above.

After the last pulse of digit "A," relay 2930 restores, opens magnet 2980 and opens 2940. Magnet 2980 restores and advances its wipers one final step. Relay 2940 restores and opens 2910. Magnet 2910 restores and advances its wipers one step to prepare the circuit for the vertical magnet 2995.

*Dialling digit B of the office code*

The operations for the dialling of digit "B" are as explained previously for the digit B.

*Dialling digit C of the office code*

The operations of digit C dialled are as explained previously with the following exceptions: Lead 3003 forwards a ground marking only on a home area call. On this type of call, the ground marking is forwarded on one of the five foreign office code leads 3041 (FA), 3042 (FB), 3043 (FC), 3044 (FD), or 3045 (FE) to the translator to operate the associated bar relay.

After the coder has received the translated information from the translator, ground is removed from lead 1984. Relay 3040 restores, opens leads 3041 (FA), 3042 (FB), 3043 (FC), 3044 (FD), 3045 (FE) and 3004.

RELEASE FROM A FOREIGN AREA CALL

Ground on lead 1989 closes the circuit to magnet 2910. Magnet 2910 operates, operates its INT. 2913 springs which open the circuit to itself. Magnet 2910 restores, advances its wipers one step, restores its INT. springs 2913 which close the circuit to magnet 2910 again. This self-interrupted action continues until the switch is at normal. The O.N. springs restore and transfer the circuit to magnet 2980.

Magnet 2980 operates and steps its wipers self-interrupted as explained above to normal. Its RSON springs 2982 restore and transfer the circuit to magnet 3010.

Magnet 3010 operates and steps its wipers self-interrupted to normal as explained above. Its RSON springs 3011 restore and transfer the circuit to magnet 3020. Magnet 3020 operates and steps its wipers self-interrupted to normal, restores its RSON springs 3021 which transfer the circuit to the RLS magnet 3030. The RLS magnet 3030 operates and restores the Strowger switch. The VON springs restore.

The circuit is now at normal.

RELEASE OF A HOME AREA CALL

The release of the rotary switches 2910 and 3010 and the Strowger switch are as explained above.

SEIZURE OF TRANSENDER-SENDER

The transender is seized by closing ground to lead 1639 of this circuit. Relay 2120 operates from this ground, closes ground to lead 2181 to operate relay 1910 in the coder circuit, closes ground to lead RUN and momentarily to lead SET of the pulse generator 2180, prepares the holding circuits for 2260 and 2220, closes ground through (650 ohm) to monitor lamp lead 2191, shorts #1 winding of 2140, and closes 10 or 12 i.p.m. through lead 2192 to magnet 2280.

The pulse generator 2180 operates and pulses relay 2170 at a rate of 10 p.p.s. over lead P. Magnet 2280 operates and at the end of every time pulse advances its wipers one step. Switch 2280 functions to time out abnormal delays in translation or detection as well as to prevent excessively long holding of the transender.

Upon completion of the detection, the ticketer closes resistance battery to lead 1633 to close the circuit to #2 winding of 2220. Relay 2220 operates, locks at 2120, closes 2260, opens detection time-out lead T1 at contacts 2221, and grounds lead 2290. Relay 2260 operates, locks at 2120, prepares the circuit to switch 2010 in the coder via lead 2024, closes partially the circuit to 2240, disconnects lead 1980 from 1880 to prevent a premature release of switch 2010, and closes ground to lead 1981.

When a translation has been received or the coder has been marked for a special routing directive and sending is to start, ground is connected to lead 1988. Relay 2160 operates, closes outgoing loop leads 2193 and 2194 to seize the ticketer selector or trunk circuit, prepares the circuit to 2240, removes ground from #1 winding of 2260 (relay 2260 remains operated) and disconnects lead 1633 from #2 winding of 2220.

SENDING THE DIGITS

*Sending control digit*

The combination of 2220 and 2260 relays operated establish the control digit pulsing condition. Pulses are not transmitted to the outgoing loop on this digit. On the first operation of 2170 after 2160 operates, 2170 closes ground to 2240. Relay 2240 operates and prepares 2230. As 2170 restores at the end of the pulse, the short circuit is removed from 2230. Relay 2230 operates in series with 2240, connects ground to lead 2024 which operates magnet 2010 of the coder circuit, prepares the pulsing circuit to switch 2360, closes the pulsing circuit to switch 2860 of the ticketer via lead 1633, and closes the pulse counting circuit to switch 2350.

As relay 2170 releases on each pulse, it removes ground from lead 1633 to step switch 2860 in the ticketer; at the same time it steps switch 2350.

Levels associated with wipers 2353 and 2354 of switch 2350 are connected to levels associated with wipers 2015, 2016, 2017 and 2018 of switch 2010 of the coder circuit through the corresponding leads W (2025), X (2026), Y (2027) and Z (2028) according to codel code for the corresponding terminals 1 to 10 of level associated with wipers 2353 and 2354. Relay 2320 is connected to wipers 2353 and 2354 of switch 2350 and operates only when both wipers are simultaneously connected to ground; this occurs when the wipers of switch 2350 are stepped to the terminal corresponding to the digit marked over leads W (2025), X (2026), Y (2027) and Z (2028).

On the first step of switch 2350, the RSON springs 2352 and 2353 operate, prepare the homing circuit of this switch and connect ground from 2120 to 2250. Relay 2250 operates, closes its holding circuit, prepares a holding circuit for 2210 and closes a second holding circuit to #1 winding of 2220.

Switch 2350 steps with each pulse of relay 2170 until its wipers reach the terminals marked over leads W11, X11, Y11 and Z11, the sending control digit, in the coder.

At this moment relay 2320 operates and grounds relay 2210. Relay 2210 operates, opens the pulsing circuit via lead 1633, opens magnet 2010 of the coder circuit, opens multiple ground to #1 winding of 2220, transfers the pulsing circuit to switch 2360, closes its holding circuit, opens 2240 and 2230 and prepares the homing circuit to switch 2350.

Magnet 2010 in the coder restores and advances its wipers one step. An interdigital pause is not provided because a digit has not yet been pulsed to the outgoing loop, and, since there is always something stored on the first digit (codel 12) of the translated routing directive, it is unnecessary to count off an interdigital interval for its auxiliary testing function of the next codel.

Relays 2240 and 2230 restore and reestablish part of their operating circuit from relay 2170. Relay 2240 closes the homing circuit to switch 2350 through its RSON 2352 and INT. springs 2351 to magnet 2350. Relay 2230 opens the pulsing circuit to switch 2360. Relay 2230 should restore before 2170 reoperates. If 2170 reoperates before 2230 restores, then the circuit is closed to magnet 2360. With the release of 2230, the circuit is opened to magnet 2360. Magnet 2360 restores and advances its wipers one step. (This action does not perform any particular function at this stage of the sending operations.)

Switch 2350 restores to its normal position by stepping self-interrupted to its normal position. Relay 2320 restores. The RSON springs 2353 of 2350 restore and open 2250. Relay 2250 restores, opens 2220, and closes the homing circuit to magnet 2360 through its RSON 2362 and INT. springs 2361. Relay 2220 restores, opens a multiple holding circuit to 2260, closes part of the circuit to 2240, opens ground from lead 2290, and opens 2210. Relay 2210 restores and prepares the circuit to 2240 to start the cycle of sending the first routing digit.

*Translated routing directives*

On the first operation of relay 2170 after 2210 restores, the circuit is closed to 2240. Relay 2240 operates and prepares 2230. As 2170 restores at the end of the pulse, the short circuit is removed from 2230. Relay 2230 operates, grounds lead 2024 which closes switch 2010 of the coder, prepares the pulsing circuit to switch 2360, and closes the pulsing circuit to switch 2350.

As relay 2170 releases on each pulse, it opens the loop via leads 2193 and 2194 to step the ticketer selector (or subsequent switches) at the same time it steps switch 2350.

On the first step of switch 2350, the RSON springs 2352 and 2353 operate, close a part of the homing circuit, and close the circuit to 2250. Relay 2250 operates, closes its holding circuit, and prepares the holding circuit to 2210.

Switch 2350 steps with each pulse of 2170 until its wipers reach the terminals marked over leads W12, X12, Y12 and Z12 (FIG. 17), the first digit of the routing directive stored in the coder.

At this moment relay 2320 operates and grounds 2210. Relay 2210 operates, locks at 2120, shorts the pulsing contact 2170 to terminate the loop pulsing, opens ground from lead 2024, transfers the pulsing circuit to switch 2360, prepares the homing circuit to switch 2350, and opens 2260. Magnet 2010 of the coder restores and advances its wiper one step (codel 13). Relay 2260 restores.

*Interdigital pause*

Relay 2170 continues to pulse and steps switch 2360. On the first step, the RSON springs 2363 operate, connect ground to switch 2350 through the RSON 2352 and INT. 2351 springs of 2350, and prepares a holding circuit to relay 2260. Switch 2350 restores to normal by stepping self-interrupted to its normal position. The RSON springs of 2350 restore. (Relay 2250 does not release at this time.) Relay 2320 restores.

Switch 2360 steps and, when ground encountered on leads W (2025), X (2026), Y (2027) or Z (2028), the circuit is closed to 2260. (No ground on leads W, X, Y or Z would indicate that there is nothing stored on the codels associated with the bank terminals of switch 2010 on the coder.) Relay 2260 operates and locks.

As switch 2360 steps to the fourth position, the circuit is opened to 2240 and 2230. Relays 2240 and 2250 restore. Relay 2240 opens 2250. Relay 2230 opens the pulsing circuit to switch 2360. Relay 2250 restores and closes ground to magnet 2360 through RSON 2362 and INT. springs 2361. Magnet 2360 operates and steps its wipers self-interrupted to normal. The RSON springs 2362 restore and open the holding circuit to 2210. Relay 2210 restores and prepares the circuit to 2240 to start the second digit cycle.

The digit sending cycle for the second, third, fourth, fifth and sixth digits (if stored) is the same as for the first one. All digits to be sent are marked on leads W12 to Z17 (FIG. 17) and are extended through levels associated with wipers 2015, 2016, 2017 and 2018 of switch 2010 through levels associated with wipers 2353 and 2354 of switch 2350 to relay 2320. After each digit has been sent, switch 2010 in the coder advances one step to mark the next digit for relay 2320.

When the last stored digit of the directive has been sent, relay 2260 will not find an operating ground on the codel test during the interdigital interval. With both 2260 and 2250 restored, leads 1980 and 1880 are connected together to complete a path to the 2010 switch magnet in the coder.

Magnet 2010 steps its wipers self-interrupted to blank terminals 9. Leads W (2025), X (2026), Y (2027) and Z (2028) are now connected through levels associated with wipers 2015, 2016, 2017 and 2018 to leads 1634, 1633, 1636 and 1637 which reach the called number storage in the ticketer via sequence switch 2860 in the ticketer. Lead 2022 is connected through wiper 2014 of switch 2010 to lead 2029 so as to connect the 2240 relay coil to lead 1633 whenever 2360 is at normal.

SENDING THE CALLED NUMBER

The sending control digit which was sent previously conditions the ticketer to absorb those digits of the called number which are not required for sending. Switch 2860 of the ticketer steps its wipers accordingly and connects ground from the associated codel to leads 1634, 1635, 1636 and 1637.

Resistance battery on lead 1633 supplied from the ticketer whenever a digit is ready for sending, prepares the operating circuit to 2240. On the first operation of relay 2170, the circuit is closed to 2240. Relay 2240 operates and prepares 2230. As 2170 restores at the end of the pulse, the short circuit is removed from 2230. Relay 2230 operates, prepares the circuit to switch 2360, and closes the pulsing circuit to switch 2350. As relay 2170 releases on each pulse, it opens the loop via leads 2193 and 2194 to pulse the ticketer sender (or trunk, or subsequent switches) at the same time it steps switch 2350.

On the first step of switch 2350, the RSON springs 2352 and 2353 operate, close a part of the homing circuit, and close 2250. Relay 2250 operates, locks at 2120 and prepares a holding circuit to 2210.

Switch 2350 steps with each pulse of 2170 until its wipers reach the terminals marked over leads 1634, 1635, 1636 and 1637 stored in the ticketer.

At this moment relay 2320 operates and grounds 2210. Relay 2210 operates, locks at 2120, shorts the pulsing contact 2170 to prevent it from sending further pulses to the succeeding switch, transfers the pulsing circuit to switch 2360, prepares the homing circuit to switch 2350, and closes 2290 lead ground to lead 1633 to the ticketer.

*Interdigital pause*

Pulse counting on switch 2360 and the subsequent operation to establish an interdigital interval proceed as explained above. The release of relay 2230 when switch 2360 reaches the fourth position opens the 2290 lead ground from the 1633 lead to terminate the sequencing pulse to the ticketer. Switch 2860 in the ticketer advances its wipers one step to extend the codel markings for the next digit to the 1634, 1635, 1636 and 1637 leads.

Subsequent operations are as explained in the preceding section with the following exceptions:

Relay 2260 does not operate. All digits to be sent are marked on leads 1634, 1635, 1636 and 1637. Magnet 2010 does not step at this time. This circuit must find resistance battery on lead 1633 as a condition for further sending. As long as lead 1633 is open, no additional digit will be sent.

The digit sending cycle for succeeding digits to be sent is the same as the one explained. The sequencing pulse on lead 1633 following the sending of the last digit in the called number storage in the ticketer causes the ticketer to switch through and release the transender.

STOP-DIAL SUPERVISION

If stop-dial supervision is encountered during the interdigital period, ground is closed to lead 1630 to hold further sending until the stop dial supervision is removed. This supervision is used when a delay is required for other switch equipment to prepare for dial pulsing, or when a busy path is encountered during normal switch operations.

Relay 2310 operates, locks through lead 1980 at 2120, closes a holding circuit to 2210, and connects the multiple on level associated with wiper 2364 of switch 2360 to bank terminal 4.

Relays 2240 and 2230 which normally release on bank terminal 4 of 2360 remain operated which keeps the switch 2360 stepping. On bank terminal 10 relay 2340 operates in series with 2240 and 2230, locks at 2240, and connects relay 2330 to bank terminal 9. Switch 2360 keeps on stepping a second cycle. When it steps to terminal 9, relay 2330 operates in series with 2240 and 2230, locks at 2240, and opens bank terminal 4 from the multiple.

As switch 2360 encounters bank terminal 4 on the third cycle, the circuit is opened to 2240 and 2230. Relay 2240 and 2230 restore. Relay 2240 opens 2350, 2330 and 2250. Relays 2340 and 2330 restore. Relay 2250 restores and closes magnet 2360. Switch 2360 steps its wipers self-interrupted to normal. Relay 2230 opens the pulsing circuit to switch 2360. Relay 2310 keeps 2210 operated until stop-dial supervision is removed from lead 1630. Relay 2310 restores and opens 2210. Relay 2210 restores and prepares the circuit to 2240 for the next digit to be sent.

*30 i.p.m. flash busy*

On the first ground pulse received, relay 2310 operates, locks, closes a holding circuit to 2210, and connects bank terminal 4 to the multiple of the level associated with wiepr 2364 of switch 2360. Subsequent operations are as explained above.

Relays 2340 and 2330 prevent relay 2240 from releasing before the next pulse is received. At the end of the pulse, the short circuit is removed from 2270. Relay 2270 operates and prepares the circuit to 2140.

After 1.7 seconds the second ground pulse encountered closes 2140. Relay 2140 operates, opens 2120 from the 1639 lead, grounds lead, closes 120 i.p.m. source to lead 2191 to the monitor panel, and grounds delayed RLS alarm lead 2195 through a lamp.

Relay 2120 restores, opens lead 2181 to release relay 1910 of the coder circuit, opens the pulse generator, closes a multiple ground to 2140, opens lead 2192, closes ground through the low resistance pilot winding of 2140 to magnet 2350, opens 2210, and opens 2310 and 2270. The pulse generator 2180 stops and releases 2170. Relays 2210, 2310 and 2270 restore. Magnet 2350 steps its wipers self-interruptedly to normal. The RSON springs 2353 restore and close low resistance ground to the switches of the coder and codexer. After these switches have restored to normal, relay 2140 restores, closes relay 2120 to lead 1639, prepares the circuit to the pulse generator, opens ground from lead 1638, and disconnects ground from lead 2195 RLS alarm through the lamp.

When the 2140 relay operated and disconnected the resistance battery (2120 coil) from the 1639 lead, the ticketer responded by opening its connection to the transender and by closing busy tone to the calling line.

*60 i.p.m. flash busy*

Operations are as explained in the preceding section. Relays 2340 and 2330 will not operate at this time because the second pulse of the busy flash will be received before the wipers of 2360 have reached bank terminal 10 on the first cycle of the expanded interdigital interval.

*120 i.p.m. flash busy*

Operations are as explained in the preceding section.

TRANSLATION FAULT IN THE CODER CIRCUIT

If for some reason the coder fails to release the translator and translator assigner promptly, a slow relay will restore in the assigner and close direct ground to lead assign 1985 which, in turn, extends the ground to lead 1986. Ground on lead 1986 closes the circuit to relay 2150. Relay 2150 operates, locks at the busy key 2196, opens the loop, opens the operating path to 2240, opens ground from lead 1981, and closes 2140. Relay 2140 operates and locks, transfers the holding circuit of 2120 from lead 1639 to ground through contact 2268, disconnects ground from lead 1638, closes 120 i.p.m. to lead 2191 to the monitor panel, and closes ground to lead RLS alarm 2195. The ticketer responds as in the aforementioned section to close busy tone to the calling line. To make this circuit available for other calls, the busy key 2196 must be operated momentarily. Relay 2150 restores, opens 2140 and 2120. Relays 2140 and 2120 restore. Relay 2120 opens 2260 and 2220. Both relays restore.

RELAY 2320 FAILS TO OPERATE

If relay 2320 fails to operate, relay 2170 continues to send pulses to switch 2350 and, when its wipers reach normal position, the RSON springs 2352 and 2353 restore and close the circuit to 2150. Relay 2150 operates, opens the loop, opens 2240 and 2230, and if 2260 is operated, ground is closed to 2140. Relay 2240 and 2230 restore, open ground from lead 2024 to restore switch 2010, and opens 2250. Relay 2250 restores. Relay 2140 operates, transfers the holding circuit to 2120 to ground through a contact of 2268, closes 120 i.p.m. to lead 2191, and closes ground to lead RLS alarm 2195 through a lamp. The ticketer responds to the opening of the 1639 and closes busy tone to the calling line. The momentary operation of the busy key 2196 restores the circuit to normal.

If relay 2260 is not operated, which indicates that the faulty digit marking condition is in the ticketer, ground will be closed to 2140 through time-out lead T4 on the level associated with wiper 2285 of switch 2280. After an interval normally sufficient for the calling party to have completed dialling, the 2140 relay will operate as described above, the ticketer will lock busy and give an alarm and the transender will be released.

TRANSENDER TIME-OUT

If the timing switch 2280 advances and closes ground to lead T1 before the 2220 relay is operated, a failure to receive a detection results in the ticketer as indicated. This will occur if the subscriber delays too long before dialling the first digit (zero) into the ticketer, or may result form faulty functioning of the detector and associated equipment.

Closure of the T2 lead before the coder has removed ground from the T0 (1883) lead indicates an abnormal delay in starting the translation cycle. This will occur if the subscriber delays too long in completing the dialling of the office code.

Time-out lead T4 may be grounded if transender operations are not completed within the allotted time. Time-out via T1, T2 or T4 leads all result in operation of relay 2140 and response by the ticketer to extend busy tone to the calling line. The ticketer may also lock busy and give an alarm in certain circumstances indicating ticketer faults.

Time-out via lead T3 (2180) indicates translator assigner failure and is described in connection with the coder unit circuit.

RELEASE

Ground disconnected from lead 1639, when the ticketer switches through, opens 2120. Relay 2120 restores, grounds 2140, closes the homing circuit to magnet 2350, opens ground from lead 2181 to start the release operation in the coder, and steps the pulse generator. Relay 2140 operates, opens lead 1639 from 2120, closes ground to lead G, closes 120 i.p.m. to lead 2191, and closes ground through a lamp to lead RLS alarm 2195. Relay 2170 restores. Switch 2350 steps self-interruptedly to normal. The RSON springs 2352 and 2353 restore, opens the #2 winding of 2140, and connects ground through pilot winding (#1) winding of 2140 to lead to release the coder and coder switches. Relay 2140 restores after coder and codexer release actions are completed, closes 2120 again to lead 1639, opens ground from lead 1638, disconnects ground from lead RLS alarm 2195, and disconnects 120 i.p.m. from lead 2191. The circuit is now at normal.

MONITORING AND TESTING

A monitor lamp connected to lead 2191 is provided at the monitor panel for each transender. When the sender busy key is operated, the condition is indicated by a steady bright light. Normal seizure of the transender is indicated by a steady dim lamp. Restoring cycle and locked busy conditions are indicated by flashing the monitor lamp at 120 i.p.m. A delayed alarm will be actuated if the 2140 relay remains operated for an abnormally long time. In this case, the release alarm lamp on the sender will also light.

The transender may be accessed from the monitor panel for routine testing. The pulse output speed and ratio from relay 2170 may be tested via common leads 2197 and 2194. Display of digits sent by the transender may also be obtained at the monitor panel by making the test calls through a ticketer selected at the monitor panel. Relay 2130 is operated via coder relay 1920 to connect the transender to the test multiple leads when access is made from the monitor panel.

Test jacks are provided on the sender unit to obtain a local output of the sender pulsing. For these tests the transender may be seized and test codes dialled in at the test jack on the associated codexer unit.

CALL ORIGINATING FROM A BRANCH OFFICE

The SATT equipment shown in FIGURES 9 to 31 can also be utilized to process calls originating in a branch office such as that illustrated in FIGURES 2 to 6.

When the calling subscriber at station RS–21 removes his receiver, the usual loop circuit, including the line conductors 211 and 212 is completed for operating the line circuit 210. In response to the completion of the above mentioned loop circuit, the line circuit 210 initiates operation of the distributor and marks the terminals of the calling subscriber line in the bank contacts of a group of line finders, including the line finder 220, having access to the calling subscriber line. For the purpose of this description it will be assumed that the distributor selects the line finder 220 and that the latter finder operates its wiper in a vertical and then in a rotary direction in the well-known manner to select the terminals in the associated bank terminating the calling line. When the calling line is found by the line finder 220, it extends the calling line to the individually associated first selector 225 and the latter selector transmits the usual dial tone signal to the calling subscriber to indicate that the dialling may be started. The above noted switching apparatus, including the line circuit 210, the distributor, the line finder 220 and the first selector 225 may be of conventional construction and arrangement.

Since the calling subscriber at station intends to extend the connection to a called subscriber in a remote exchange it is necessary to prefix the three digit directory number of the called subscriber with the digits "90." Consequently, when the calling subscriber receives the dialling tone signal the dial is actuated in accordance with the digit 9 to transmit nine loop impulses to the first selector 225. This selector then raises its wipers in a vertical direction to the ninth level and then rotates its wipers over the selected level to search for an idle SATT trunk circuit, such as the circuit of FIGS. 2 to 6. It will be assumed for the purpose of this description that the first selector 225 now extends the connection from the calling subscriber line by way of the cable 2000 to the trunk circuit illustrated in FIGS. 2 to 6, inclusive. The cable 2000 includes the — conductor, the + conductor and the control conductor. If the trunk circuit is busy, the control conductor will be grounded in order to indicate the busy condition to the first selector 225. Thus, as the selector rotates its wipers over the ninth level it will pass over contacts terminating trunk circuits having grounded control conductors corresponding to the C conductor.

When the first selector 225 seizes the trunk circuit of FIGS. 2 to 6 it extends the loop circuit, including the — and + conductors of the calling line to the — and + conductors of the trunk circuits.

Resistance battery on lead C marks this circuit idle to preceding selectors. When seized, the "tip" side of the subscriber's loop is closed through polar relay 470 and its associated lamp 472 to exchange battery, and the "ring" side of subscriber's loop is closed thru relay 570 and resistor 578 to spotter battery 579. Relay 570 operates, but relay 470 does not operate at this time. Relay 570 closes 640 and 580. Relay 640 operates, closes part of the pulsing circuit on lead 5500, blocks the digit "0" from being repeated to the incoming trunk circuit, and prepares a holding circuit to 580. Relay 580 operates, connects a multiple ground to 640, prepares the circuit to 550 closes ground to lead 5500 and in turn to relay 740 in the succeeding circuit, closes 620, prepares the holding circuit for 660, and connects ground to lead C to hold preceding equipment and mark this circuit busy. Relay 620 operates, closes spark suppression shunt, prepares the circuit to the magnets 370 and 380, prevents the operation of the release alarm equipment, and closes 6 second ground pulses to magnet 670 from lead 5501.

If the calling party waits too long before dialling the first digit, ground is closed to 430 via switch 380 and 670. Relay 430 operates momentarily, closes 540, and closes busy tone to lead "+" of cable 2000. Relay 540 operates, locks, opens the circuit to 570 and closes the loop via repeat coil to 680. Relay 570 restores.

When the calling party restores, the loop is opened to 680. Relay 640 restores, opens 580 and closes 550. Relay 550 operates and closes 560. Relay 560 operates and prepares the RLS ALM circuit. Relay 580 restores, opens 540, closes low resistance ground to magnet 670, and opens 550. Relay 620 restores and completes the circuit to a delayed release alarm. Relay 540 restores, transfers the "+" lead from #1 winding of 640 via repeat coil 680 to 570 and the "—" lead from winding #2 of 640 via repeat coil 680 to 470. Relay 430 restores after an interval and removes busy tone from the "+" lead. Relay 550 restores due to its slow-to-release characteristics. In the meantime switch 670 steps its wipers self-interrupted to the normal position. The RSON springs 672 restore and open 560. Relay 560 restores.

DIALLING PARTY IDENTIFICATION DIGIT "0."

As the subscriber dials the party identification digit "0," relay 570 follows the dial pulses. Relay 580 being slow-to-release, remains operated during pulsing. When relay 570 restores on the first dial pulse, the circuit is closed to relay 550, magnets 370 and 380. Magnets 370 and 380 operate. Relay 550 operates, closes 560, and prepares a circuit to 450.

At the end of the first pulse, 570 reoperates, opens the circuit to 370 and 380, recloses the circuit to 580. Relay 550, being slow-to-release, remains operated during pulsing.

Magnet 370 may or may not advance its wipers on the remaining dial pulses depending on the SATT "spotter pulse" of the calling party. Further operation of magnet 370 is described in the succeeding section.

When 570 restores on the second dial pulse, the circuit to magnet 370 and 380 and relay 550 is closed again. At the end of the second dial pulse, 370 reoperates, opens magnets 370 and 380. Magnets 370 and 380 restore and advance their wipers one step.

After the tenth dial pulse, the wipers of switch 380 are engaged on bank terminal 10.

When the digit "0" is completed, relay 550 restores, opens 560 which is slow-to-release, and closes ground through bank terminal 10 of level associated with wiper 384 to magnet 380. Magnet 380 operates the INT. Contacts 381 opens the circuit and the switch restores and advances the wipers one step.

Ground through the level associated with wiper 384 to the bank terminal of switch 380 at normal is closed to 540. Relay 540 operates, locks to 580 transfers the "—" side of the line from spotter battery 579 to exchange battery through repeat coil 680 and number one winding of 640, and the "+" side of the line from relay 470, to ground through the number two winding of 640, opens 570 and closes 420.

Relay 570 restores. Relay 420 operates, connects ground to the start lead 241 of the detector assigner 240, disconnects ground from the guard lead 242, and closes relay 450 to the hold lead 243.

IDENTIFICATION OF CALLING PARTY

Type B SATT installations are capable of serving both single party lines and party lines of as many as ten stations. All stations on party lines must be equipped with special "spotter" dials. Stations on single party lines are equipped with regular dials.

The spotter dial differs from the regular dial in that it provides an additional set of spotter springs which can be closed by a special cam during the return of the dial. The spotter springs closed interval is positioned to occur only during the period when the regular springs are closed. The spotter springs, when closed by the special cam, close a spotter ground pulse on the "+" side of the line. The spotter cam can be arranged to close the spotter ground pulse on the line after any one of the individual dial pulses. For the first station, the spotter dials are adjusted to send a spotter pulse after the first dial pulse of the digit "0." For the second station, the spotter dials are adjusted to send a spotter pulse after the second dial pulse of the digit "0." The third, fourth, fifth, sixth, seventh, eighth, ninth and tenth stations on a party line are arranged accordingly.

If the calling station has a single party line, no spotter pulses are closed to the "+" lead. Switch 370 follows the 10 dial pulses of digit "0" and steps to bank terminal 10. Since relay 470 and 450 do not operate, ground remains on lead P0 to indicate a single party line.

Although the spotter pulses may appear on the "+" side of the line during the dialling of subsequent digits, they are ineffective to relay 470.

INITIATING DETECTION CYCLE

Ordinarily, the detection cycle is so rapid it will occur shortly after the digit "0" is completed. Ground on lead start 241 and absence of ground on lead guard 242 indicate to the detector assigner 240 that a detection of a calling number is desired by an outgoing trunk circuit. When the detector assigner 240 steps to this circuit, relay 410 operates over lead hold 243 in series with a relay in the detector assigner 240. Relay 410 closes bar relay 360 and 460. Bar relay 310 operates and closes leads W1 through Z5, P1 through P0, 246, 247 and 248 to the detector 245. Relay 460 operates and closes 80 v. D.C. detector battery to the preceding equipment via lead C.

In the course of the detection cycle, the detector closes ground to the various W1 through Z5 leads. These grounds represent, in codel code, the equivalent office code and terminal number of the calling station. Codel relays in codel 1 (360) through 5 (shown in block form as 365) operate from these grounds and lock to store the calling number. The decimal equivalent of the W, X, Y, Z codel relays are described in an earlier section.

When the detection is completed, the detector closes ground to lead 246. Relay 440 operates, locks, opens 420, opens 410, and prepares the circuit for 530. Relay 420 restores, removes ground from lead start 241 and closes ground to lead 242.

Relay 410 restores, opens 460 and bar relay 310. Bar relay 310 restores. Relay 460 restores and replaces +80 v. D.C. detector battery with ground on lead C. Resistor 681 is used in conjunction with "X" makes 461 on 460 to facilitate application of detector battery to the "C" lead without dropping the switch train and without burning springs when ground is connected to the +80 v. detector battery.

DIALLING CALLED NUMBER

As the subscriber dials the first number, relay 640 follows the dial pulses and repeats them over lead 5500 to the incoming trunk (FIGS. 7 and 8) in the main ticketing office. When relay 640 restores on the first dial pulse, the circuit is closed to 550. Relay 550 operates, disconnects ground from level associated with wiper 384 of switch 380, and closes 560. Relay 560 operates and prepares the circuit to 530. Relay 550 being slow-to-release, remains operated during pulsing. After the first digit of the called number is completed, relay 550 restores and closes ground to the level associated with wiper 384 of switch 380, bank terminal at normal position to close the circuit to 530. Relay 530 operates, locks at 580 and closes the circuit to 630. Relay 630 operates, prepares a pulsing circuit over lead 5500A and connects ground to magnet 380. Magnet 460 operates.

TRANSFERRING CALLING PARTY'S NUMBER TO TICKETER

The calling party's number detected by the detector 245 and stored on codel relays is transferred in the following manner. Upon release of relay 630 which opens the operating circuit through its own contact, ground is disconnected to rotary magnet 380. Magnet 380 restores and advances the wipers one step. Relay 630 restores and closes its operating circuit again.

Relay 630 operates, closes ground to magnet 380, and opens its operating circuit. Relay 630 restores again and restores switch 380 which steps its wipers to the next step. Relay 630 steps self-interrupted and continues this operation until the switch is in its normal position. The pulsing rate of relay 630 is established by the amount of the capacitance of 635 and 636. In this case the pulsing rate is about 12.5 pulses per second.

The wipers 385 and 386 of switch 380 step and scan across the terminal banks which are connected to codel groups 1(360) to 5(365). When a grounded code lead is encountered, the circuit is closed to 610. Relay 610 operates and closes an 80 v. D.C. pulse over the "+" side 5500A of the trunk to the incoming trunk circuit which in turn closes a ground pulse simultaneously to leads 5020 and 5021. On leads where no ground is encountered (610 will not operate), −48 v. D.C. pulses will be sent to the "+" side 5500A of the trunk to the incoming trunk circuit which in turn closes a ground to only lead 5020.

COMPLETE DETECTION

When the ticketer has completely received the calling party's number, 500 ohm resistance battery is closed to lead 5500A which closes a circuit to 660. Relay 660 operates its "X" contacts 664 first to close a holding circuit, prepares the operating and holding circuit to 650, and closes a part of the transmission circuit. Relay 650 does not operate since there is a 500 ohm resistance battery encountered on lead 5500A.

SWITCH-THROUGH

Switch-through, after sending is completed, is performed by disconnecting ground from lead 870 in the ticketer to cause the incoming trunk to switch through the transmission path and replaces 500 ohm resistance battery with ground on lead 5500A which in turn energizes 650. Relay 650 operates, closes first its "X" contacts 655 which close the holding circuit, closes the transmission circuit, opens the holding circuits to 450 and 530 and the codel relays and opens the pulsing circuit to magnet 670. Relays 450, 530 and the codel relays restore.

PREMATURE DIALLING

If the subscriber dials before an idle ticketer is found, 500 ohm resistance battery is encountered on lead 5500A. Relay 660 operates, locks at 580 and closes ground to 430. Relay 430 operates, disconnects ground from lead 5500, locks to ground at 580, closes the circuit to 540 and connects busy tone to the "+" lead at contacts 431. Relay 540 operates and opens the circuit to 570. Relay 570 restores.

After the subscriber restores the handset, the loop is opened to 640. Subsequent operations are as explained in the section for releasing with the following exceptions:

Relay 430 restores after 580 restores. Relay 650 is not operated at this time.

INCOMPLETE DETECTION

If an incomplete or double detection occurs in the detector, ground is closed to lead INC. 247. Relay 510 operates, opens 420 opens 410 and prepares a circuit for 530. Relay 420 restores, removes ground from lead start 241 and closes ground to lead guard 242. Relay 410 restores, opens the bar magnet 310 and opens 460. Bar magnet 310 restores. Relay 460 restores and replaces +80 v. D.C. detector battery with ground on lead C.

After the first digit of the called number is completed, relay 550 restores and closes ground to level associated with wiper 384 of switch 380 to cause 380 to step itself to normal. The circuit is now closed to 530. Relay 530 operates, locks, and closes the circuit to 630. Relay 630 operates, opens the circuit to itself, sends a −48 v. D.C. pulse to the ticketer via the incoming trunk circuit. Relay 630 restores and disconnects −48 v. D.C. from lead 5500A. Five-hundred ohm resistance battery is now encountered on lead 5500A and closes the circuit to 660. Relay 660 operates and locks at 580.

A special fault routing directive is now sent or relay 1460 operates in the ticketer. At this point switch-through takes place as described in that section.

After the subscriber restores the handset, the loop is opened to 640. Subsequent operations are as explained in section for release with the following exceptions:

Relays 510 and 530 restore after 580 restores.

FAILURE TO DIAL PARTY IDENTIFICATION DIGIT "0"

In order for relay 540 to operate upon the completion of the first digit, it is necessary that switch 380 wiper 384 be engaged on the tank terminal in normal position. Should the subscriber fail to dial the party identification digit "0," relay 540 will not operate.

As relay 550 restores after the last pulse of the first digit, it opens 560, and closes the circuit via switch 380 and the level associated with wiper 354 to 430. Relay 560 restores. Relay 430 operates, locks at 580, closes ground to 540 and closes busy tone to "−" lead. Subsequent operations are as explained in section on premature dialling.

RELEASE

When the calling party disconnects, the loop is opened to 640. Relay 640 restores, opens 580 and closes 550. Relay 550 operates and closes 560. Relay 560 operates and prepares the RLS ALM circuit 683. Relay 580 restores, opens 620, 660, 540 closes low resistance ground to magnet 370 and opens 550. Relay 620 restores and completes the circuit to a delayed release alarm. Relay 360 restores, opens the transmission circuit, and opens 650. Relay 540 restores, transfers "−" lead from #1 winding of 640 via the repeat coil 680 to relay 570 and "+" lead from #2 winding of 640 via the repeat coil 680 to relay 470. Relay 650 restores. Relay 550 restores due to its slow-to-release characteristics. In the meantime switch 370 steps its wipers self-interrupted to normal position. The RSON springs 372 restore and open 560. Relay 560 restores. The circuit is now at normal.

OPERATION OF INCOMING TRUNK CIRCUIT

When seized, ground is closed on lead 5500 to the #1 winding of 740. Relay 740 operates and closes 710. Relay 710 operates, closes ground to the meter circuit over lead 780, removes ground from lead 781, closes ground to the "in" terminal of the #2 winding of 840 and closes lead 871 at contacts 711 to the break spring of 851 and the "out" terminal of the #2 winding of 840.

HUNTING FOR IDLE TICKETER

If the associated ticketer is busy, ground appears on lead 871 and 872. Ground on lead 871 shorts relay 840 and operates magnet 850 in the ticketer hunter. The INT. 851 springs operate and open the circuit to magnet 850. Magnet 850 restores and steps the rotary switch to another ticketer. The INT. springs 851 restore. This self-interrupted stepping continues until an idle ticketer is found or the subscriber dials.

SEIZING A TICKETER

When an idle ticketer is found, 500 ohm resistance battery appears on lead 872 and absence of ground appears on lead 871. Relay 720 operates its "X" contacts 724 which prevents relay 840 and magnet 850 from operating and closes the #2 winding of 720 in series with 730. Relay 720 operates fully on its #2 winding, shorts its #1 winding, prepares the pulsing path for relays 810 and 820, closes 720 and 730 in series to lead 872, and closes leads 873 and 874 through resistor 782 to seize the ticketer. Relay 730 operates, closes relay 750 to lead 870, opens leads 871 from springs 851 to prevent stepping of the ticketer hunter as the ticketer is seized and opens 710. However, before 710 restores, the seized ticketer closes ground to lead 872 to hold 720 and 730, to lead 871 to mark itself busy to other ticketer hunters and selectors. Relay 710 restores, removes the short from the #1 winding of 720 and removes ground from lead 780.

The incoming trunk circuit is now ready to receive the subscriber's dial pulses.

REPEATING DIAL PULSES

The subscriber's dial pulses appear on lead 5500. Relay 740 follows the dial pulses on lead 5500 and opens leads 874 and 873 each time it restores. In this manner, the dial pulses on lead 5500 are repeated as loop pulses to the ticketer over leads 874 and 873.

FORWARDING CALLING PARTY'S NUMBER

After the subscriber has dialed the first digit of the called number, the outgoing trunk in the branch office begins transmitting the detected calling party's number, in code form, as a series of battery pulses (either +80 v. D.C. or −48 v. D.C.) on lead 5500A. Relay 820 operates on every pulse, whether +80 v. D.C. or −48 v. D.C. However, relay 810 is a polar relay and only operates on the +80 v. D.C. pulses. Thus, on every pulse, ground is forwarded over lead 5020 to the ticketer, but only on the +80 v. D.C. pulses when both, 810 and 820 operate, is ground forwarded over both leads 5020 and 5021 to the ticketer.

When the ticketer has completely received 750 the calling party's number, it closes ground to lead 870. Relay 750 operates, closes 500 ohm resistance battery to lead 5500A opens the pulsing circuit to 810 and 820, and closes ground on lead 870 to the "out" terminal of 760. Relay 760 is shorted at this time and does not operate.

SWITCHING THROUGH

When the transender has completed sending and released, ground is removed from lead 870. Relay 760 operates in series with 750, removes the 300 ohm resistance 782 shunt from the repeat coil, removes 500 ohm resistance 783 battery from lead 5500A, transfers the holding path of 740 to the subscriber's loop, and completes the voice transmission path through repeat coil 770.

PREMATURE DIALLING

If the subscriber dials before an idle ticketer is found, relay 740 follows the dial pulses and closes 750. Relay 750 operates, locks, closes 500 ohm resistance battery to lead 5500A, opens the circuit to magnet 850 to stop hunting in the ticketer hunter and opens #2 winding of 840 to prevent its operation. The circuit thus remains operated until released.

DOUBLE SEIZURE OF TICKETER

If the ticketer hunter seizes a ticketer simultaneously with another ticketer hunter or selector, relay 720 will not operate over lead 872 due to its marginal adjustment. Since absence of ground appears on lead 871, relay 840 is not shorted and operates on its #2 winding in series with magnet 850, locks on its #1 winding and closes ground through the #1 winding of 840 over the lead from contacts 831 to magnet 850. Magnet 850 operates. The INT. springs 851 operate and close the #1 winding of 830 over leads from make spring of 851 and armature spring of 851 through the #1 winding of 840. Relay 830 closes its "X" contacts 832, locks and operates completely to open magnet 850 and to open the #2 winding of 840. Magnet 850 restores and steps the rotary switch to the next ticketer. The INT. springs 851 restore and open the #1 winding of 830 and 840. Relay 840 restores and opens the #2 winding of 830. Relay 830 restores. Hunting continues as before.

RELEASE AFTER SWITCH-THROUGH

When the calling party restores his handset, the loop to relay 740 is opened. Relay 740 restores and opens the loop to the ticketer. When the ticketer removes ground from lead 872, 720 and 730 restore. Relay 730, in restoring, opens 750 and 760. Relays 750 and 760 restore.

RELEASE AFTER PREMATURE DIALLING

When the calling party restores his handset, the loop to relay 740 is opened. Relay 740 restores and opens 710. Relay 710 restores and opens 750. Relay 750 restores.

TEST FACILITIES

Operation of a test key in the test and monitor panel opens the regular hunting circuit and closes ground through the RSON springs 852 to lead 871. This ground remains on lead 871 until the rotary switch in the ticketer hunter reaches the 25th position and the RSON springs 852 operate to open the circuit. Thus, when the incoming trunk is seized for test purposes, the ticketer hunter will step to the 25th positions where the incoming trunk will switch-through to test commons in the test and monitor panel circuit which are not shown.

OPERATION OF TICKETER FOR CALL ORIGINATED IN BRANCH OFFICE

When seized from an incoming trunk circuit, most opoperations are identical to those previously described for a local call with the following exceptions: Relays 1240, 1150, 1010, 1130, 1170 and 1030 do not operate at any time. Relay 1180, on the other hand, will operate only when seized by the incoming trunk circuit. The party identification digit "0" of the access code is not repeated to this circuit since party identification and detection of the calling number is performed in the branch office. Only the called number is repeated to this circuit as loop pulses on leads 874 and 873. Those operations which are materially different for a call originated from the branch office are described below.

SEIZURE FROM INCOMING TRUNK CIRCUIT

Resistance (R4) battery on lead 1001 and absence of ground on lead 1007 marks this switch idle to the incoming trunk circuit. When seized by the incoming trunk circuit, a 300 ohm loop is closed over leads 1203 and 1201 to 1170, #1 winding of 1230 and #2 winding of 1440. The cycle of operation for seizure from the incoming trunk circuit is identical to seizure from a local selector as described, except that in addition, relay 1440 operates on its #1 winding in series with #1 winding of 1230 upon seizure.

Relay 1440 prevents 1240 from operating, and prepares a path for 1210 and #2 winding of 1440. When relay 1470 operates, it closes 1216 and closes a holding path to #2 winding of 1440. When relay 1320 operates, it shorts #1 winding of 1440.

Relay 1210 operates, closes lead 5020 to magnet 2560, momentarily closes #2 of 1230 while transferring the "+" side of the line (lead 873) from relay 1170 to ground and the "—" side of the line (lead 874) from spotter battery to exchange battery.

TRANSFERRING CALLING PARTY'S NUMBER TO TICKETER

The calling party's number is detected by a detector in the branch office and stored on codel relays in the outgoing trunk circuit. After the first digit of the called number is completed, the outgoing trunk circuit begins transferring the calling party's number over the "+" side of the trunk to the incoming trunk circuit which repeats the information to the ticketer over leads 5021 and 5020. This transfer is performed in the following manner.

A rotary switch in the outgoing trunk circuit steps and scans, one lead at a time, across the stored information. When a grounded code lead is encountered, the outgoing trunk circuit closes a +80 v. D.C. pulse over the "tip" side of the trunk to the incoming trunk circuit which in turn closes a ground pulse simultaneously to leads 5020 and 5021. When an ungrounded (open) lead is encountered, the outgoing trunk closes a —48 v. D.C. pulse over the "+" side of the trunk to the incoming trunk circuit which in turn closes a ground pulse to only lead 5020.

Each pulse on lead 5020 operates magnet 2560 and thus keeps switch 2560 in unison with the transmitting switch in the outgoing trunk circuit. When a pulse is closed to lead 5021, the relay to which the wipers 2563 and 2564 of switch 2560 is at that time connected will operate and lock. This enables the stored calling party's number in the outgoing trunk circuit to be transferred and stored in the ticketer. Level of wiper 2565 of switch 2560 serves no function for calls originated in a branch office.

*Complete Detection*

If a complete detection has been registered in the outgoing trunk circuit in the branch office, a series of twenty-two ground pulses is closed to lead 5020. As the first pulse is closed to lead 5020, a pulse will not be closed to lead 5021. The first pulse on lead 5020 energizes magnet 2560 and relay 1180. Relay 1180, being slow-to-release, operates and remains operated for the duration of the pulses.

After the first pulse, switch 2560 advances its wipers 2563 to bank terminal one and closes its RSON springs 2561. As the next twenty pulses are closed to lead 5020, first the wiper 2563 and then the wipers 2564 of 2560 scan codels 1 through 5. Each time a pulse is closed simultaneously to lead 5021 and 5020, the respective codel relay to which the wipers 2563 or 2564 is at that time connected will operate and lock.

After the twenty-first pulse the wiper 2564 of switch 2560 advances to bank terminal 10. As the twenty-second pulse is closed to lead 5020, a pulse is simultaneously closed to lead 5021. Relay 1220 operates on this pulse, locks, closes ground to lead 870 and closes resistance battery to the lead to wipers 1617 of switch 1610. After the twenty-second pulse switch 2560 advances its wipers one step and relay 1180 restores.

*Incomplete detection*

If an incomplete detection is registered in the outgoing trunk, only one pulse is closed to lead 5020. Magnet 2560 and relay 1180 operate from this pulse. After the pulse switch 2560 advances its wipers one step and closes its RSON springs 2561. Relay 1180 being slow-to-release, remains operated for a short period. As no more pulses are closed to lead 5020, relay 1180 restores and closes ground on springs 1045 to #2 winding of 1450. Relay 1450 operates and locks on its #2 winding, closes #1 winding of 1510, and closes ground to lead 1607. Relay 1510 operates and locks on its #1 winding, closes resistance battery to lead 1604, opens lead 5030, and closes ground to lead 870. Further operation of the ticketer is the same as explained for a special routing directive.

If any irregularity occurs and the full complement of twenty-two pulses are not closed to lead 5020 or if the twenty-second pulse is not closed simultaneously to leads 5020 and 5021, operation is the same as for an incomplete detection.

*Ground fault on line*

If a ground fault condition is registered in the outgoing trunk, 2560 takes only one step and 1520 operates simultaneously from one pulse on leads 5021 and 5020. Magnet 2560 and relay 1180 operate from the pulse on lead 5020. Relay 1520 operates from the pulse on lead 5021, locks through its "X" contacts 1521, closes #1 winding of 1510 and closes ground to lead 1606. Relay 1510 operates and locks on its #1 winding, closes resistance battery to lead 1604, opens lead 5030 and closes ground to lead 870. Further operation of this circuit is the same as explained for a special routing directive.

SWITCH-THROUGH

Switch-through after sending is completed is performed in the same manner as described in the section for calls originated from the main office except that when relay 1470 restores, ground is removed from lead 870 to cause the incoming trunk to switch through the transmission path.

IDLE TRANSENDER NOT AVAILABLE

If a transender has not been seized by the time the first digit of the called number is dialed, relays 1530 and 1560 will not have operated and operation occurs in the following manner. As 1230 restores on the first dial pulse of the called number, it closes 1430. Relay 1430 operates and closes #1 winding of 1450. Relay 1450 operates and locks on its #2 winding, closes #1 winding of 1460 and closes #1 winding of 1510. Relay 1510 operates and locks on its #1 winding. If the call is from the branch office, relay 1450 is not operated and ground is closed to lead 870. This ground condition on lead 870 starts action in the outgoing trunk in the branch office to provide busy tone to the calling party. Relay 1460 operates its "X" contacts 1464, locks on its #2 winding, closes busy tone on lead 1485 through capacitor 1484 to leads 1203 and 1202, opens its #1 winding, closes ground to lead 5051, closes a holding circuit to #2 winding of 1040, and removes the operating ground for magnet 2810 and codels 21 through 31 of FIG. 28. The circuit remains thus operated until the calling party disconnects.

When the calling party disconnects, release is similar to that for a release from a flashing signal condition.

CHANGE OF TOLL RATES DURING CALL

Each time the dater timer changes the toll rates from day to night rates or night to day rates, it closes a ground pulse to lead 2750. If a conversation is in progress in this circuit, the RSON springs 2721 of switch 2720 are operated, and the pulse on lead 2750 (TR) closes relay 1330 through lead 5050. Relay 1330 operates, locks, and closes ground to lead 2751. Relay 1330 remains operated until relay 1040 restores on release.

CALL SUPERVISION

As long as the ticketer is in use, the SUPY lamp 1006 is flashing to indicate the following conditions:

Bright steady lamp: Ticketer seized.

Dim flashing lamp (60 i.p.m.): Call answered, "grace" period preceding conversation timing or a step dial condition.

Dim steady lamp: Call answered, ticketer timing the conversation.

Dim flashing lamp (120 i.p.m.): Call completed, ticketer calling for a tabulator and transferring ticket data to it.

Bright flashing lamp (120 i.p.m.): Ticket data transferred, ticketer in process of releasing.

Bright flashing lamp (60 i.p.m.): Conversation interval 300 minutes or longer.

BUSYING

This switch can be made busy by operating the busy key 1486. Operation of the busy key closes #1 and #2 winding of 1020, opens lead 1481 and closes ground to lead 1482. Relay 1020 operates and closes ground to leads 1001 and 1007 to mark this switch busy to preceding equipment. It can also be made busy by operating the busy key of the associated ticketer selector or trunk circuit. Operation of this busy key closes ground to leads 1001 and 1007.

MONITORING

Operation of a monitor key in the monitor panel closes ground to lead 1383. Relay 1350 operates, transfers the conversation timing circuit from lead 1381 to lead 1384, closes ground to lead 1001, opens the circuit to spring 1486 and of the busy key, transfers the transender hunter operating circuit from lead 1601 to lead 1501, prevents relay 1420 from ever operating, and closes the tabulator test common to this circuit.

What is claimed is:

1. In an automatic toll ticketing telephone system, a first exchange, a second exchange, subscriber lines in each of said exchanges, switching apparatus in each of said exchanges, calling station identification means in each exchange, an outgoing repeater in said first exchange, an incoming repeater and toll ticketing equipment in said second exchange, and a two conductor trunk line connecting said repeaters, means including said switching apparatus and said line identification means and repeater of said first exchange and said toll ticketing equipment and repeater of said second exchange for completing a toll connection from said first exchange through said second exchange, means in said repeater in said first exchange operated to forward the calling subscriber line identification information over a first of said conductors of said trunk line to said incoming repeater in said second exchange simultaneously with a second means operated to forward impulses corresponding to the calling subscribers dialling of the called subscribers digits to said incoming repeater over a second of said conductors of said trunk line, means in said incoming repeater responsive to said first and second means in said outgoing repeater to repeat said calling and called numbers to said toll ticketing equipment, storage means in said toll ticketing equipment controlled in response to said means in said incoming repeater to record said numbers and to store various other items of record information pertaining to each of said telephone connections including the directory number of said calling subscriber's line and the directory number of said called subscriber's line involved in each of said telephone connections.

2. In an automatic toll ticketing telephone system comprising, a first exchange provided with first switching apparatus, line identification equipment, and toll ticketing equipment accessible from said switching apparatus, an incoming repeater and a first subscriber station identified by a plural digit directory number, a second exchange provided with second switching apparatus, a second subscriber station identified by a plural digit directory number, a repeater and line identification equipment in said second exchange said repeater in said second exchange accessible from said second switching apparatus for extending a toll connection to said first exchange, a two conductor trunk line connecting said repeaters, said repeater in said second exchange including a first and a second means, said first means operated to repeat the dial pulses corresponding to the called station directory number via a first conductor of said trunk line, said second means operated after the start of said first means to forward the calling station directory number via a second conductor of said trunk line simultaneously with the operation of said first means a calling device at said first station for operating said first switching apparatus to extend a connection from said first station to said toll ticketing equipment, party identity means in said toll ticketing equipment controlled by said first station's calling device for determining said first station position on the line and then with the aid of said line detecting equipment to identify and register therein for recording purposes said directory number of said first station, and control means in said toll ticketing equipment for extending said toll call and recording the pertinent information and for then releasing itself from the connection upon termination of the call, first means in said repeater in said second exchange when seized by said second subscriber station operated to determine said party's position on the line and in cooperation with said second exchange detecting equipment to register within itself the directory number of said second station, said repeater in said second exchange responsive to said repeater in said first exchange to seize said toll ticketing equipment means in said repeater in said first exchange responsive to said first and second means in said second exchange repeater to repeat said calling and called numbers to said toll ticketing equipment, first means in said toll ticketing equipment responsive to a call from said repeater for connecting its register to the repeater circuit for receiving the calling party identity from the repeater in codel form, second means in said toll ticketing equipment for preventing a line identification attempt in its own exchange, first register means in said toll ticketing equipment operated to accept said line identification information from said second exchange's repeater simultaneously with the calling subscribers dialling the called subscribers directory number into the second register means in the toll ticketing equipment and other means responsive to the receipt of both directory numbers to complete a toll call, whereby said toll ticketing equipment may perform the toll ticketing services for its own exchange and that of branch exchanges.

3. In an automatic toll ticketing telephone system, a first exchange, a second exchange, a trunk line connecting said exchanges, subscriber lines in each of said exchanges, switching apparatus in each of said exchanges, calling station identification means in each exchange, an outgoing repeater in said first exchange, an incoming repeater and toll ticketing equipment in said second exchange, means including said switching apparatus and said line identification means and said repeater of said first exchange and said trunk line and said toll ticketing equipment and said repeater of said second exchange for completing a toll connection from said first exchange to said second exchange, means in said repeater in said first exchange for forwarding said line identification information to said toll ticketing equipment in said second exchange, said line identification information stored in said repeater in code form, said means for forwarding said information comprising a rotary switch and relay in said first repeater and a first and a second relay in said second repeater, said rotary switch in said first exchange stepping to scan the stored codel information and causing said associated relay to forward a positive high voltage potential over the positive trunk line to said repeater in the second exchange for each step during which it encounters a positive codel indication or to forward a negative exchange battery potential over said positive trunk line to said repeater in said second exchange for every one of its steps during which no positive codel information is encountered, said first relay in said repeater in said second exchange operated in response to the receipt of pulses from said repeater in said first exchange to step said register in said toll ticketing equipment, said second relay in said repeater in said second exchange operated only in response to the receipt of a positive high voltage pulse on said positive trunk line to thereby cause codel storage units associated with said register in said toll ticketing equipment to be marked identically to those of the repeater in said first exchange.

4. In an automatic toll ticketing telephone system, a first exchange, a second exchange, a trunk line interconnecting said exchanges, subscriber lines in each of said exchanges, switching apparatus in each of said exchanges, calling station identification means in each exchange, an outgoing repeater in said first exchange, an incoming repeater and toll ticketing equipment in said second exchange, means including said switching apparatus and said line identification means and said repeater of said first exchange and said toll ticketing equipment and said repeater of said second exchange for completing a toll connection including said trunk line from said first exchange to said second exchange, means in said repeater in said first exchange for forwarding said line identification information to said toll ticketing equipment in said second exchange simultaneously with the calling subscribers dialling of the called subscribers digits to said toll equipment, and means in said repeater in said first exchange for forwarding the dialled digits of a called number over one of the conductors of said trunk line and for forwarding said line identification information to said toll ticketing equipment in said second exchange over the other conductor of said trunk line, means in said repeater in said second exchange for repeating said digits received over said one conductor of said trunk line to the toll ticketing equipment to enable it to process the toll call, means in said repeater in said second exchange responsive to the receipt of said line identification information over said other conductor of said trunk line for transferring said line identification information to said toll ticketing equipment, and means in said repeater in said first exchange for preventing the forwarding of information over said other conductor of said trunk line before the subscriber starts to dial the called directory number.

5. In an automatic toll ticketing telephone system, a first exchange, a second exchange, a trunk line connecting said exchanges, subscriber lines in each of said exchanges, switching apparatus in each of said exchanges, calling station identification means in each exchange, an outgoing repeater in said first exchange, an incoming repeater and toll ticketing equipment in said second exchange, means including said switching apparatus, said line identification means and repeater of said first exchange, said trunk line and said toll ticketing equipment and repeaters of said second exchange, for completing a toll connection from said first exchange through said second exchange, means in said repeater in said first exchange for forwarding said line identification information to said toll ticketing equipment in said second exchange, said line identification information stored in said repeater in code form, said means for forwarding said information comprising a rotary switch and relay in said first repeater and a first and a second relay in said second repeater, said rotary switch in said first exchange stepping at a predetermined rate to scan the stored codel information and causing said associated relay to forward a marking potential over the positive trunk line to said repeater in the second exchange for each step during which it encounters a positive code marking, or to forward a negative exchange battery potential over said positive trunk line to said repeater in said second exchange for every one of its steps during which no positive code marking is encountered, but only after the subscriber begins to dial the called subscriber's number into the toll ticketing equipment, said first relay in said incoming repeater operated in response to the receipt of pulses from said outgoing repeater in said first exchange to step said register in said toll ticketing equipment synchronously with the rotary switch of said outgoing repeater, said second relay in said repeater in said second exchange operated only in response to the receipt of a marking potential on said positive trunk line to thereby cause said code storage units associated with said register in said toll ticketing equipment to be marked identically to those of the repeater in said first exchange.

6. In an automatic toll ticketing telephone system, a first exchange, a second exchange, an interexchange trunk line including a first and a second conductor connecting said exchanges, subscriber lines in each of said exchanges, switching apparatus in each of said exchanges, an outgoing repeater circuit in said first exchange connected to said trunk line, an incoming repeater connected to said trunk line and to toll ticketing equipment in said second exchange; means comprising said subscriber line of said first exchange, said switching apparatus of said first exchange, said outgoing repeater circuit, said trunk line, said incoming repeater, said toll ticketing equipment, and said switching apparatus of said second exchange for completing a toll connection from said first exchange subscriber to one of said second exchange subscriber lines; detecting means in said outgoing repeater circuit operated during the establishment of said toll connection to said outgoing repeater to record the calling station directory number identity, first means in said outgoing repeater operated to repeat the dial pulses corresponding to the called station directory number as pulsed from said calling subscriber line during the establishment of said connection, second means in said outgoing repeater to forward the calling station directory number simultaneously with said repeating of the called station directory number, said first means in said outgoing repeater comprising a battery-feed relay for said calling line, said battery-feed relay including a break-make contact assembly, a first source of potential connected to said break contact of said contact assembly, a second source of potential connected to said make contact of said contact assembly and said first conductor of said trunk line connected to the armature contact of said contact assembly, said second means in said outgoing repeater including a register means for storing the calling station directory number in a marking code, a rotary switch in said outgoing repeater operated during said repeating of said calling subscriber number to scan said register means, a timed pulsing means including first circuit means to operate said rotary switch at a predetermined rate, a sensing means operatively connected to said rotary switch to operate every time said rotary switch scans over a marked code in said register means, sensing circuit means comprising a second break-make contact assembly operated by said operated sensing means, a third source of potential connected to said break contact of said second contact assembly, a fourth source of potential connected to said make contact of said second contact assembly, third circuit means operated by said pulsing means to connect said armature contact of said second contact assembly to said second conductor of said trunk line prior to each step of said rotary switch, said incoming repeater including a first, a second and a third relay, said first relay in said incoming repeater operatively connected to said first trunk conductor and operated in response to the operation of said first means in said outgoing repeater, said second and third relays in said incoming repeater operatively connected to said second trunk conductor, said second relay operated in response to the receipt of a pulse from either said third source of potential or said fourth source of potential from said outgoing repeater to step a register in said toll ticketing equipment, said third relay operated only in response to the receipt of a pulse from said fourth source of potential, to thereby operate a storage unit in said toll ticketing equipment.

7. In an automatic toll ticketing telephone system, a first exchange, a second exchange, an interexchange trunk line including a first and a second conductor connecting said exchanges, subscriber lines in each of said exchanges, switching apparatus in each of said exchanges, an outgoing repeater circuit in said first exchange connected to said trunk line, an incoming repeater connected to said trunk line and to toll ticketing equipment in said second exchange; means comprising said subscriber line of said first exchange, said switching apparatus of said first exchange, said outgoing repeater circuit, said trunk line, said incoming repeater, said toll ticketing equipment, and said switching apparatus of said second exchange for completing a toll connection from said first exchange subscriber to one of said second exchange subscriber lines; detecting means in said outgoing repeater circuit operated during the establishment of said toll connection to said outgoing repeater to record the calling station directory number identity, first means in said outgoing repeater operated to repeat the dial pulses corresponding to the called station directory number as pulsed from said calling subscriber line during the establishment of said connection, second means in said outgoing repeater to forward the calling station directory number simultaneously with said repeating of the called station directory number, said first means in said outgoing repeater comprising a battery-feed relay for said calling line, said battery-feed relay including a break-make contact assembly, a first source of potential connected to said break contact of said contact assembly, a second source of potential connected to said make contact of said contact assembly and said first conductor of said trunk line connected to the armature contact of said contact assembly, said second means in said outgoing repeater including a register means for storing the calling station directory number in a marking code, a rotary switch in said outgoing repeater operated during said repeating of said calling subscriber number to scan said register means, a timed pulsing means including first circuit means to operate said rotary switch at a predetermined rate, a sensing means operatively connected to said rotary switch to operate every time said rotary switch scans over a marked code in said register means, sensing circuit means comprising a second break-make contact assembly operated by said operated sensing means, a third source of potential connected to said break contact of said second contact assembly, a fourth source of potential connected to said make contact of said second contact assembly, third circuit means operated by said pulsing means to connect said armature contact of said second contact assembly to said second conductor of said trunk line prior to each step of said rotary switch, said incoming repeater including a first, a second and a third relay, said first relay in said incoming repeater operatively connected to said first trunk conductor and operated in response to the operation of said first means in said outgoing repeater, said second and third relays in said incoming repeater operatively connected to said second trunk conductor, said second relay operated in response to the receipt of a pulse from either said third source of potential or said fourth source of potential from said outgoing repeater to step a register in said toll ticketing equipment, said third relay operated only in response to the receipt of a pulse from said fourth source of potential, to thereby operate a storage unit in said toll ticketing equipment other means in said incoming repeater operated by said toll ticketing equipment upon complete receipt of said calling and called numbers to switch through a transmission path via said trunk line.

8. In an automatic toll ticketing telephone system, a first exchange, a second exchange, an interexchange trunk line including a first and a second conductor connecting said exchanges, subscriber lines in each of said exchanges, switching apparatus in each of said exchanges, an outgoing repeater circuit in said first exchange connected to said trunk line, an incoming repeater connected to said trunk line and to toll ticketing equipment in said second exchange; means comprising said subscriber line of said first exchange, said swtiching apparatus of said first exchange, said outgoing repeater circuit, said trunk line, said incoming repeater, said toll ticketing equipment, and said switching apparatus of said second exchange for completing a toll connection from said first exchange subscriber to one of said second exchange subscriber lines; detecting means in said outgoing repeater circuit operated during the establishment of said toll connection to said outgoing repeater to record the calling station directory number identity, first means in said outgoing repeater operated to repeat the dial pulses corresponding to the called station directory number as pulsed from said calling subscriber line during the establishment of said connection, second means in said outgoing repeater to forward the calling station directory number simultaneously with said repeating of the called station directory number, said first means in said outgoing repeater comprising a battery-feed relay for said calling line, said battery-feed relay including a break-make contact assembly, a first source of potential connected to said break contact of said contact assembly, a second source of potential connected to said make contact of said contact assembly and said first conductor of said trunk line connected to the armature contact of said contact assembly, said second means in said outgoing repeater including a register means for storing the calling station directory number in a marking code, a rotary switch in said outgoing repeater operated during said repeating of said calling subscriber number to scan said register means, a timed pulsing means including first circuit means to operate said rotary switch at a predetermined rate, a sensing means operatively connected to said rotary switch to operate every time said rotary switch scans over a marked code in said register means, sensing circuit means comprising a second break-make contact assembly operated by said operated sensing means, a third source of potential connected to said break contact of said second contact assembly, a fourth source of potential connected to said make contact of said second contact assembly, third circuit means operated by said pulsing means to connect said armature contact of said second contact assembly to said second conductor of said trunk line prior to each step of said rotary switch, said incoming repeater including a first, a second and a third relay, said first relay in said incoming repeater operatively connected to said first trunk conductor and operated in response to the operation of said first means in said outgoing repeater, said second and third relays in said incoming repeater operatively connected to said second trunk conductor, said second relay operated in response to the receipt of a pulse from either said third source of potential or said fourth source of potential from said outgoing repeater to step a register in said toll ticketing equipment, said third relay operated only in response to the receipt of a pulse from said fourth source of potential, to thereby operate a storage unit in said toll ticketing equipment, other means in said incoming repeater including a source of potential the same as said second source of potential in said outgoing repeater and contact means for applying said potential to said second conductor of said trunk line operated by said toll ticketing equipment upon complete receipt of said calling and called directory numbers, switch through means in said outgoing repeater operated by said potential from said incoming repeater to release said first and second means and to switch through a transmission path.

References Cited in the file of this patent

UNITED STATES PATENTS

| | | |
|---|---|---|
| 2,535,510 | Ostline | Dec. 26, 1950 |
| 2,619,546 | Myers | Nov. 25, 1952 |
| 2,782,257 | Blashfield et al. | Feb. 19, 1957 |
| 2,886,642 | Morris | May 12, 1959 |
| 2,928,904 | Morris | Mar. 15, 1960 |